(12) United States Patent
Hansen et al.

(10) Patent No.: US 11,897,174 B2
(45) Date of Patent: Feb. 13, 2024

(54) COOLED ELECTRIC ACTUATOR CONTROLLED INJECTION

(71) Applicant: Synventive Molding Solutions, Inc., Peabody, MA (US)

(72) Inventors: Deven Hansen, Somerville, MA (US); Jared Wright, Gloucester, MA (US); Vito Galati, Rowley, MA (US); Paul Savoie, Nashua, NH (US)

(73) Assignee: SYNVENTIVE MOLDING SOLUTIONS, INC., Peabody, MA (US)

( * ) Notice: Subject to any disclaimer, the term of this patent is extended or adjusted under 35 U.S.C. 154(b) by 271 days.

(21) Appl. No.: 17/408,562

(22) Filed: Aug. 23, 2021

(65) Prior Publication Data

US 2021/0379804 A1  Dec. 9, 2021

Related U.S. Application Data

(63) Continuation of application No. PCT/US2020/019669, filed on Feb. 25, 2020.
(Continued)

(51) Int. Cl.
*B29C 45/72* (2006.01)
*B29C 45/27* (2006.01)
(Continued)

(52) U.S. Cl.
CPC ...... *B29C 45/2737* (2013.01); *B29C 45/2806* (2013.01); *B29C 45/73* (2013.01);
(Continued)

(58) Field of Classification Search
CPC ........ B29C 45/2737; B29C 2045/2824; B29C 2045/7271
See application file for complete search history.

(56) References Cited

U.S. PATENT DOCUMENTS

| 9,849,618 B1 | 12/2017 | Tooman et al. |
| 2005/0123641 A1 | 6/2005 | Kim |
| 2018/0186051 A1 | 7/2018 | Lee et al. |

FOREIGN PATENT DOCUMENTS

| CN | 109080084 A | 12/2018 |
| EP | 2679374 A1 | 1/2014 |
| WO | 2014194037 A1 | 12/2014 |

OTHER PUBLICATIONS

Communication Pursuant to Article 94(3) EPC in related EP Application No. 20714758.8 dated Dec. 21, 2021.
(Continued)

*Primary Examiner* — James Sanders
(74) *Attorney, Agent, or Firm* — CANTOR COLBURN LLP

(57) ABSTRACT

An injection molding system (1000) comprising:
  an actuator (5) having a housing (20) comprised of radial (20r, 20ri, 20ro, 20roa, 20rob, 20roc, 20rod) and axial walls (20a, 20ai, 20aue, 20ade) that form an enclosed chamber (45) containing a heat conductive chamber fluid (CF),
  a rotor and driver driven by electrical energy and supported within the chamber by the radial and axial walls,
  wherein one or more of the radial and axial walls comprise a heat conductive material that has an inner surface disposed in heat conductive contact with the heat conductive fluid (CF) contained within the enclosed chamber,
  an actuator tube or channel (25) disposed within the one or more of the radial and axial walls,
  a source (260) of heat absorptive fluid (25f) sealably interconnected to the actuator tube or channel (25).

34 Claims, 39 Drawing Sheets

Related U.S. Application Data

(60) Provisional application No. 62/810,204, filed on Feb. 25, 2019, provisional application No. 62/862,277, filed on Jun. 17, 2019.

(51) Int. Cl.
*B29C 45/28* (2006.01)
*B29C 45/73* (2006.01)

(52) U.S. Cl.
CPC .............. *B29C 2045/2824* (2013.01); *B29C 2045/7271* (2013.01); *B29C 2045/735* (2013.01)

(56) References Cited

OTHER PUBLICATIONS

International Search Report and Written Opinion in related international application No. PCT/US2020/019669 dated May 26, 2020.
Chinese Office Action for Chinese Application No. 202080030923.5; Report dated Sep. 16, 2023 (66 Pages—with translation).

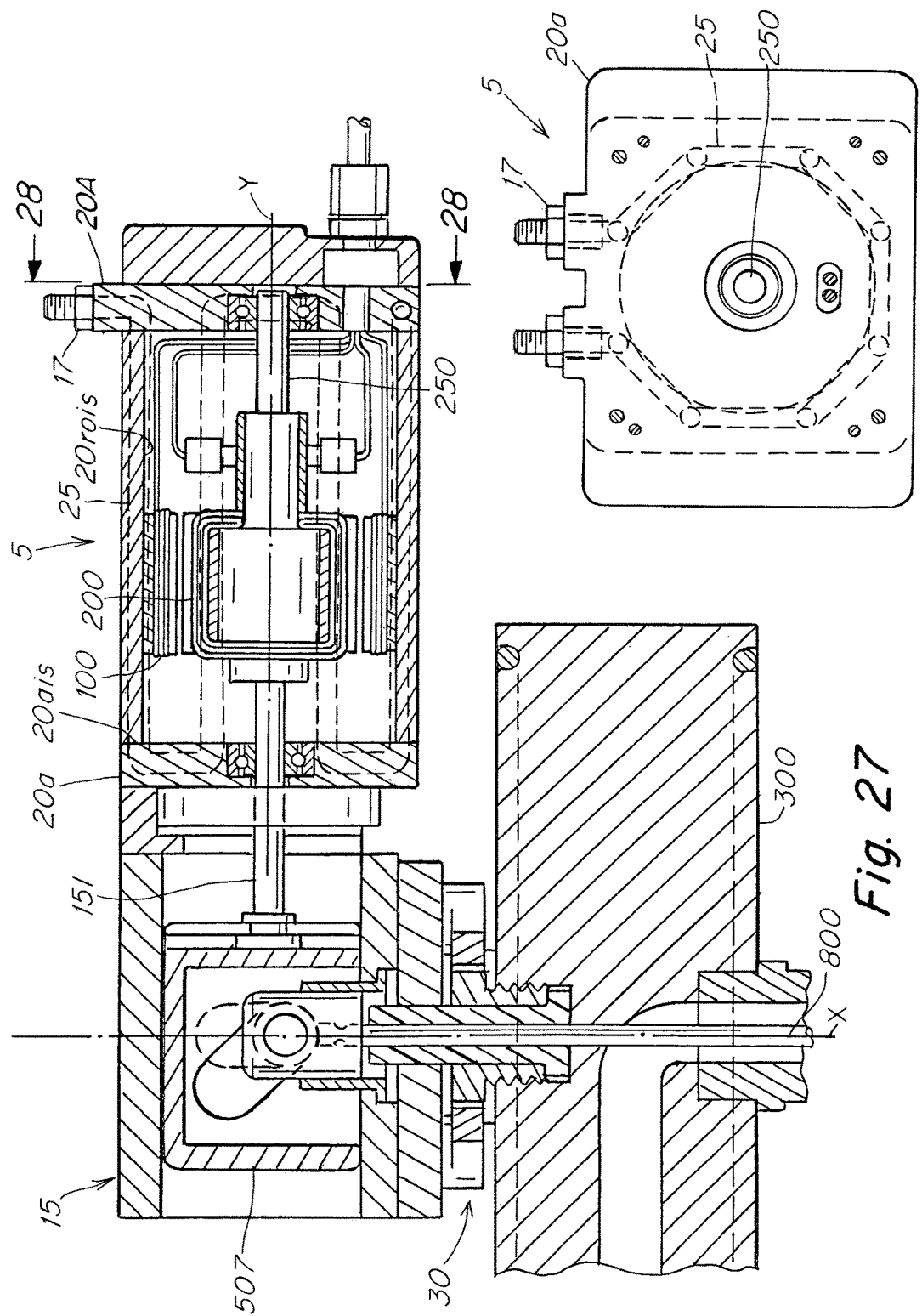

COOLED ELECTRIC ACTUATOR CONTROLLED INJECTION

RELATED APPLICATIONS

This application is a continuation of and claims the benefit of priority to international application PCT/US2020/019669 filed Feb. 25, 2020 which in turns claims the benefit of priority to U.S. Provisional Application Ser. No. 62/810,204 filed Feb. 25, 2019 and further claims the benefit of priority to U.S. Provisional Application Ser. No. 62/862,277 filed Jun. 17, 2019, the disclosures of all of which are incorporated by reference as if fully set forth in their entirety herein.

The disclosures of all of the following are incorporated by reference in their entirety as if fully set forth herein: The disclosures of all of the following are incorporated by reference in their entirety as if fully set forth herein: U.S. Pat. Nos. 5,894,025, 6,062,840, 6,294,122 (7018), 6,309,208, 6,287,107, 6,343,921, 6,343,922, 6,254,377, 6,261,075, 6,361,300 (7006), 6,419,870, 6,464,909 (7031), 6,062,840 (7052) 6,261,075 (7052US1), 6,599,116, 7,234,929 (7075US1), 7,419,625 (7075US2), 7,569,169 (7075US3), 8,297,836 (7087) U.S. patent application Ser. No. 10/214,118, filed Aug. 8, 2002 (7006), U.S. Pat. No. 7,029,268 (7077US1), U.S. Pat. No. 7,270,537 (7077US2), U.S. Pat. No. 7,597,828 (7077US3), U.S. patent application Ser. No. 09/699,856 filed Oct. 30, 2000 (7056), U.S. patent application Ser. No. 10/269,927 filed Oct. 11, 2002 (7031), U.S. application Ser. No. 09/503,832 filed Feb. 15, 2000 (7053), U.S. application Ser. No. 09/656,846 filed Sep. 7, 2000 (7060), U.S. application Ser. No. 10/006,504 filed Dec. 3, 2001, (7068), International Application WO2011119791 filed Mar. 24, 2011 (7094), U.S. application Ser. No. 10/101,278 filed Mar. 19, 2002 (7070) and PCT Application No. PCT/US11/062099 (7100W00) and PCT Application No. PCT/US11/062096 (7100W01), U.S. Pat. Nos. 8,562,336, 8,091,202 (7097US1) and 8,282,388 (7097US2), 9,724,861 (7129US4), 9,662,820 (7129US3), Publication No. WO2015006261 (7135WO0), U.S. Publication No. 2018-0194050 A1 (7135US3), Publication No. WO2014209857 (7134WO0), International application Publication No. WO2016153632 (7149WO2), International application publication no. WO2016153704 (7149WO4), U.S. Pat. No. 9,205,587 (7117US0), U.S. application Ser. No. 15/432,175 (7117US2) filed Feb. 14, 2017, U.S. Pat. No. 9,144,929 (7118US0), U.S. Publication No. 20170341283 (7118US3), U.S. Pat. No. 9,937,648 (7135US2), U.S. Pat. No. 10,569,458 (7162US1), International Application WO2017214387 (7163WO0), International Application PCT/US17/043029 (7165WO0) filed Jul. 20, 2017, International Application PCT/US17/043100 (7165WO1), filed Jul. 20, 2017 and International Application PCT/US17/036542 (7163WO0) filed Jun. 8, 2017 and International Application WO2018129015 (7169WO0), International application WO2018148407 (7170WO0), International application WO2018148407 (7171WO0), international application WO2018175362 (7172WO0), international application WO2018194961 (7174WO0), international application WO2018200660 (7176WO0), international application WO2019013868 (7177WO0), international application WO2019100085 (7178WO0), international application WO2021/034793 (7187WO0).

BACKGROUND OF THE INVENTION

Injection molding systems have been developed for performing injection molding cycles controlled by an electric motor actuator that is not actively but only passively cooled.

SUMMARY OF THE INVENTION

In accordance with the invention there is provided an injection molding system (1000) comprising an injection molding machine (500) that injects a flow of injection fluid (400) to a heated manifold (300) that distributes the injection fluid (400) to a flow channel that delivers the injection fluid to a gate (70) of a mold cavity (80), the injection molding system (1000) comprising:

an actuator (5) comprised of a rotor (250) having a drive axis (Y) and a driver (100, 200) interconnected to the rotor (250) adapted to drive the rotor around the drive axis, the driver (100, 200) receiving electrical energy or power that drives the driver (100, 200), the actuator having a housing (20) comprised of radial (20r, 20ri, 20ro, 20roa, 20rob, 20roc, 20rod) and axial walls (20a, 20ai, 20aue, 20ade) that form an enclosed chamber (45), the rotor and driver being supported within an interior space (45s) of the chamber (45) by the radial and axial walls (20r, 20ro, 20ri, 20roa, 20rob, 20roc, 20rod, 20a, 20ai, 20aue, 20ade) in an arrangement such that the rotor (250) and driver (100, 200) are drivably rotatable within the chamber (45), wherein one or more of the radial and axial walls (20r, 20ro, 20ri, 20roa, 20rob, 20roc, 20rod, 20a, 20ai, 20aue, 20ade) comprise a heat conductive material in heat conductive contact or communication with heat generated by the manifold (300) or heat generated within the enclosed chamber (45), an actuator tube or channel (25) surrounded by and in intimate heat conductive contact with the heat conductive material of one or more of the radial and axial walls (20r, 20ro, 20ri, 20roa, 20rob, 20roc, 20rod, 20a, 20ai, 20aue, 20ade), a source (260) of heat absorptive fluid (25f) sealably interconnected to the tube or channel (25) in an arrangement such that the heat absorptive fluid (25f) is routed through the tube or channel (25) in a flow that absorbs heat from the one or heat conductive walls (20r, 20ro, 20ri, 20roa, 20rob, 20roc, 20rod, 20a, 20ai, 20aue, 20ade), a valve pin (800) having a pin axis (X), the valve pin being interconnected to the rotor (250) such that the valve pin is controllably drivable along a linear path of travel (XX) along the pin axis (X).

In such a system, one or more of the radial or axial walls of the actuator housing (20) can:

comprise a first unitary body (20r, 20a, 20ri, 20ai) comprised of a heat conductive material having an inner surface (20ris, 20ais, 20riis, 20aiis) disposed in intimate heat conductive contact with the interior space (45s) of the chamber and, comprise a second unitary body (20ro, 20ao) comprised of a heat conductive material that has an inner surface (20rois, 20aois) in intimate heat conductive contact or communication with a heat communicating surface (20rihcs, 20aihcs) of the first unitary body (20ri, 20ai) or of one or more intermediate unitary bodies that are comprised of a heat conductive material and have a second inner surface (20riis, 20aiis) that is disposed in intimate heat conductive contact or communication with the interior space (45s) of the chamber (45).

In such a system the actuator tube or channel (25) is typically disposed within the second unitary body (20ro, 20ao).

In such a system the first unitary body (20r, 20a, 20ri, 20ai) is typically comprised of a heat insulative material and the second unitary body (20ro, 20ao) is typically comprised of a highly heat conductive material.

In accordance with the invention there is provided an injection molding system (1000) comprising an injection molding machine (500) that injects a flow of injection fluid (400) to a heated manifold (300) that distributes the injection fluid (400) to a flow channel that delivers the injection fluid to a gate (70) of a mold cavity (80), the injection molding system (1000) comprising:

an actuator (5) comprised of a rotor (250) having a drive axis (Y) and a driver (100, 200) interconnected to the rotor (250) adapted to drive the rotor around the drive axis, the driver (100, 200) receiving electrical energy or power that generates drive heat, the actuator having a housing (20) comprised of radial (20r, 20ri, 20ro, 20roa, 20rob, 20roc, 20rod) and axial walls (20a, 20ai, 20aue, 20ade) that form an enclosed chamber (45) containing a heat conductive chamber fluid (CF), the rotor and driver (250, 100, 200) being mounted within the chamber (45) in intimate heat conductive contact with the heat conductive fluid, the rotor and driver being supported within the chamber by the radial and axial walls (20r, 20ro, 20ri, 20roa, 20rob, 20roc, 20rod, 20a, 20ai, 20aue, 20ade) in an arrangement such that the rotor (250) and driver (100, 200) are drivably rotatable within the chamber (45), wherein one or more of the radial and axial walls (20r, 20ro, 20ri, 20roa, 20rob, 20roc, 20rod, 20a, 20ai, 20aue, 20ade) comprise a heat conductive material that has an inner surface disposed in heat conductive contact with the heat conductive fluid (CF) contained within the enclosed chamber, the one or more radial or axial walls (20r, 20ro, 20ri, 20roa, 20rob, 20roc, 20rod, 20a, 20ai, 20aue, 20ade) absorbing heat from the heat conductive fluid (CF) contained within the chamber (45), an actuator tube or channel (25) surrounded by and in intimate heat conductive contact with the heat conductive material of one or more of the radial and axial walls (20r, 20ro, 20ri, 20roa, 20rob, 20roc, 20rod, 20a, 20ai, 20aue, 20ade), a source (260) of heat absorptive fluid (25f) sealably interconnected to the tube or channel (25) in an arrangement such that the heat absorptive fluid (25f) is routed through the tube or channel (25) in a flow that absorbs heat from the one or heat conductive walls (20r, 20ro, 20ri, 20roa, 20rob, 20roc, 20rod, 20a, 20ai, 20aue, 20ade), a valve pin (800) having a pin axis (X), the valve pin being interconnected to the rotor (250) such that the valve pin is controllably drivable along a linear path of travel (XX) along the pin axis (X).

The radial walls 20r, 20ri, 20rit, 20ro, 20roa, 20rob, 20roc, 20rod and the axial walls 20a, 20ai, 20aue, 20ade are typically interconnected to each other to form an independent housing body 20 that is attachable to and detachable from a housing 120 of a linear travel converter or transmssion 15 that is mounted to the manifold and adapted to convert rotational movement of the rotor (250) around the rotor axis (Y) to linear movement of the valve pin along an axis (X, XX). The independent housing body 20 is mounted to the manifold via the mounting of the linear travel converter 15 to the manifold. The linear travel converter or transmission 15 typically comprises a rotary to linear or linear to linear conversion device or a transmission 15 comprised of one or more gears, racks, screws or nuts (16a, 16b, 72, 190, 191, 195, 950, 960, 970) adapted to convert rotational movement of the rotor (250) around the rotor axis (Y) to linear movement of the valve pin along an axis (X, XX) that is non-coaxial relative to the rotor axis (Y). The housing 120 of the linear travel converter or transmission typically comprises one or more converter or transmission walls (120r, 120rb, 120rc, 120ri, 120ro, 120a) that are comprised of a heat conductive material. The converter or transmission walls (120r, 120rb, 120rc, 120ri, 120ro, 120a) are typically mounted to the heated manifold (300) in an arrangement such that the manifold heat 300 is communicated to the converter or walls (120r, 120rb, 120rc, 120ri, 120ro, 120a).

The actuator housing body 20 typically surrounds or contains the tube or channel (25) independent of the converter or transmission walls 120r, 120rb, 120rc, 120ri, 120ro, 120a.

Such a system can further comprise a heated manifold (300) generating manifold heat, the housing (20) of the actuator being mounted in heat conductive communication with the heated manifold (300) such that manifold heat is absorbed by or communicated to the one or more radial and axial walls (20r, 20ro, 20ri, 20roa, 20rob, 20roc, 20rod, 20a, 20ai, 20aue, 20ade) of the housing, the heat absorptive fluid (25f) absorbing the manifold heat absorbed by or communicated to the one or more radial and axial walls (20r, 20ro, 20ri, 20roa, 20rob, 20roc, 20rod, 20a, 20ai, 20aue, 20ade) of the housing.

The one or more radial or axial walls of the actuator housing can:

comprise a first unitary body (20r, 20ri, 20a,) comprised of a heat conductive material having an inner surface (20ris, 20ais) disposed in intimate heat conductive contact with the fluid (CF) contained within the chamber or, comprise a second unitary body (20ro, 20ao) comprised of a heat conductive material that has an inner surface (20rois, 20aois) in intimate heat conductive contact or communication with a heat communicating surface (20rihcs, 20aihcs) of the first unitary body (20ri, 20ai) or an intermediate unitary body that is comprised of a heat conductive material having a second inner surface (20riis, 20aiis) that is disposed in intimate heat conductive contact or communication with the fluid (CF) contained within the chamber (45).

In such a system the first unitary body (20ro, 20a0) is typically comprised of a heat insulative or non-heat conductive material and the second unitary body (20ro, 20ao) is typically comprised of a highly heat conductive material.

The system can further comprise a linear travel converter (15) interconnected between the rotor (250) and the valve pin (800) in an arrangement that converts rotation movement of the rotor to linear movement (XX) of the valve pin (800), a heated manifold (300) that generates manifold heat, the linear travel converter (15) comprising a converter housing (120) comprised of one or more converter walls (120r, 120rb, 120rc, 120ri, 120ro, 120a) that are comprised of a heat conductive material, the converter walls (120r, 120rb, 120rc, 120ri, 120ro, 120a) being mounted to the heated manifold (300) in an arrangement such that the manifold heat is communicated to the converter walls (120r, 120rb, 120rc, 120ri, 120ro, 120a), a converter tube or channel (125) surrounded by and in intimate heat conductive contact with the heat conductive material of one or more of the converter walls (120*r*, 120*rb*, 120*rc*, 120*ri*, 120*ro*, 120*a*), a source of heat absorptive fluid (125F) sealably interconnected to the converter tube or channel (125) in an arrangement such that the heat absorptive fluid (125*f*) is routed through the converter tube or channel (125) in a flow that absorbs the manifold heat communicated to the converter walls.

In such a system one or more of the converter walls (120*r*, 120*rb*, 120*rc*, 120*ri*, 120*ro*, 120*a*) typically has an outer surface (120*aos*, 120*ros*) disposed in heat conductive communication with a heat conductive surface (20*aos*) of one or more of the radial and axial walls (20*r*, 20*ro*, 20*roa*, 20*rob*, 20*roc*, 20*rod*, 20*a*, 20*aue*, 20*ade*) of the actuator (5).

In such a system one or more of the converter walls (120*r*, 120*rb*, 120*rc*, 120*ri*, 120*ro*, 120*a*) can have an inner surface (120*ris*, 120*ais*) disposed in heat conductive communication with a linear travel device (127) that is interconnected between the rotor (250) and the valve pin to convert rotation movement of the rotor to linear movement (XX) of the valve pin (800)

One or more of the converter walls can comprise a unitary body (120*ro*) comprised of the heat conductive material having an inner surface (120*rois*) in heat conductive contact with a heat communicating surface (120*rihcs*) of an intermediate unitary body (120*ri*) comprised of a heat conductive material having a second inner surface (20*riis*) that is disposed in heat conductive communication with a linear travel device (127) that is interconnected between the rotor (250) and the valve pin to convert rotation movement of the rotor to linear movement (XX) of the valve pin (800).

Such a system can further comprise a linear travel converter (15) interconnected between the rotor (250) and the valve pin (800) in an arrangement that converts rotation movement of the rotor (250) to linear movement (XX) of the valve pin (800), the linear travel converter (15) being mounted within the enclosed chamber (45) in contact with the heat conductive chamber fluid (CF)

the housing (20) of the actuator being mounted in heat conductive communication with the heated manifold (300) such that manifold heat is absorbed by or communicated to the one or more radial and axial walls (20*r*, 20*ro*, 20*ri*, 20*roa*, 20*rob*, 20*roc*, 20*rod*, 20*a*, 20*ai*, 20*aue*, 20*ade*) of the housing, the heat absorptive fluid (25*f*) absorbing the manifold heat absorbed by or communicated to the one or more radial and axial walls (20*r*, 20*ro*, 20*ri*, 20*roa*, 20*rob*, 20*roc*, 20*rod*, 20*a*, 20*ai*, 20*aue*, 20*ade*) of the housing.

In such a system the rotor (250) has a rotor axis (Y) and the valve pin (800) has a travel axis (X, XX), the rotor axis (Y) and the travel axis (X, XX) can be coaxial.

In such a system the rotor (250) has a rotor axis (Y), and the system can include a transmission comprised of:

one or more gears, racks, screws or nuts (16*a*, 16*b*, 72, 190, 191, 195, 950, 960, 970) adapted to convert rotational movement of the rotor (250) around the rotor axis (Y) to linear movement of the valve pin along an axis (X, XX) that is non-coaxial relative to the rotor axis (Y), one or more transmission walls (120*r*, 120*ro*, 120*ri*, 120*a*, 120*ao*, 120*ai*) forming an enclosed chamber (55) that encloses one or more of the gears, racks, screws or nuts (16*a*, 16*b*, 72, 190, 191, 195, 950, 960, 970), the one or more transmission walls (120*r*, 120*ro*, 120*ri*, 120*a*, 120*ao*, 120*ai*) being comprised of a heat conductive material, a converter tube or channel (125) surrounded by and in intimate heat conductive contact with the heat conductive material of one or more of the transmission walls (120*r*, 120*ro*, 120*ri*, 120*a*, 120*ao*, 120*ai*), a source of heat absorptive fluid (125F) sealably interconnected to the converter tube or channel (125) in an arrangement such that the heat absorptive fluid (125*f*) is routed through the converter tube or channel (125) in a flow that absorbs heat absorbed by or communicated to the one or more transmission walls (120*r*, 120*ro*, 120*ri*, 120*a*, 120*ao*, 120*ai*).

The actuator housing (20) is typically removably attached to a top clamping or mounting plate (1002) that is mounted upstream of the manifold and interconnected to the mold.

The linear travel converter (15) can be removably attached to a top clamping or mounting plate (1002) that is mounted upstream of the manifold and interconnected to the mold.

In another aspect of the invention there is provided an injection molding system (1000) comprising an injection molding machine (500) that injects a flow of injection fluid (400) to a heated manifold (300) that distributes the injection fluid (400) to a flow channel that delivers the injection fluid to a gate (70) of a mold cavity (80), the injection molding system (1000) further comprising:

an actuator (5) comprised of a rotor (250) having a drive axis (Y) and a driver (100, 200) interconnected to the rotor (250) adapted to drive the rotor around the drive axis (Y), a linear travel converter (15) interconnected between the rotor (250) and a valve pin (800) in an arrangement that converts rotation movement of the rotor to linear movement (XX) of the valve pin (800), a heated manifold (300) that generates manifold heat, the linear travel converter (15) comprising a converter housing (120) comprised of one or more converter walls (120*r*, 120*rb*, 120*rc*, 120*ri*, 120*ro*, 120*a*) that are comprised of a heat conductive material, the converter walls (120*r*, 120*rb*, 120*rc*, 120*ri*, 120*ro*, 120*a*) being mounted to the heated manifold (300) in an arrangement such that the manifold heat is communicated to the converter walls (120*r*, 120*rb*, 120*rc*, 120*ri*, 120*ro*, 120*a*), a converter tube or channel (125) surrounded by and in intimate heat conductive contact with the heat conductive material of one or more of the converter walls (120*r*, 120*rb*, 120*rc*, 120*ri*, 120*ro*, 120*a*), a source of heat absorptive fluid (125F) sealably interconnected to the converter tube or channel (125) in an arrangement such that the heat absorptive fluid (125*f*) is routed through the converter tube or channel (125) in a flow that absorbs the manifold heat communicated to the converter walls.

In such a system one or more of the converter walls (120*r*, 120*rb*, 120*rc*, 120*ri*, 120*ro*, 120*a*) can have an inner surface (120*ris*, 120*ais*) disposed in heat conductive communication with a linear travel device (127) that is interconnected between the rotor (250) and the valve pin to convert rotation movement of the rotor to linear movement (XX) of the valve pin (800).

In such a system one or more of the converter walls can comprise a unitary body (120*ro*) comprised of the heat conductive material having an inner surface (120*rois*) in heat conductive contact with a heat communicating surface (120*rihcs*) of an intermediate unitary body (120*ri*) comprised of a heat conductive material having a second inner surface (20*riis*) that is disposed in heat conductive communication with a linear travel device (127) that is interconnected between the rotor (250) and the valve pin to convert rotation movement of the rotor to linear movement (XX) of the valve pin (800).

In such a system the actuator can have a housing (20) comprised of radial (20*r*, 20*ri*, 20*ro*, 20*roa*, 20*rob*, 20*roc*, 20*rod*) and axial walls (20*a*, 20*ai*, 20*aue*, 20*ade*) that form an enclosed chamber (45) containing a heat conductive chamber fluid (CF), the rotor and driver (250, 100, 200) being mounted within the chamber (45) in intimate heat conductive contact with the heat conductive fluid, the rotor and driver being supported within the chamber by the radial and axial walls (20*r*, 20*ro*, 20*ri*, 20*roa*, 20*rob*, 20*roc*, 20*rod*, 20*a*, 20*ai*, 20*aue*, 20*ade*) in an arrangement such that the rotor (250) and driver (100, 200) are drivably rotatable within the chamber (45), wherein one or more of the radial and axial walls (20*r*, 20*ro*, 20*ri*, 20*roa*, 20*rob*, 20*roc*, 20*rod*, 20*a*, 20*ai*, 20*aue*, 20*ade*) comprise a heat conductive material that has an inner surface disposed in heat conductive contact with the heat conductive fluid (CF) contained within the enclosed chamber, the one or more radial or axial walls (20*r*, 20*ro*, 20*ri*, 20*roa*, 20*rob*, 20*roc*, 20*rod*, 20*a*, 20*ai*, 20*aue*, 20*ade*) absorbing heat from the heat conductive fluid (CF) contained within the chamber (45), an actuator tube or channel (25) surrounded by and in intimate heat conductive contact with the heat conductive material of one or more of the radial and axial walls (20*r*, 20*ro*, 20*ri*, 20*roa*, 20*rob*, 20*roc*, 20*rod*, 20*a*, 20*ai*, 20*aue*, 20*ade*), a source (260) of heat absorptive fluid (25*f*) sealably interconnected to the tube or channel (25) in an arrangement such that the heat absorptive fluid (25*f*) is routed through the tube or channel (25) in a flow that absorbs heat from the one or heat conductive walls (20*r*, 20*ro*, 20*ri*, 20*roa*, 20*rob*, 20*roc*, 20*rod*, 20*a*, 20*ai*, 20*aue*, 20*ade*).

In such a system one or more of the converter walls (120*r*, 120*rb*, 120*rc*, 120*ri*, 120*ro*, 120*a*) can have an outer surface (120*aos*, 120*ros*) disposed in heat conductive communication with a heat conductive surface (20*ros*, 20*aos*) of one or more of the radial and axial walls (20*r*, 20*ro*, 20*roa*, 20*rob*, 20*roc*, 20*rod*, 20*a*, 20*aue*, 20*ade*) of the actuator (5).

Such a system can further comprise a transmission comprised of one or more gears, racks, screws or nuts (16*a*, 16*b*, 72, 190, 191, 195, 950, 960, 970) adapted to convert rotational movement of the rotor (250) around the rotor axis (Y) to linear movement of the valve pin along an axis (X, XX) that is non-coaxial relative to the rotor axis (Y), one or more transmission walls (120*r*, 120*ro*, 120*ri*, 120*a*, 120*ao*, 120*ai*) forming an enclosed chamber (55) that encloses one or more of the gears, racks, screws or nuts (16*a*, 16*b*, 72, 190, 191, 195, 950, 960, 970), the one or more transmission walls (120*r*, 120*ro*, 120*ri*, 120*a*, 120*ao*, 120*ai*) being comprised of a heat conductive material, a converter tube or channel (125) surrounded by and in intimate heat conductive contact with the heat conductive material of one or more of the transmission walls (120*r*, 120*ro*, 120*ri*, 120*a*, 120*ao*, 120*ai*), a source of heat absorptive fluid (125F) sealably interconnected to the converter tube or channel (125) in an arrangement such that the heat absorptive fluid (125*f*) is routed through the converter tube or channel (125) in a flow that absorbs heat absorbed by or communicated to the one or more transmission walls (120*r*, 120*ro*, 120*ri*, 120*a*, 120*ao*, 120*ai*).

In such a system, the rotor (250) has a rotor axis (Y) and the valve pin (800) has a travel axis (X, XX), the rotor axis (Y) and the travel axis (X, XX) can be coaxial.

The actuator housing (20) can be removably attached to a top clamping or mounting plate (1002) that is mounted upstream of the manifold and interconnected to the mold.

The linear travel converter (15) can be removably attached to a top clamping or mounting plate (1002) that is mounted upstream of the manifold and interconnected to the mold.

In another aspect of the invention there is provided An injection molding system (1000) comprising an injection molding machine (500) that injects a flow of injection fluid (400) to a heated manifold (300) that distributes the injection fluid (400) to a flow channel that delivers the injection fluid to a gate (70) of a mold cavity (80), the injection molding system (1000) further comprising:

an actuator (5) comprised of a rotor (250) having a drive axis (Y) and a driver (100, 200) interconnected to the rotor (250) adapted to drive the rotor around the drive axis (Y), a transmission comprised of one or more gears, racks, screws or nuts (16*a*, 16*b*, 72, 190, 191, 195, 950, 960, 970) adapted to convert rotational movement of the rotor (250) around the drive axis (Y) to linear movement of the valve pin along an axis (X, XX) that is non-coaxial relative to the drive axis (Y), one or more transmission walls (120*r*, 120*ro*, 120*ri*, 120*a*, 120*ao*, 120*ai*) forming an enclosed chamber (55) that encloses one or more of the gears, racks, screws or nuts (16*a*, 16*b*, 72, 190, 191, 195, 950, 960, 970), the one or more transmission walls (120*r*, 120*ro*, 120*ri*, 120*a*, 120*ao*, 120*ai*) being comprised of a heat conductive material, a converter tube or channel (125) surrounded by and in intimate heat conductive contact with the heat conductive material of one or more of the transmission walls (120*r*, 120*ro*, 120*ri*, 120*a*, 120*ao*, 120*ai*), a source of heat absorptive fluid (125F) sealably interconnected to the converter tube or channel (125) in an arrangement such that the heat absorptive fluid (125*f*) is routed through the converter tube or channel (125) in a flow that absorbs heat absorbed by or communicated to the one or more transmission walls (120*r*, 120*ro*, 120*ri*, 120*a*, 120*ao*, 120*ai*).

In such a system one or more of the transmission walls can comprise a unitary body (120*ro*) comprised of the heat conductive material having an inner surface (120*rois*) in heat conductive contact with a heat communicating surface (120*rihcs*) of an intermediate unitary body (120*ri*) comprised of a heat conductive material having a second inner surface (20*riis*) that is disposed in heat conductive communication with the chamber (55).

In such a system the actuator can have a housing (20) comprised of radial (20*r*, 20*ri*, 20*ro*, 20*roa*, 20*rob*, 20*roc*, 20*rod*) and axial walls (20*a*, 20*ai*, 20*aue*, 20*ade*) that form an enclosed chamber (45) containing a heat conductive chamber fluid (CF), the rotor and driver (250, 100, 200) being mounted within the chamber (45) in intimate heat conductive contact with the heat conductive fluid, the rotor and driver being supported within the chamber by the radial and axial walls (20*r*, 20*ro*, 20*ri*, 20*roa*, 20*rob*, 20*roc*, 20*rod*, 20*a*, 20*ai*, 20*aue*, 20*ade*) in an arrangement such that the rotor (250) and driver (100, 200) are drivably rotatable within the chamber (45), wherein one or more of the radial and axial walls (20*r*, 20*ro*, 20*ri*, 20*roa*, 20*rob*, 20*roc*, 20*rod*, 20*a*, 20*ai*, 20*aue*, 20*ade*) comprise a heat conductive material that has an inner surface disposed in heat conductive contact with the heat conductive fluid (CF) contained within the enclosed chamber, the one or more radial or axial walls (20*r*, 20*ro*, 20*ri*, 20*roa*, 20*rob*, 20*roc*, 20*rod*, 20*a*, 20*ai*, 20*aue*, 20*ade*) absorbing heat from the heat conductive fluid (CF) contained within the chamber (45), an actuator tube or channel (25) surrounded by and in intimate heat conductive contact with the heat conductive material of one or more of the radial and axial walls (20*r*, 20*ro*, 20*ri*, 20*roa*, 20*rob*, 20*roc*, 20*rod*, 20*a*, 20*ai*, 20*aue*, 20*ade*), a source (260) of heat absorptive fluid (25*f*) sealably interconnected to the tube or channel (25) in an arrangement such that the heat absorptive fluid (25*f*) is routed through the tube or channel (25) in a flow that absorbs heat from the one or heat conductive walls (20*r*, 20*ro*, 20*ri*, 20*roa*, 20*rob*, 20*roc*, 20*rod*, 20*a*, 20*ai*, 20*aue*, 20*ade*).

In such a system one or more of the converter walls (120*r*, 120*rb*, 120*rc*, 120*ri*, 120*ro*, 120*a*) can have an outer surface (120*aos*, 120*ros*) disposed in heat conductive communication with a heat conductive surface (20*ros*, 20*aos*) of one or more of the radial and axial walls (20*r*, 20*ro*, 20*roa*, 20*rob*, 20*roc*, 20*rod*, 20*a*, 20*aue*, 20*ade*) of the actuator (5).

Such a system can further comprise a transmission comprised of one or more gears, racks, screws or nuts (16*a*, 16*b*, 72, 190, 191, 195, 950, 960, 970) adapted to convert rotational movement of the rotor (250) around the rotor axis (Y) to linear movement of the valve pin along an axis (X, XX) that is non-coaxial relative to the rotor axis (Y), one or more transmission walls (120*r*, 120*ro*, 120*ri*, 120*a*, 120*ao*, 120*ai*) forming an enclosed chamber (55) that encloses one or more of the gears, racks, screws or nuts (16*a*, 16*b*, 72, 190, 191, 195, 950, 960, 970), the one or more transmission walls (120*r*, 120*ro*, 120*ri*, 120*a*, 120*ao*, 120*ai*) being comprised of a heat conductive material, a converter tube or channel (125) surrounded by and in intimate heat conductive contact with the heat conductive material of one or more of the transmission walls (120*r*, 120*ro*, 120*ri*, 120*a*, 120*ao*, 120*ai*), a source of heat absorptive fluid (125F) sealably interconnected to the converter tube or channel (125) in an arrangement such that the heat absorptive fluid (125*f*) is routed through the converter tube or channel (125) in a flow that absorbs heat absorbed by or communicated to the one or more transmission walls (120*r*, 120*ro*, 120*ri*, 120*a*, 120*ao*, 120*ai*).

The rotor (250) has a rotor axis (Y) and the valve pin (800) has a travel axis (X, XX), the rotor axis (Y) and the travel axis (X, XX) can be coaxial.

The actuator housing (20) can be removably attached to a top clamping or mounting plate (1002) that is mounted upstream of the manifold and interconnected to the mold.

The linear travel converter (15) can be removably attached to a top clamping or mounting plate (1002) that is mounted upstream of the manifold and interconnected to the mold.

In another aspect of the invention there in provided an injection molding system comprised of an injection molding machine that injects a flow of injection fluid to a heated manifold that distributes the injection fluid to a flow channel that delivers the injection fluid to a gate of a cavity contained in a mold, the injection molding system including:

an actuator comprised of an electricity driven device interconnected to a rotor, the electricity driven device being adapted to receive electrical energy, rotatably drive the rotor around a drive axis and generate electric drive heat, the rotor being interconnected to a valve pin having a pin axis in an arrangement wherein the valve pin is driven along a linear path of travel along the pin axis, the actuator including heat conductive walls that form a housing removably mounted to one or the other of the manifold and the top clamp plate (1002), the housing mounting the electricity driven device within an enclosed chamber formed in whole or in part by one or more of the heat conductive walls, the heat conductive walls having an interior surface in thermal conductive contact with the electric drive heat generated by the electricity driven device within the enclosed chamber such that the electric drive heat is received by the heat conductive walls, a cooler comprised of a tube or channel formed or contained within or in intimate contact with the one or more heat conductive walls, the tube or channel containing a cooling fluid, the tube or channel being adapted to receive the electric drive heat from the one or more heat conductive walls and transmit or conduct the electric drive heat to the cooling fluid contained within the tube or channel.

In such a system, the actuator housing is typically mounted to and in heat conductive communication with one or more actuator mounts that are mounted downstream to or in heat conductive communication with the heated manifold, the housing having a housing axis and being mounted to the one or more actuator mounts such that the The actuator can be mounted in thermal communication with the manifold such that heat generated by the heated manifold is received by the housing of the actuator, the tube or channel formed or contained within or in contact with the one or more heat conductive walls in an arrangement wherein the manifold heat received by the one or more heat conductive walls is transmitted or conducted to the cooling fluid.

The actuator is typically mounted in an arrangement wherein the actuator housing is axially or radially spaced apart from The cooling fluid is typically pumped through the tube or channel from a reservoir of cooling fluid in which the cooling fluid is maintained cool relative to an operating temperature of the housing of the actuator.

The housing can include one or more non fluid containing heat conductive walls that are mounted in heat conductive contact with one or more of the heat conductive walls in which a tube or channel is formed or contained or is in contact with.

The rotor can be interconnected to a rotary to a linear converter that can be housed within the chamber or that is disposed outside of or external to the chamber.

The downstream end of a rotary to linear converter can be interconnected to an upstream end of a valve pin. Alternatively the downstream end of a rotary to linear converter can be interconnected to an upstream end of a linear to linear converter having a downstream end that is in turn interconnected to an upstream end of a valve pin.

One or the other of the actuator, the rotary to linear converter and the linear to linear converter can be removably mounted to the heated manifold.

One or the other of the actuator, the rotary to linear converter and the linear to linear converter can be removably mounted to a top clamp plate (1002) mounted upstream of the manifold and interconnected to the mold.

The system can include a transmission comprised of a transmission shaft drivably rotatable around a transmission axis, the rotor and the transmission shaft being drivably interconnected and arranged such that the drive axis and the transmission axis are non-coaxially mounted or disposed relative to each other and such that driven rotation of the rotor around the drive axis rotatably drives the transmission shaft around the transmission axis.

The transmission shaft can be interconnected to an upstream end of a rotary to linear converter and the valve pin can be interconnected to a downstream end of the rotary to linear converter, the interconnection between the rotary to linear converter and the transmission shaft being adapted to convert rotation of the transmission shaft to linear travel of a travel shaft along a linear travel axis, a downstream end of the travel shaft being interconnected to an upstream end of the valve pin in an arrangement such that back and forth linear movement of the travel shaft causes corresponding upstream and downstream movement of the valve pin.

A downstream end of the travel shaft can be interconnected to an upstream end of a linear to linear converter and a downstream end of the linear to linear converter can be interconnected to an upstream end of the valve pin. Alternatively a downstream end of the travel shaft can be interconnected directly to an upstream end of the valve pin.

The transmission axis and the pin axis can be coaxial or non coaxial.

In another aspect of the invention there is provided an injection molding system comprised of an injection molding machine that inject a flow of injection fluid to a heated manifold that distributes the injection fluid to a flow channel that delivers the injection fluid to a gate of a mold cavity, the injection molding system including:

an actuator comprised of a motor housed in an actuator housing comprised of an actuator heat conductive material, the motor having a rotor having a drive axis, the rotor being rotatably driven by electrical energy or power around the drive axis, the rotor being interconnected to valve pin having a pin axis in an arrangement wherein the valve pin is driven along a linear path of travel along the pin axis, wherein the actuator includes a transmission comprised of a transmission shaft drivably rotatable around a transmission axis, the rotor and the transmission shaft being drivably interconnected and arranged such that the drive axis and the transmission axis are non-coaxially mounted or disposed relative to each other and such that driven rotation of the rotor around the drive axis rotatably drives the transmission shaft around the transmission axis, the actuator housing being mounted in thermal communication with the motor such that the actuator housing receives heat from the motor when the rotor is rotatably driven by the electrical energy or power, the system including a cooler comprised of a tube or enclosure comprised of a cooler heat conductive material, the tube or enclosure being adapted to fluid sealably contain a cooling fluid, the tube or enclosure being mounted to the actuator housing in an arrangement wherein the tube or enclosure is in thermal communication with the actuator housing or rotor, the cooling fluid receiving heat communicated to the tube or enclosure by the actuator housing or rotor.

In another aspect of the invention there is provided an injection molding system (1000) comprising an injection molding machine (500) that injects a flow of injection fluid (400) to a heated manifold (300) that distributes the injection fluid (400) to a flow channel that delivers the injection fluid (400) to a gate (70) of a mold cavity (80), the injection molding system (1000) further comprising:

an actuator (5) comprised of a rotor (250) having a drive axis (Y) and a driver (100, 200) interconnected to the rotor (250) adapted to drive the rotor around the drive axis (Y), a linear travel converter (15) interconnected between the rotor (250) and a valve pin (800) in an arrangement that converts rotation movement of the rotor to linear movement (XX) of the valve pin (800), a heated manifold (300) that generates manifold heat, the linear travel converter (15) comprising a converter housing (120) comprised of one or more converter walls (120*r*, 120*rb*, 120*rc*, 120*ri*, 120*ro*, 120*a*) forming a converter chamber (145) comprised of:

a first unitary converter body (120*r*, 120*a*, 120*ri*, 120*ai*) comprised of a heat conductive material having an inner surface (120*ris*, 120*ais*, 120*riis*, 120*aiis*) disposed in intimate heat conductive contact with an interior space (145*s*) of the converter chamber (145) and, and a second unitary converter body (20*ro*, 20*ao*) comprised of a heat conductive material that has an inner surface (120*rois*, 120*aois*) in intimate heat conductive contact or communication with a heat communicating surface (120*rihcs*, 120*aihcs*) of the first unitary converter body (120*ri*, 120*ai*) or of one or more intermediate unitary converter bodies that are comprised of a heat conductive material.

In such a system the actuator tube or channel (125) is preferably disposed within the second unitary body (120*ro*, 120*ao*).

In such a system the first unitary converter body (120*r*, 120*a*, 120*ri*, 120*ai*) is preferably comprised of a heat insulative material and the second unitary converter body (120*ro*, 120*ao*) is preferably comprised of a highly heat conductive material.

In another aspect of the invention there is a provided a method of performing an injection cycle comprising operating a system according to any the systems described or disclosed herein.

BRIEF DESCRIPTION OF THE DRAWINGS

FIG. 27 is a side sectional view of the FIG. 26 system.

FIG. 28 is a sectional view taken along lines 28-28 of FIG. 27.

DETAILED DESCRIPTION

Figure 1:
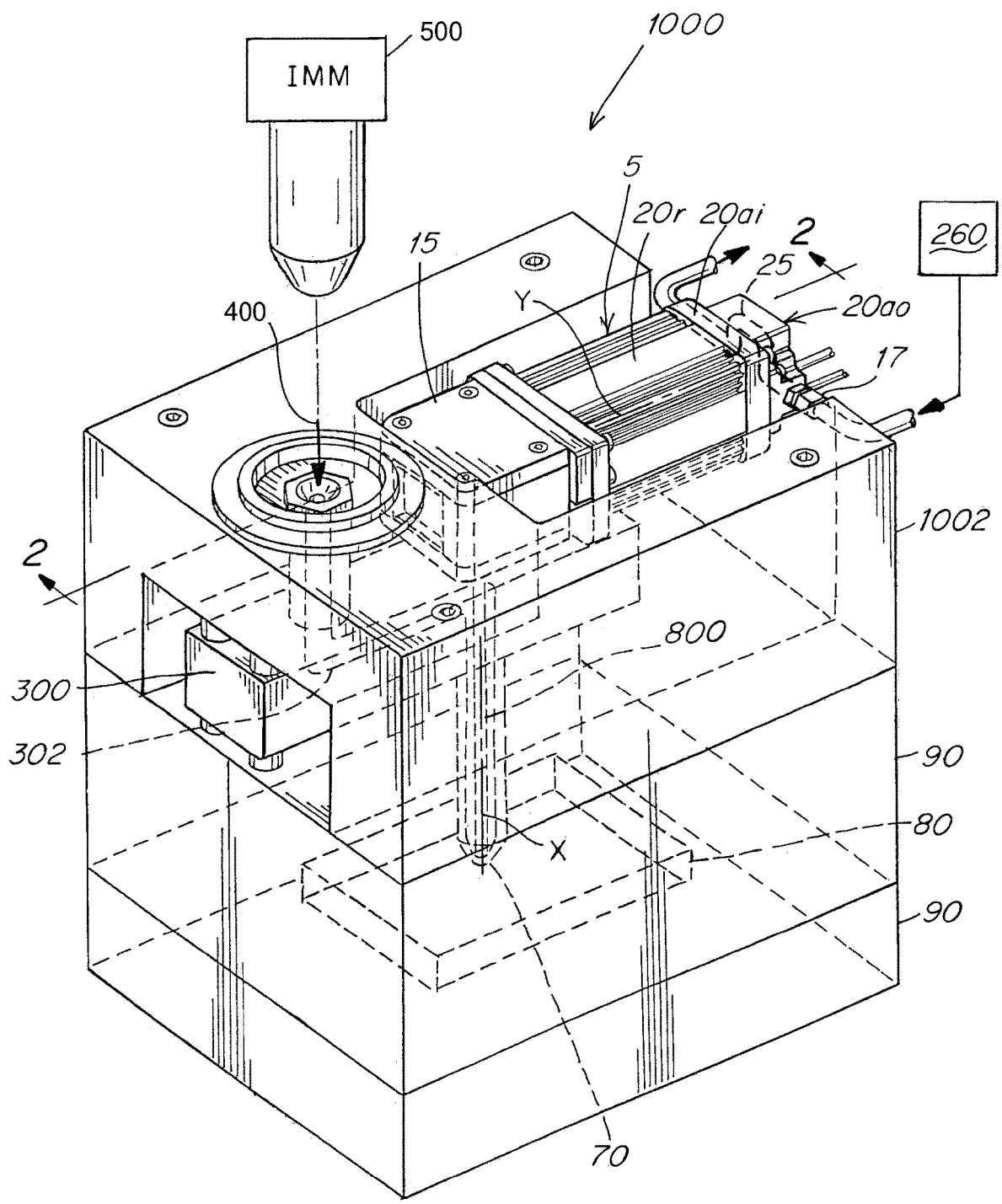
FIG. 1 is a top left perspective view of an injection molding system showing an electric actuator having a distal end housing component having actively cooled channels incorporated into the body of the housing component, with the housing component in thermal contact with the enclosed interior drive chamber of the actuator.
Figure 2:
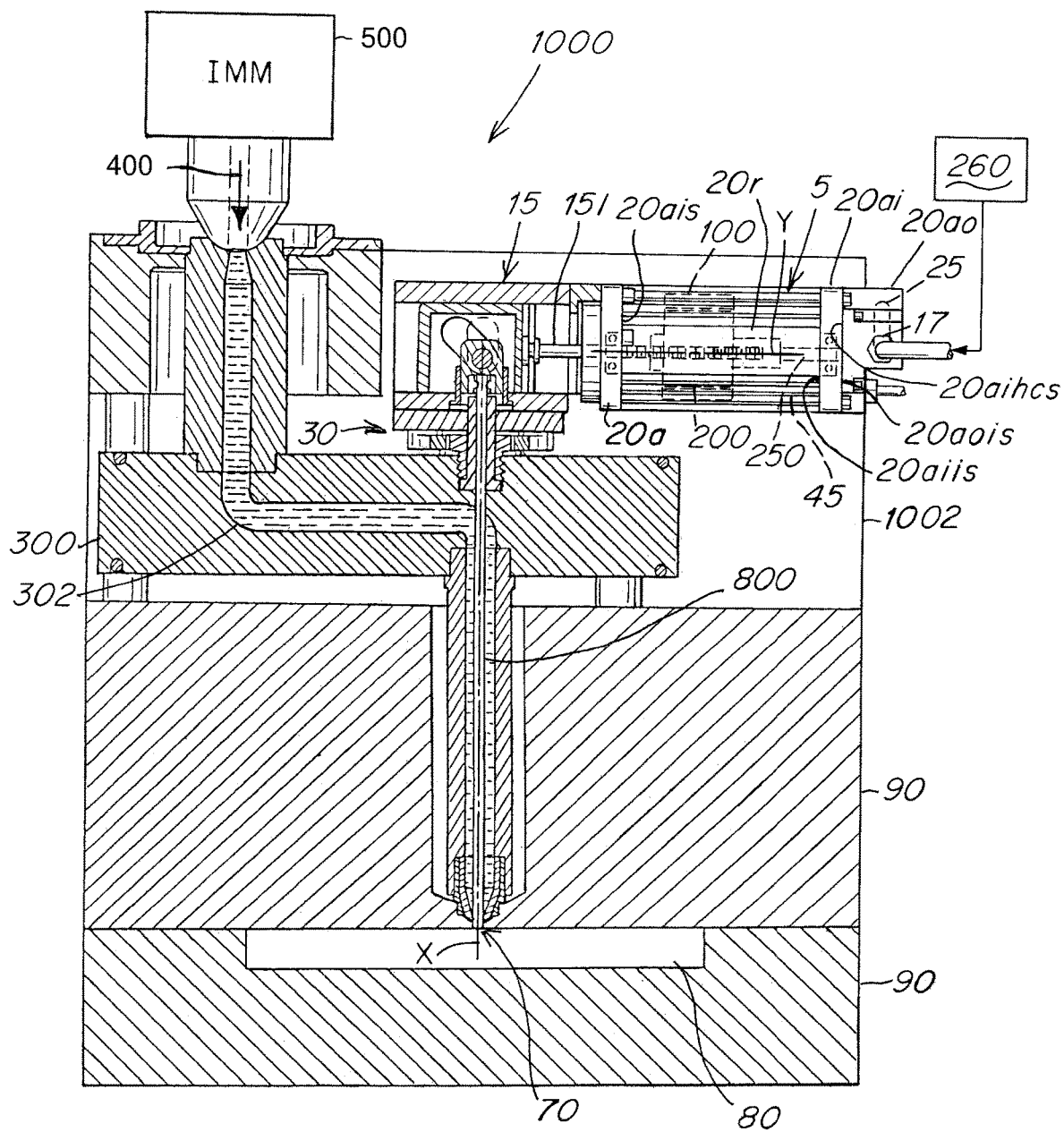
FIG. 2 is a side sectional view of the FIG. 1 system.
Figure 3:
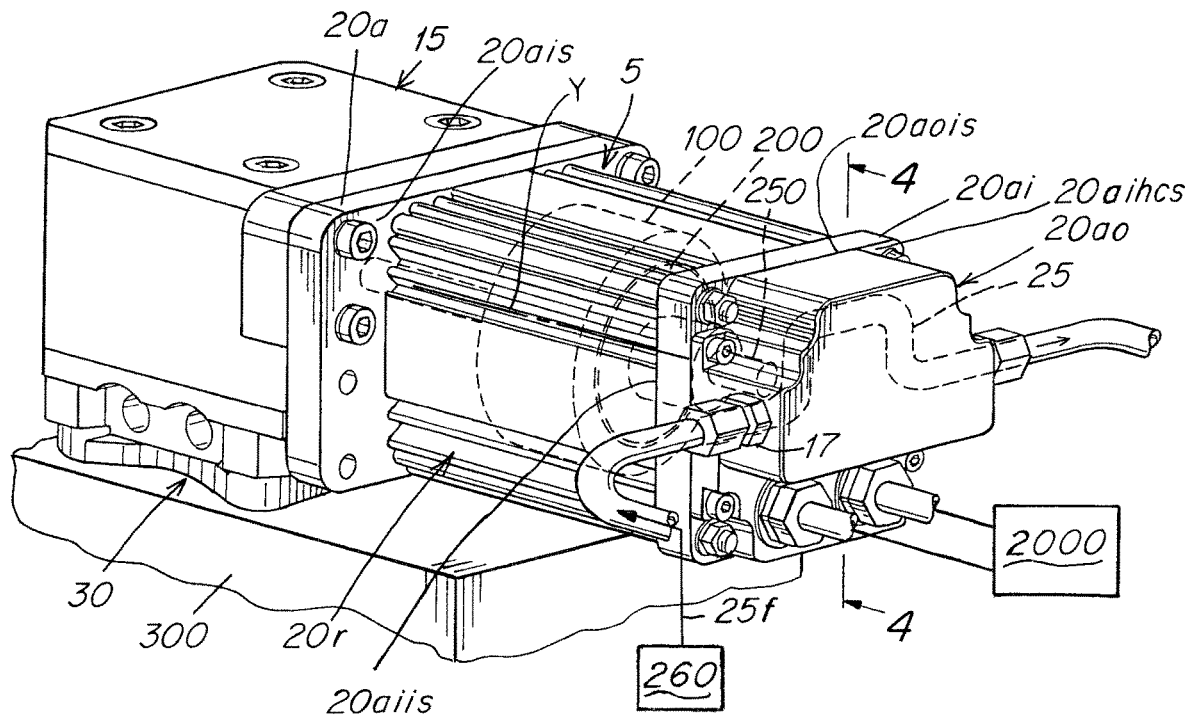
FIG. 3 is a top rear left perspective view of an injection molding system similar to the FIG. 1 system showing a specific configuration of a distal end housing cooling component with a specific configuration of actively cooled channels incorporated into the body of the component.

FIGS. 1, 2, 3, 4, 5, 6, 7, 8, 9 show an injection molding system (1000) comprised of an injection molding machine (500) that injects a flow of injection fluid (400) to a heated manifold (300) that distributes the injection fluid (400) to a flow channel 302 of a manifold 300 that delivers the injection fluid to a gate (70) of a mold cavity (80).

Figure 4:
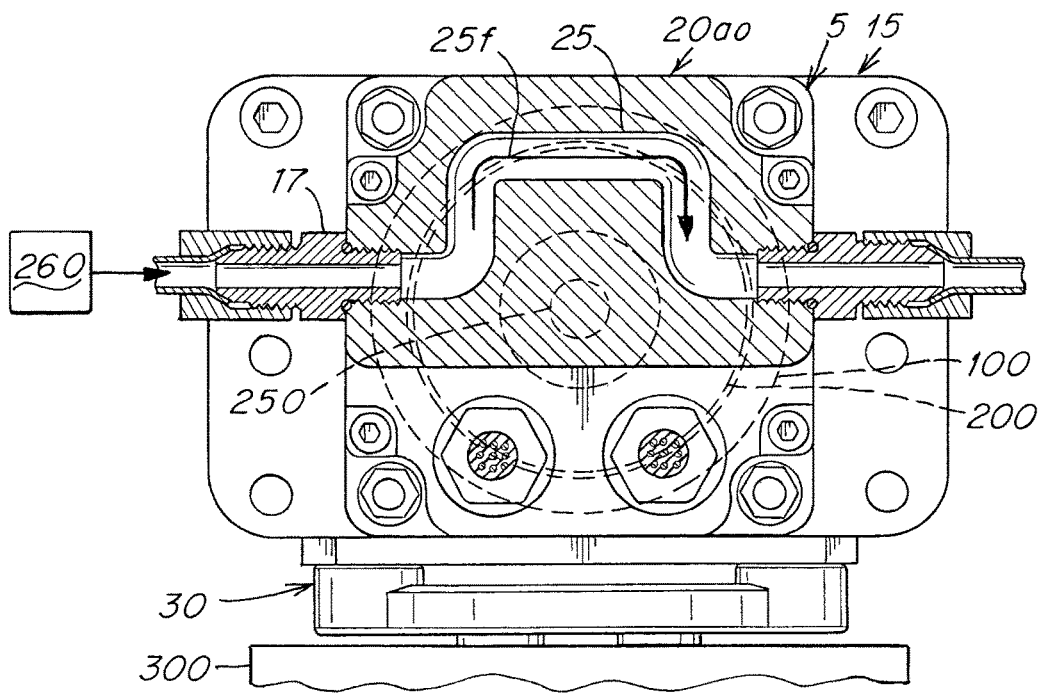
FIG. 4 is a sectional end view of the FIG. 3 system along lines 4-4 showing details of the distal end cooling housing component.
Figure 5:
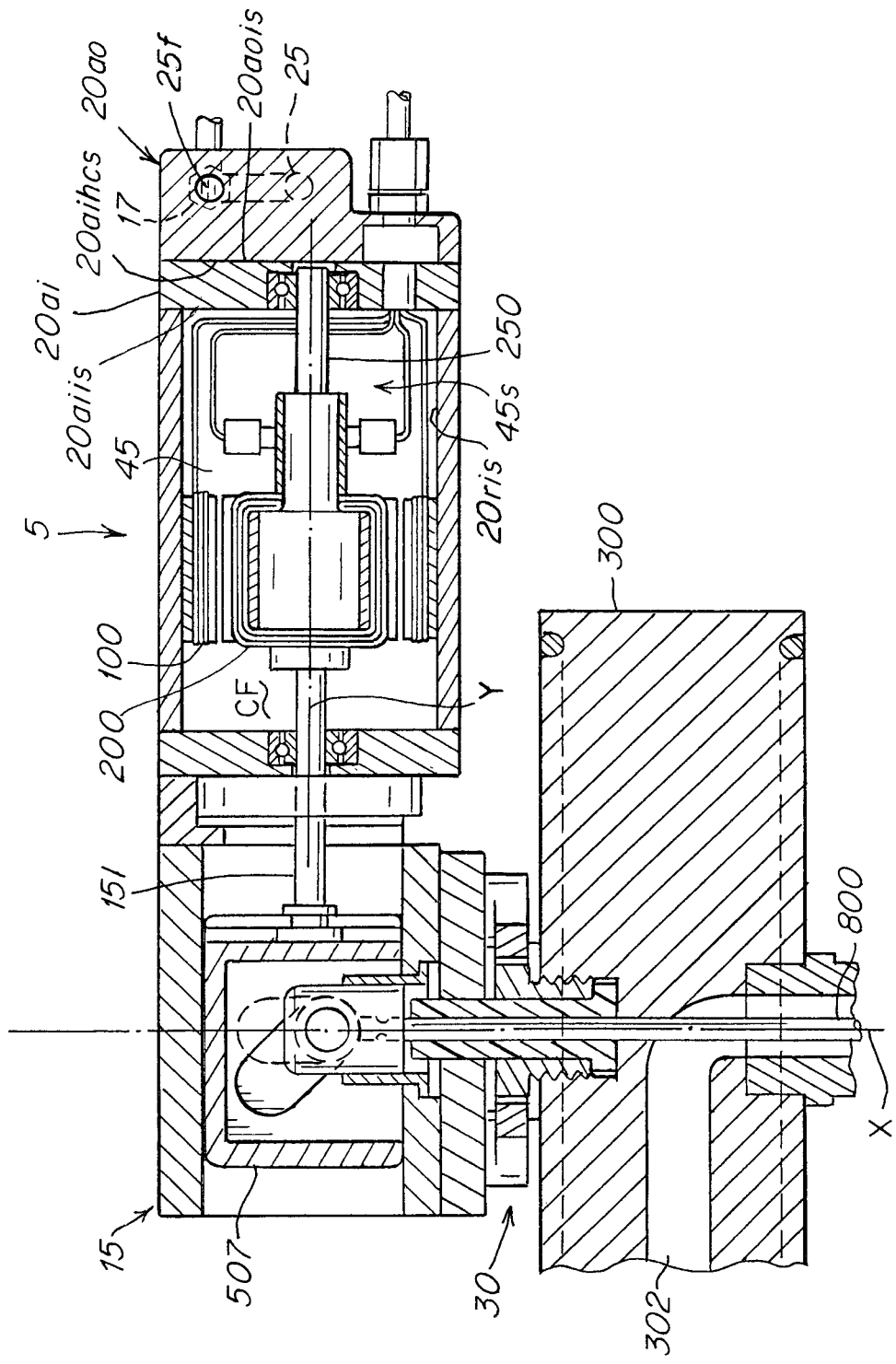
FIG. 5 is a side sectional view of the FIG. 3 injection molding system showing details of the rotor and driver, stator and armature, components and the manner in which they are mounted within the actuator housing.
Figure 6:
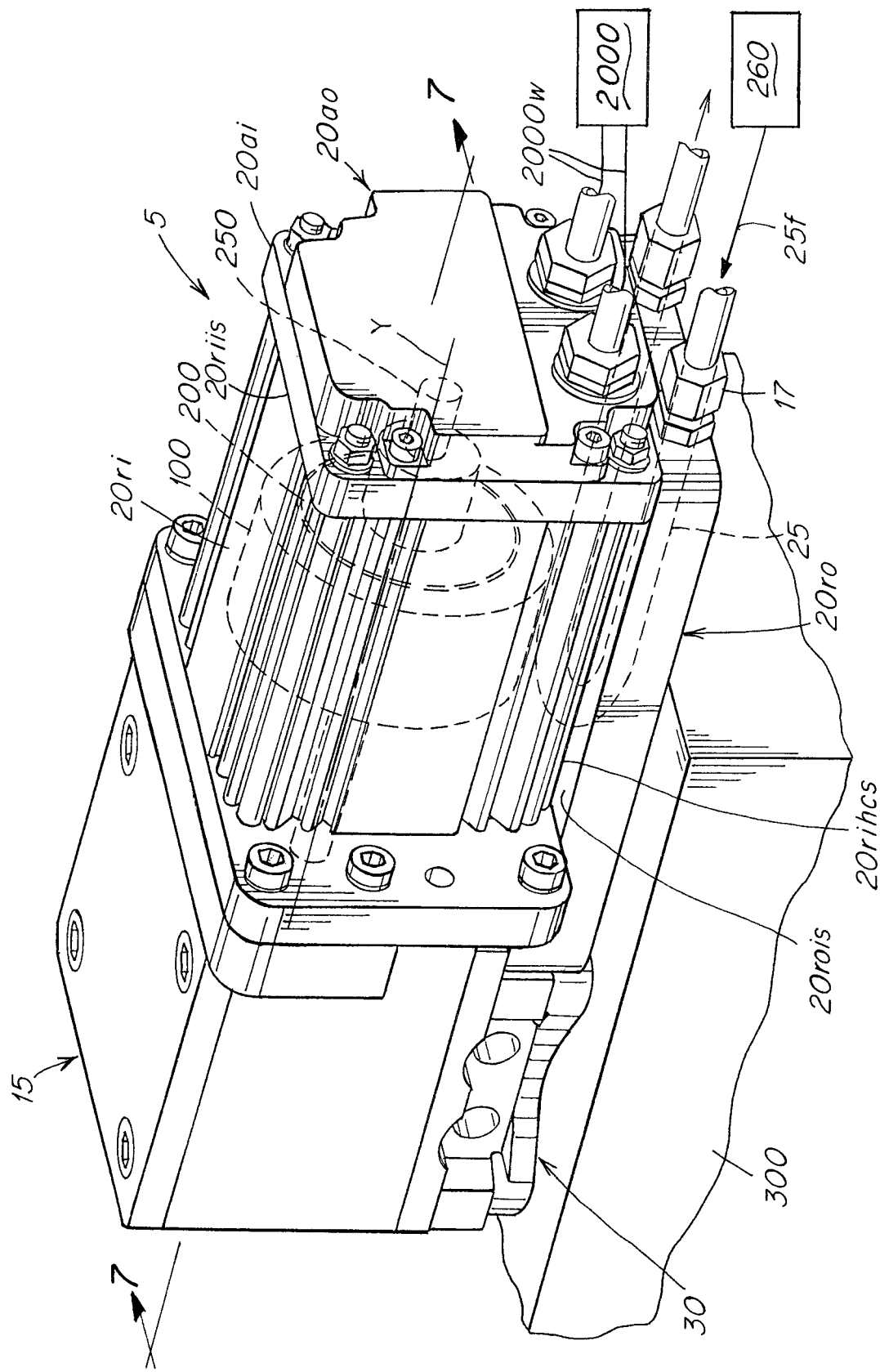
FIG. 6 is a top left rear perspective view of an injection molding system similar to the FIGS. 1 and 3 systems, except the housing cooling component is disposed and extends along a bottom radial wall of the housing with actively cooled cooling channels disposed within the radial wall.
Figure 7:
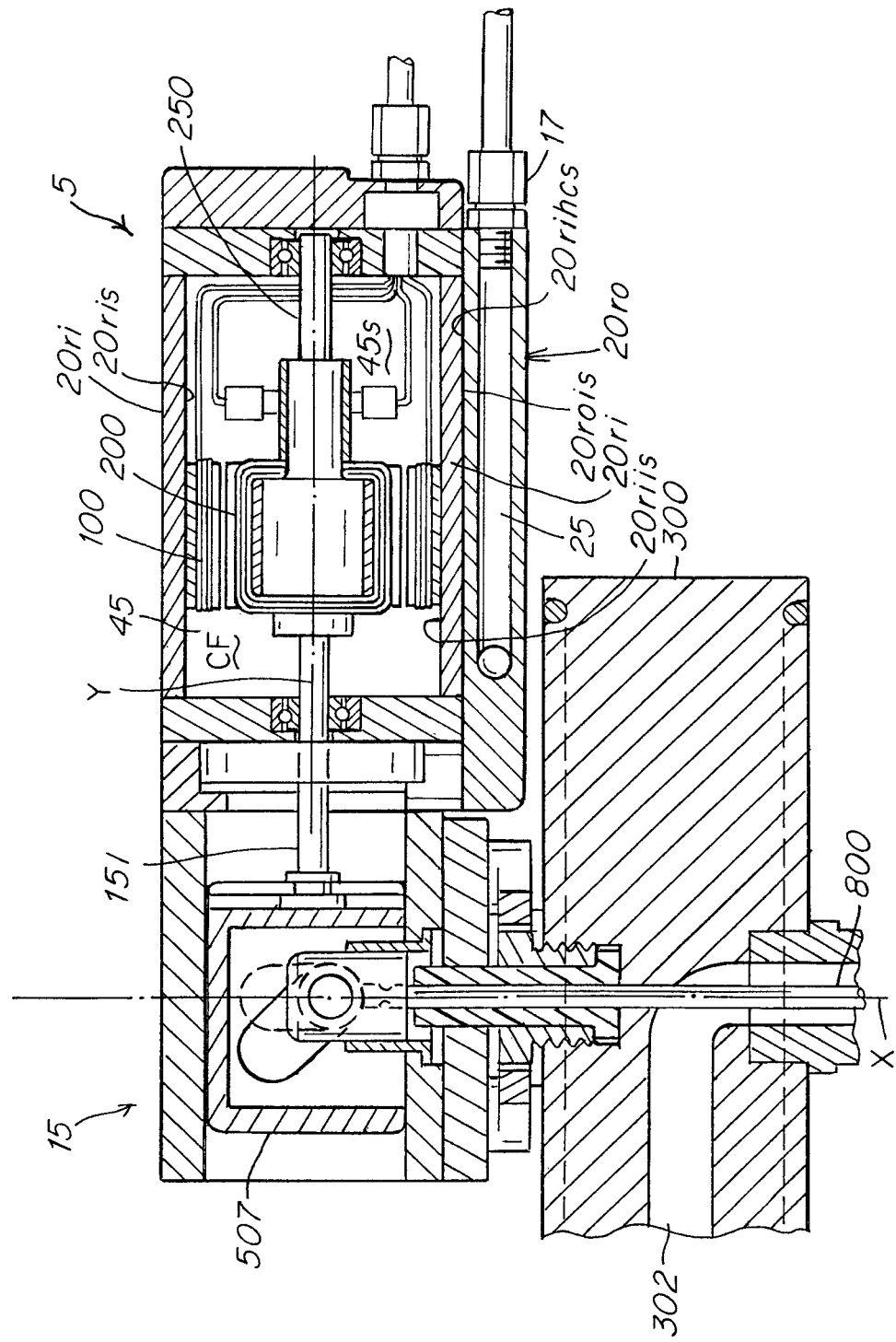
FIG. 7 is a side sectional view of the FIG. 6 system along lines 7-7 of FIG. 6.

The system includes an actuator (5) comprised of a rotor (250) having a drive axis (Y) and a driver (100, 200) interconnected to the rotor (250) adapted to drive the rotor around the drive axis, the driver (100, 200, FIGS. 1, 4, receiving electrical energy or power that generates drive heat.

The actuator (5) has a housing (20) comprised of radial (20r, 20ri, 20rit, 20ro, 20roa, 20rob, 20roc, 20rod) and axial walls (20a, 20ai, 20aue, 20ade) that form an enclosed chamber (45) containing a heat conductive chamber fluid (CF), the rotor and driver (250, 100, 200) being mounted within the chamber (45) in intimate heat conductive contact with the heat conductive fluid. The radial walls 20r, 20ri, 20ro, 20roa, 20rob, 20roc, 20rod are generally disposed in a radial position or location relative to the axis Y of the rotor 250. And, the axial walls are generally disposed in an axial position or location relative to the axis Y of the rotor 250.

The radial 20r, 20ri, 20rit, 20ro, 20roa, 20rob, 20roc, 20rod walls and the axial walls 20a, 20ai, 20aue, 20ade are interconnected to form an independent housing body 20 that is typically removably attached to and preferably readily detachable from the housing 120 of a linear travel converter or transmission 15. The housing 120 of the linear travel converter or transmission typically comprises one or more converter or transmission walls (120r, 120rb, 120rc, 120ri, 120ro, 120a) that are comprised of a heat conductive material. The converter or transmission walls (120r, 120rb, 120rc, 120ri, 120ro, 120a) are typically mounted to the heated manifold (300) in an arrangement such that the manifold heat 300 is communicated to the converter or walls (120r, 120rb, 120rc, 120ri, 120ro, 120a).

As shown in FIGS. 3, 4, 5, 6, 7, 11, 12, 13, one or more of the radial and axial walls (20r, 20ro, 20ri, 20roa, 20rob, 20roc, 20rod, 20a, 20ai, 20aue, 20ade) are disposed in heat conductive contact or communication with heat generated by the manifold (300) or heat generated within the enclosed chamber (45). One or more of the radial or axial walls of the actuator housing comprise a first unitary body (20r, 20a, 20ri, 20ai) that is comprised of a heat conductive material having an inner surface (20ris, 20ais, 20riis, 20aiis) disposed in intimate heat conductive contact with the interior space (45s) of the chamber. One or more of the radial or axial walls comprise a second unitary body (20ro, 20ao) comprised of a heat conductive material that has an inner surface (20rois, 20aois) in intimate heat conductive contact or communication with a heat communicating surface (20rihcs, 20aihcs) of the first unitary body (20ri, 20ai) or of one or more intermediate unitary bodies (not shown) that are comprised of a heat conductive material and have a second inner surface (20riis, 20aiis) that is disposed in intimate heat conductive contact or communication with the interior space (45s) of the chamber (45).

The actuator tube or channel (25) is disposed within the second unitary body (20ro, 20ao). The first unitary body (20r, 20a, 20ri, 20ai) is typically comprised of a heat insulative material and the second unitary body (20ro, 20ao) is typically comprised of a highly heat conductive material.

In embodiments in which an actuator or converter housing wall includes two or more unitary wall bodies, such as a first inner wall body (20r, 20a, 20ri, 20ai, 120r, 120a, 120ri, 120ai) and a second outer body (20ro, 20ao, 120ro, 120ao), the outer wall body is preferably attached to an inner wall body in compressed surface to surface contact such that the attached two or more unitary wall bodies function as a single wall body for purposes of heat absorption and dissipation, the active cooling channel in the outer wall body acting to receive and dissipate heat from the one or more inner wall bodies to which the outer wall body is attached as if the cooling channel were disposed within the inner wall body.

Figure 45:
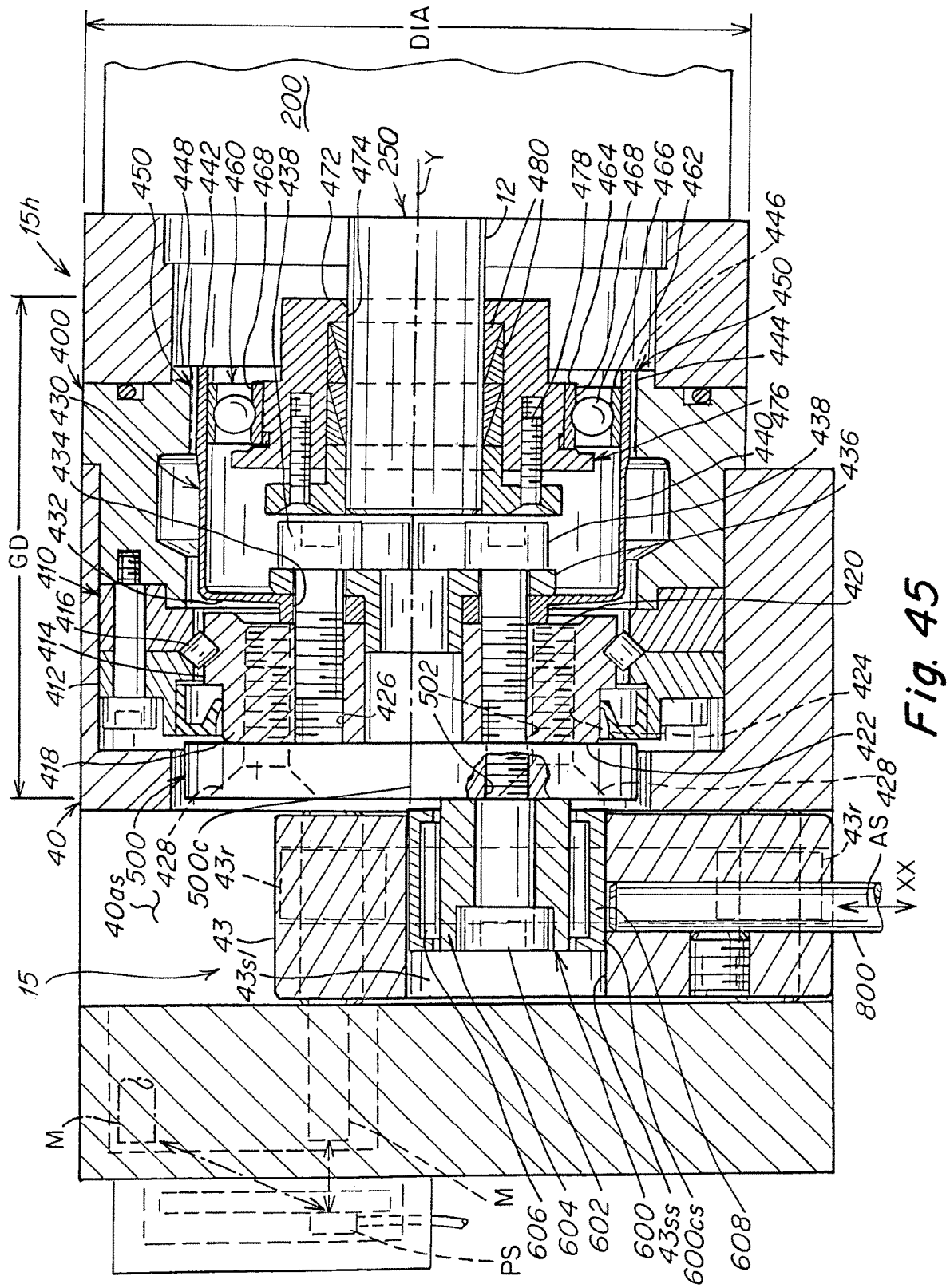
FIG. 45 is a side sectional view of the FIG. 44 device with its components assembled into operating condition.
Figure 46:
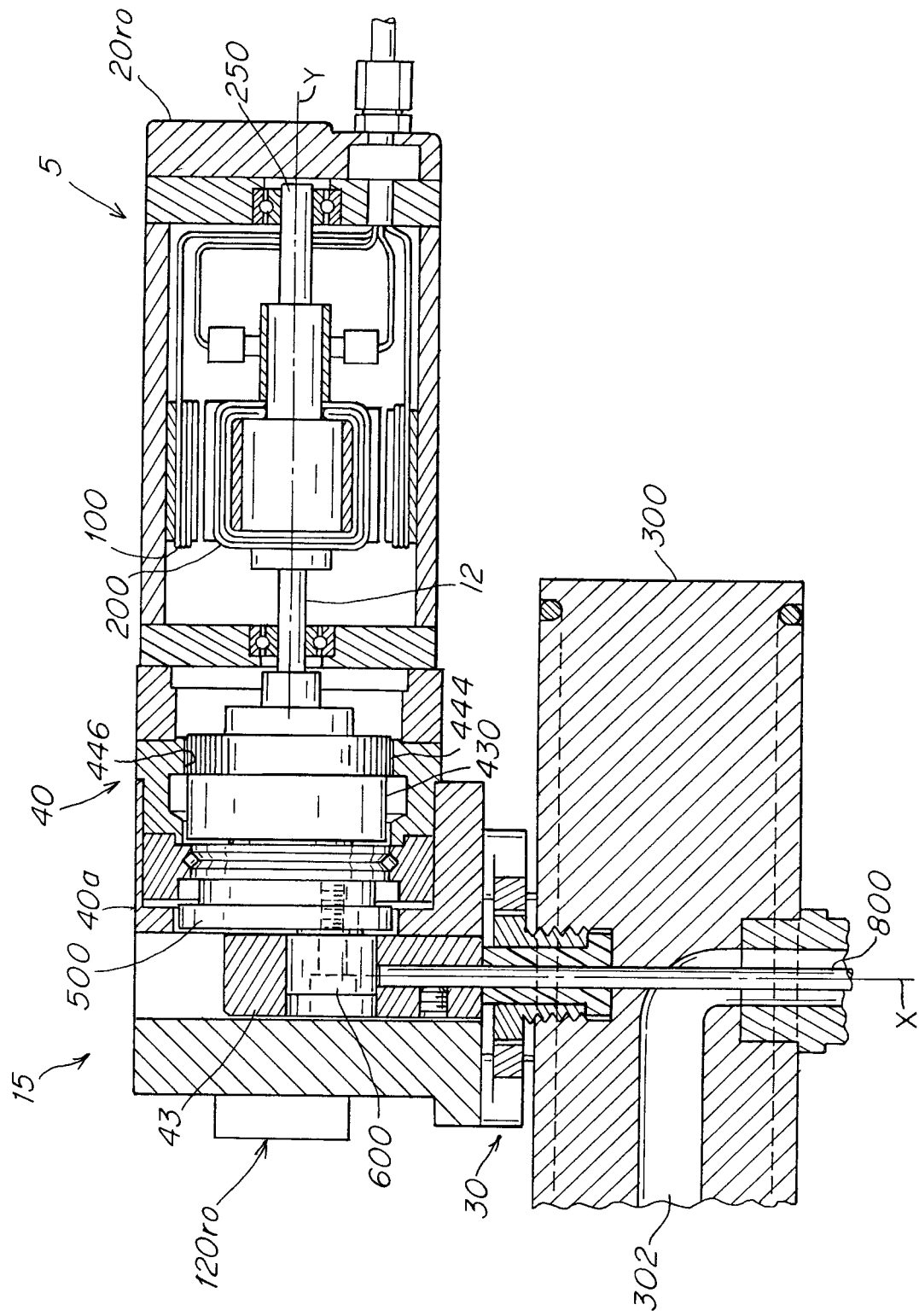
FIG. 46 is a side sectional schematic view of an electric actuator having an end wall incorporating active cooling channels, the actuator interconnected to a rotational speed reducing device as depicted in FIG. 44 where and end wall 120ro of the housing for the speed reducing device has active cooling channels incorporated.
Figure 47:
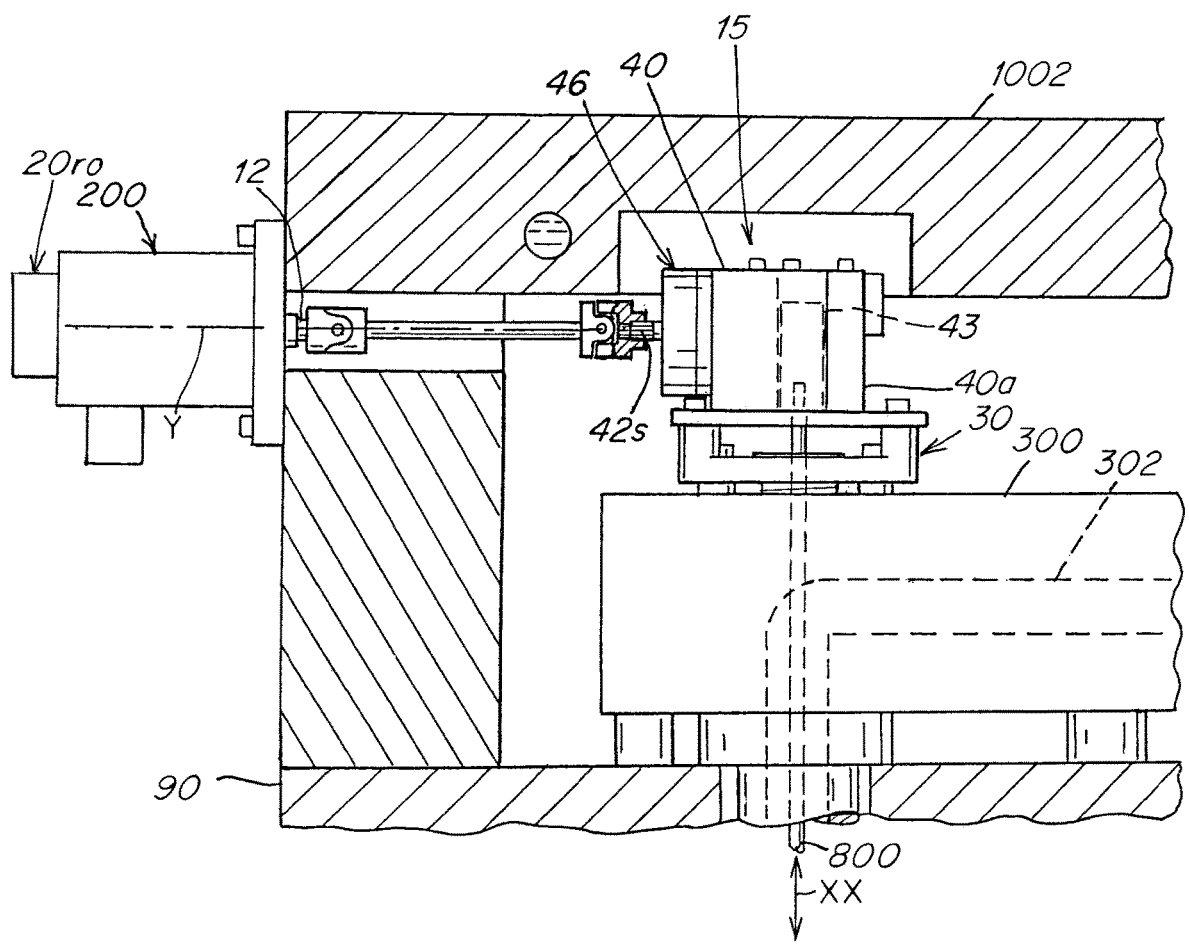
FIG. 47 is a side schematic view of a system with an electric actuator having an end wall with active cooling channels remotely mounted and interconnected via an extended drive shaft to a rotary to a rotational speed reducing device as shown in FIG. 44, the axis of the rotor and the axis of the valve pin being arranged in a non coaxial relationship relative to each other.

The drive components 100, 200 of the motor when supplied with electrical power to drive the rotor 250 become heated and in turn heat the gas or fluid CF that resides or is contained or enclosed within the motor chamber 45 with which the drive components 100, 200 are in contact with. The drive components 100, 200 are typically comprised of conventional electric motor stator and armature copper or other electrically conductive metal wires or coils, FIGS. 45-47. Thus when the coils or wires 100, 200 are heated, the gas CF within the chamber 45 is heated and the heated gas CF in turn heats up the housing walls 20r, 20ro, 20ri, 20roa, 20rob, 20roc, 20rod, 20a, 20ai, 20aue, 20ade which the heated gas CF is in contact with. The rotor 250 and driver 100, 200 are rotatably supported within the chamber by the radial and axial walls (20r, 20ro, 20ri, 20roa, 20rob, 20roc, 20rod, 20a, 20ai, 20aue, 20ade).

The driver 100, 200 is controllably drivable by a controller 2000 that includes a program that can be programmed to controllably position the axial or linear position of one or more valve pins driven by associated actuator motors that may be contained within any injection molding system 1000.

One or more of the radial and axial walls (20*r*, 20*ro*, 20*ri*, 20*roa*, 20*rob*, 20*roc*, 20*rod*, 20*a*, 20*ai*, 20*aue*, 20*ade*) are comprised of a heat conductive material, such as steel, aluminum or the like. One or more of the walls have an inner surface, 20*is*, 20*iis*, 20*ais*, disposed in heat conductive contact with the heat conductive fluid (CF) contained within the enclosed chamber 45. The one or more radial or axial walls (20*r*, 20*ro*, 20*ri*, 20*roa*, 20*rob*, 20*roc*, 20*rod*, 20*a*, 20*ai*, 20*aue*, 20*ade*) absorb heat from the heat conductive fluid (CF) contained within the chamber (45).

An actuator tube or channel (25) is typically embedded or bored or formed within the solid material body of selected ones of the radial or axial walls (20*r*, 20*ro*, 20*ri*, 20*roa*, 20*rob*, 20*roc*, 20*rod*, 20*a*, 20*ai*, 20*aue*, 20*ade*) such that the tube or channel is surrounded around its circumference by and maintained in intimate heat conductive contact or communication with the heat conductive material of which a radial or axial wall is comprised.

A source (260) of heat absorptive fluid (25*f*) which is typically actively cooled, is sealably interconnected to the tube or channel (25) such that the fluid is actively pumped or routed through the tube or channel (25) in a flow that absorbs and transports heat away from the one or more actuator heat conductive walls (20*r*, 20*ro*, 20*ri*, 20*roa*, 20*rob*, 20*roc*, 20*rod*, 20*a*, 20*ai*, 20*aue*, 20*ade*) typically to a larger actively cooled source of the fluid. The cooling fluid 25*f* typically comprises water, antifreeze or a similar inert fluid that can be readily pumped through the cooling channels or pipes 25. Where a tube, as opposed to a bore in the wall material, is used as the vehicle for cooling fluid flow, the tube 25 is typically comprised of a highly heat absorptive or conductive material such as copper or the like. And where a tube is used, the tube is embedded within the body of the wall material such that the outer circumference of the walls of the tube are in intimate heat conductive contact with the wall material.

As shown, a valve pin (800) having a pin axis (X), the valve pin is interconnected to the rotor (250) such that the valve pin is oriented or disposed along a linear path of travel (XX) that is typically coaxial with the pin axis (X).

The system 1000 includes a heated manifold (300) that generates manifold heat. The housing (20) of the actuator 5 is typically mounted in heat conductive communication with the heated manifold (300) such that manifold heat is absorbed by or communicated to the one or more radial and axial walls (20*r*, 20*ro*, 20*ri*, 20*roa*, 20*rob*, 20*roc*, 20*rod*, 20*a*, 20*ai*, 20*aue*, 20*ade*) of the housing.

The one or more radial or axial walls can comprise a unitary body (20*r*, 20*ro*, 20*a*, 20*a0*) comprised of the heat conductive material. The unitary wall body has an inner surface (20*ris*, 20*ais*) that can be disposed directly in intimate heat conductive contact with the fluid (CF) contained within the chamber.

Alternatively, the radial or axial walls of the actuator 5 can comprise a first outer unitary body that is mounted or attached to a second inner or intermediate unitary wall body (20*ri*, 20*ai*). In such an embodiment the outer unitary body has an inner surface (20*rois*, 20*aois*) that is disposed in intimate heat conductive contact with an intermediate heat communicating surface (20*rihcs*, 20*aihcs*) of the inner or intermediate unitary body (20*ri*, 20*ai*). In such an embodiment, the inner or intermediate wall body is comprised of a heat conductive material having a second inner surface (20*riis*, 20*aiis*) that is disposed in direct intimate heat conductive contact with the fluid (CF) contained within the chamber (45).

In embodiments where the one or more radial or axial walls comprise a first outer unitary body (20*ro*, 20*a0*) and a second inner or intermediate unitary body (20*ri*, 20*ai*), first or outer unitary body is typically comprised of a first heat conductive material that is a heat insulative or low-heat conductive material such as titanium. And, the second outer or intermediate unitary wall body is typically comprised of a highly heat conductive material such as copper, aluminum or the like.

The system can further comprise a linear travel converter (15) interconnected between the rotor (250) and the valve pin (800) in an arrangement that converts rotation movement of the rotor to linear movement (XX) of the valve pin (800). The linear travel converter (15) typically comprises a converter housing (120) that is comprised of one or more converter walls (120*r*, 120*rb*, 120*rc*, 120*ri*, 120*ro*, 120*a*) that are comprised of a heat conductive material. The converter walls (120*r*, 120*rb*, 120*rc*, 120*ri*, 120*ro*, 120*a*) can be mounted to the heated manifold (300) in an arrangement such that the manifold heat is communicated to the converter walls (120*r*, 120*rb*, 120*rc*, 120*ri*, 120*ro*, 120*a*).

The converter tube or channel (125) is typically embedded or bored within the body of selected ones of the converter walls (120*r*, 120*rb*, 120*rc*, 120*ri*, 120*ro*, 120*a*) such that the tube or channel 125 is surrounded by and disposed in intimate heat conductive contact with the heat conductive material of one or more of the converter walls (120*r*, 120*rb*, 120*rc*, 120*ri*, 120*ro*, 120*a*).

A source of heat absorptive fluid (125*f*) as described above is typically sealably interconnected to the converter tube or channel (125) in an arrangement such that the heat absorptive fluid (125*f*) is actively pumped or routed through the converter tube or channel (125) in a flow that absorbs the manifold heat communicated to the converter walls.

One or more of the converter walls (120*r*, 120*rb*, 120*rc*, 120*ri*, 120*ro*, 120*a*) can have an outer surface (120*aos*, 120*ros*) that is disposed in heat conductive communication or contact with a heat conductive surface (20*aos*) of one or more of the radial and axial walls (20*r*, 20*ro*, 20*roa*, 20*rob*, 20*roc*, 20*rod*, 20*a*, 20*aue*, 20*ade*) of the actuator (5) such that heat absorbed by or contained with the converter walls is conducted or transmitted to or from the actuator walls.

One or more of the converter walls (120*r*, 120*rb*, 120*rc*, 120*ri*, 120*ro*, 120*a*) can have an inner surface (120*ris*, 120*ais*) that disposed in heat conductive communication with a linear travel device (127) that is interconnected between the rotor (250) and the valve pin to convert rotation movement of the rotor to linear movement (XX) of the valve pin (800). In such an embodiment the converter walls are arranged so as to form an enclosure or chamber 55, 127*c*, FIGS. 7, 50 within which the linear travel device 127 is mounted or disposed. The inner surface (120*ris*, 120*ais*) of the converter walls is typically in heat conductive contact or communication with the linear travel device 127.

One or more of the converter walls can comprise a unitary body comprised of a heat conductive material (120*r*, 120*a*, 120*ro*, 120*ao*) that has an inner surface 120*ris*, 120*ais* that is in direct heat conductive or communicative contact with the chamber 127*c* or the linear travel device 127 itself.

In an alternative embodiment the one or more converter walls can comprise a first outer unitary body (120*ro*, 120*ao*) of heat conductive material and a second intermediate or inner unitary body (120*ri*) to which the first outer unitary body is attached. In such an embodiment, the outer or first unitary body 120*ro*, 120*ao* has an inner surface (120*rois*) in heat conductive contact with a heat communicating surface (120*rihcs*) of the inner or intermediate unitary body (120*ri*).

The inner or intermediate unitary body is comprised of a heat conductive material having a second inner surface (20*riis*) that is disposed in heat conductive contact or communication with the linear travel device 127 or with the air or gas contained within the chamber 55, 127*c*.

Figure 42:
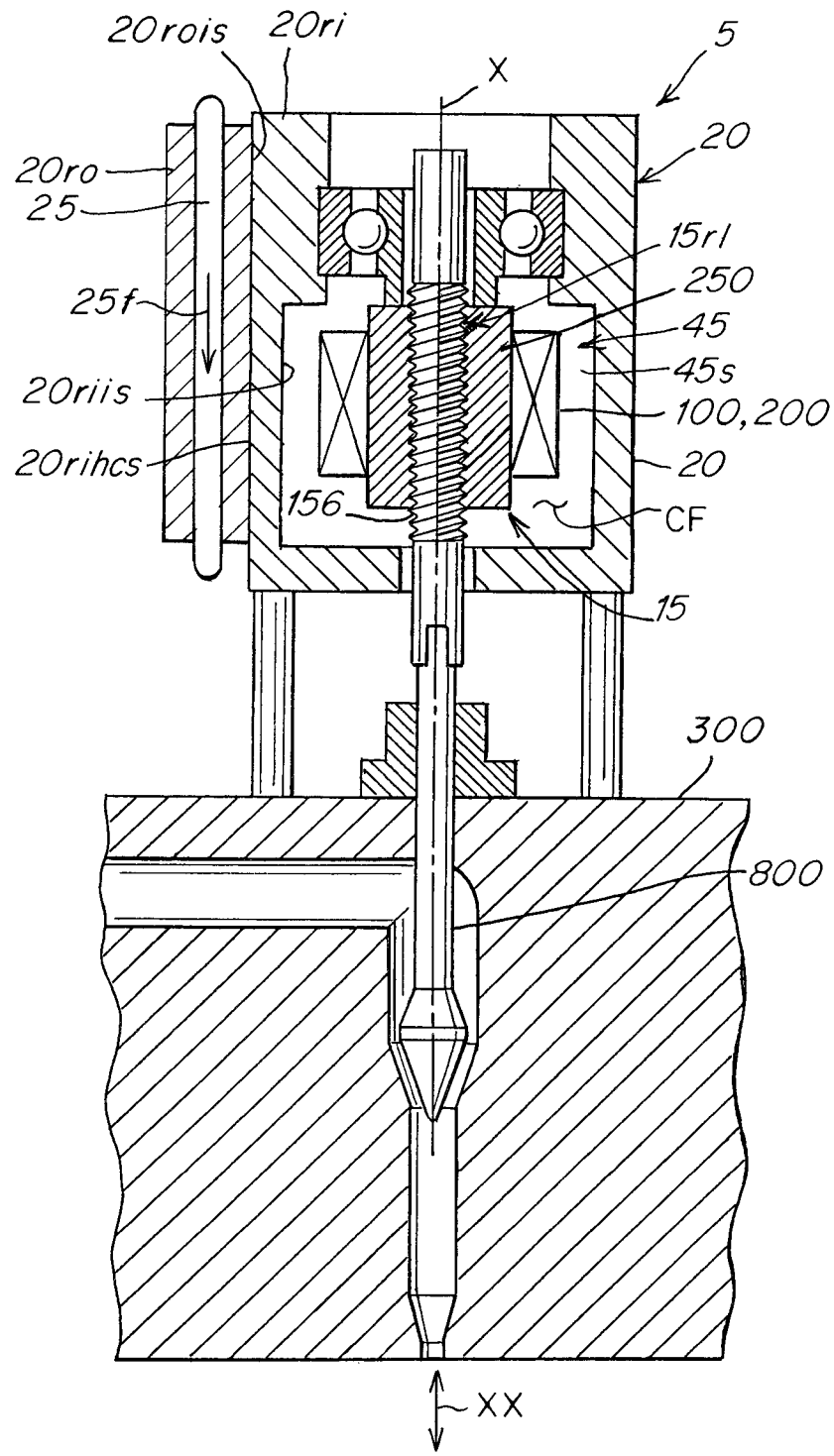
FIG. 42 is a sectional view of a system comprised of an electric actuator with both a driver and gear transmission housed within the housing of the actuator, the housing having a radial side wall with active cooling channels incorporated into the radial side wall and with the axis of the rotor coaxial with the axis of the valve pin.

In another alternative embodiment, FIG. 42, the linear travel converter (15) can be mounted within the same enclosed chamber 45 as the driver 100, 200 in contact with the heat conductive chamber fluid (CF). In such an embodiment, the housing (20) of the actuator is typically mounted in heat conductive communication with the heated manifold (300) such that manifold heat is absorbed by or communicated to the one or more radial and axial walls (20*r*, 20*ro*, 20*ri*, 20*roa*, 20*rob*, 20*roc*, 20*rod*, 20*a*, 20*ai*, 20*aue*, 20*ade*) of the housing 20. The heat absorptive fluid (25*f*) is routed in a flow such that the manifold heat is absorbed by or communicated to the one or more radial and axial walls (20*r*, 20*ro*, 20*ri*, 20*roa*, 20*rob*, 20*roc*, 20*rod*, 20*a*, 20*ai*, 20*aue*, 20*ade*) of the housing. In such an embodiment, the rotor axis Y and the travel axis of the valve pin X, XX are typically adapted to be coaxial.

A system according to the invention can include a transmission that is typically comprised of one or more gears, racks, screws or nuts (16*a*, 16*b*, 72, 190, 191, 195, 950, 960, 970) that are adapted to convert rotational movement of the rotor (250) around the rotor axis Y to linear movement of the valve pin along an axis (X, XX) that is non-coaxial relative to the rotor axis (Y). In such an embodiment, one or more of the transmission walls (120*r*, 120*ro*, 120*ri*, 120*a*, 120*ao*, 120*ai*) form an enclosed chamber 55 that houses or encloses one or more of the gears, racks, screws or nuts (16*a*, 16*b*, 72, 190, 191, 195, 950, 960, 970). The one or more transmission walls (120*r*, 120*ro*, 120*ri*, 120*a*, 120*ao*, 120*ai*) are typically comprised of a heat conductive material. A converter tube or channel (125) is embedded within or surrounded by and in intimate heat conductive contact with the heat conductive material of which the one or more of the transmission walls (120*r*, 120*ro*, 120*ri*, 120*a*, 120*ao*, 120*ai*) is comprised. As described above with reference to the actuator housing walls, a source of heat absorptive fluid (125F) is sealably interconnected to the converter tube or channel (125) in an arrangement such that the heat absorptive fluid (125*f*) is pumped or routed through the converter tube or channel (125) in a flow that absorbs heat absorbed by or communicated to the one or more transmission walls (120*r*, 120*ro*, 120*ri*, 120*a*, 120*ao*, 120*ai*).

Figure 40:
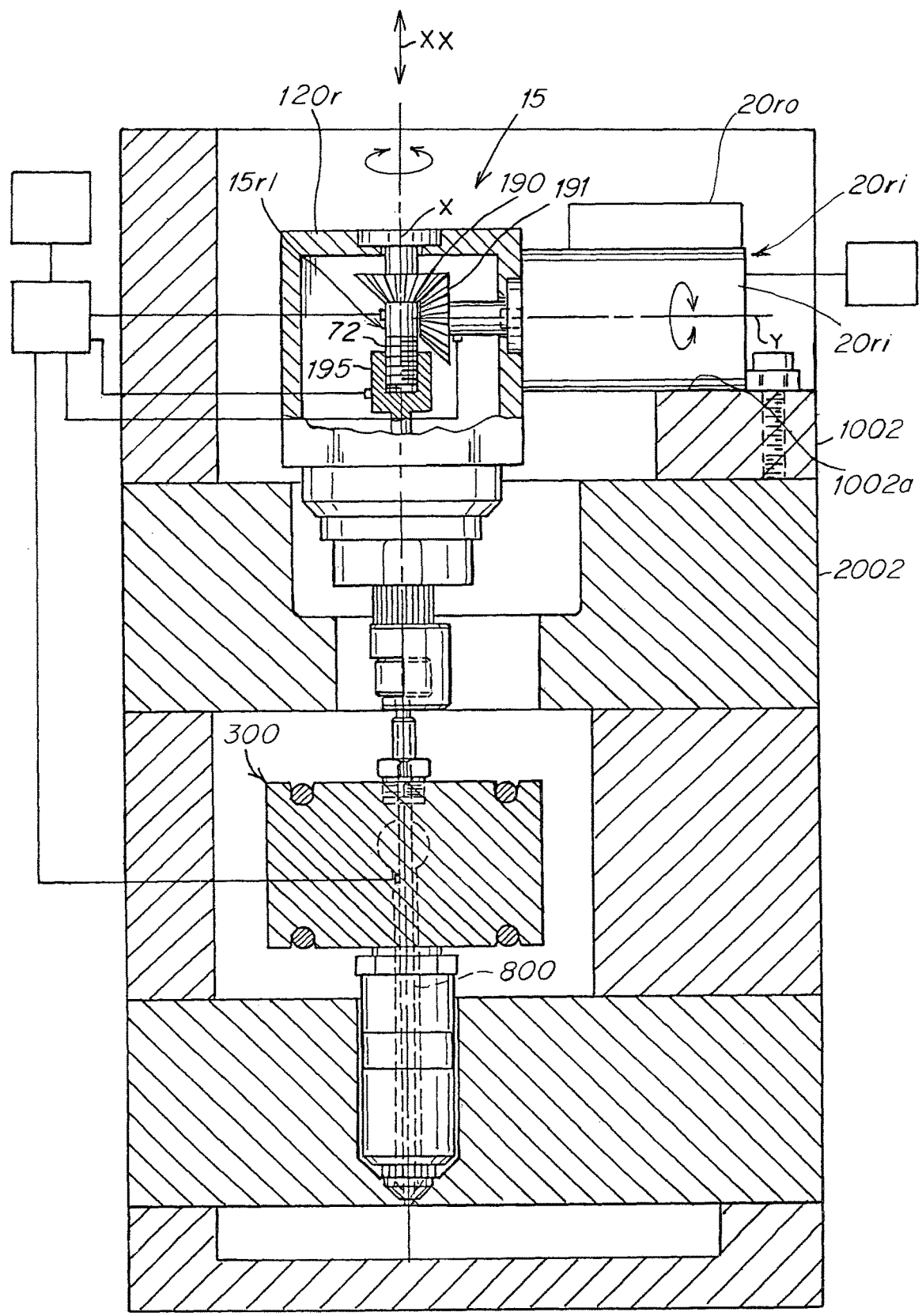
FIG. 40 is a view similar to FIG. 39 showing the housing of the electric actuator including an actively cooled radial side wall.
Figure 41:
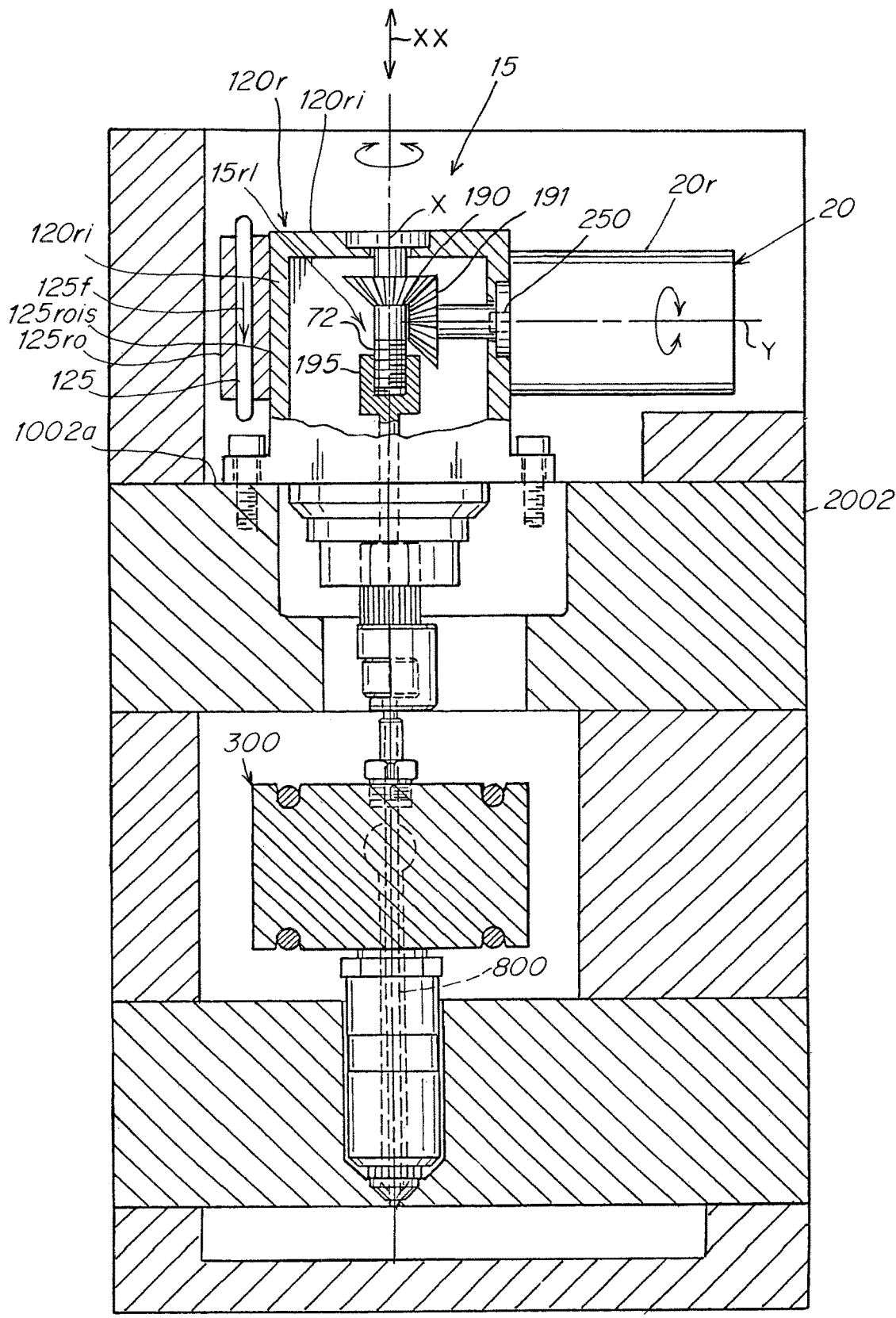
FIG. 41 is a view similar to FIG. 40 showing the housing of the rotary to linear converter including an actively cooled radial side wall.
Figure 43:
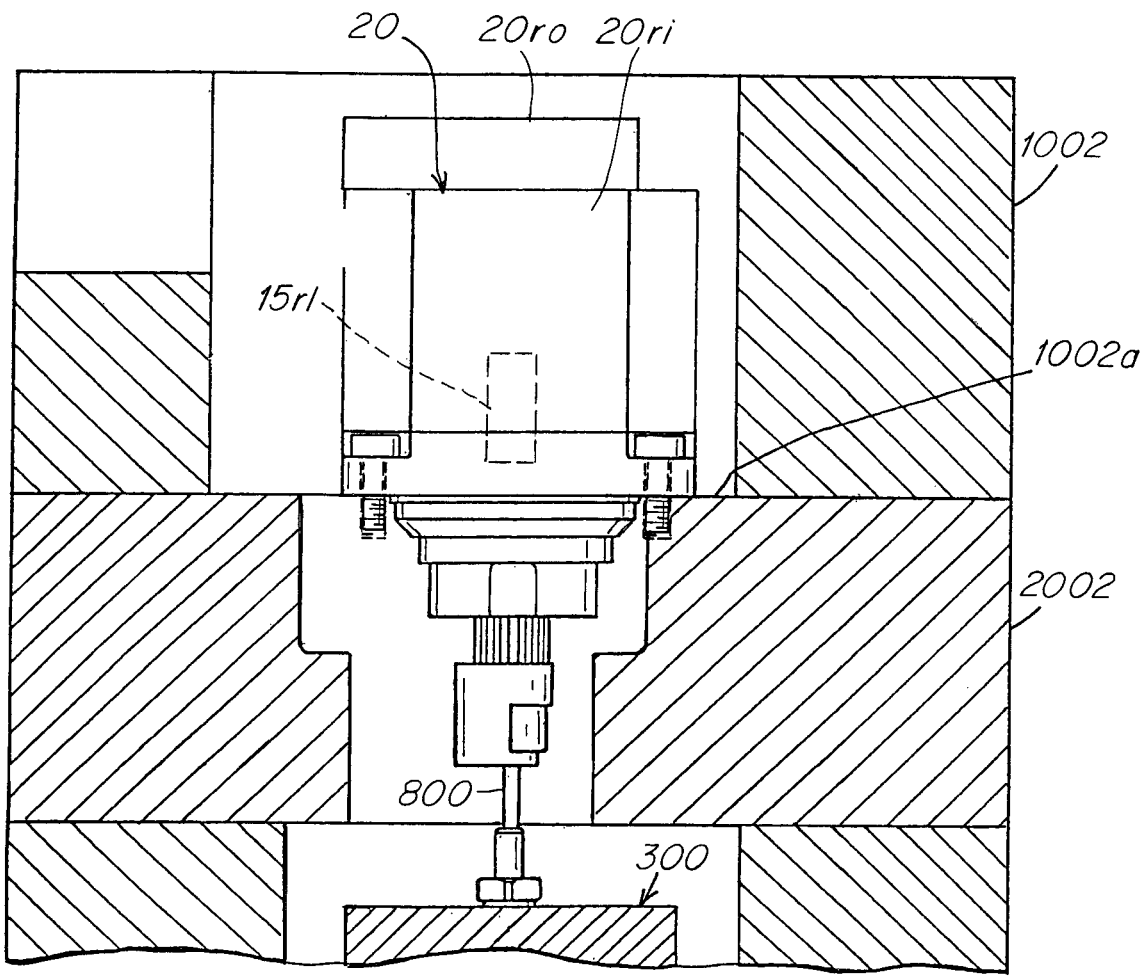
FIG. 43 is a schematic view showing an actuator similar to the actuator of FIG. 42 with active cooling channels incorporated into an end wall of the housing of the actuator, with the actuator additional being removably mounted to a top clamp plate that is itself cool or actively cooled relative to the heated manifold.
Figure 44:
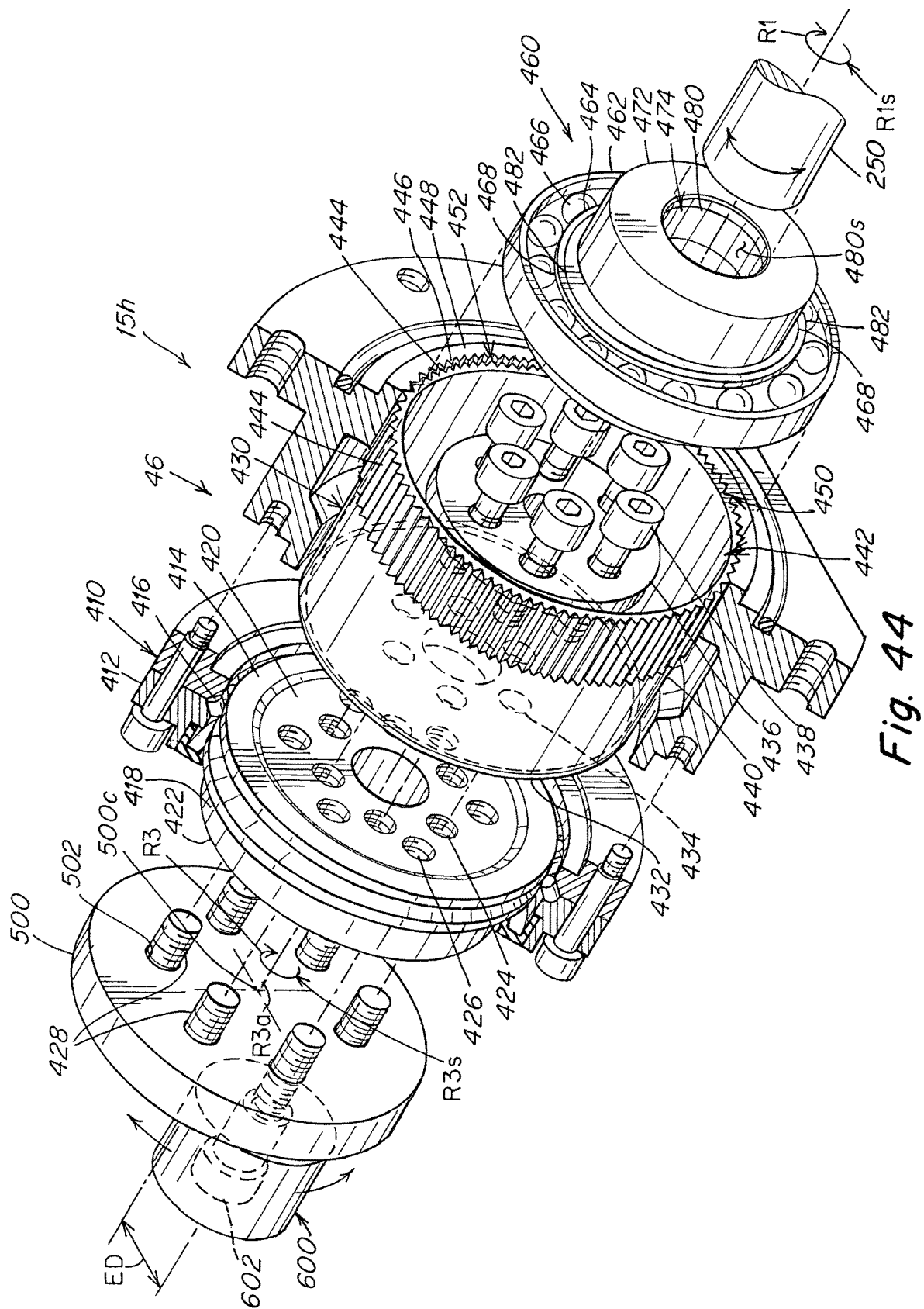
FIG. 44 is an exploded view of a harmonic gear transmission rotational speed reducing device with eccentric pin drive connection that can be interconnected to the rotor of an electric motor for use in an embodiment of the invention.

In an alternative embodiment, as shown for example in FIGS. 40, 41, 43 the actuator housing 20 can be removably mounted and attached to a top clamping or mounting plate 1002 that is mounted upstream of the manifold 300 and interconnected to the mold. The clamping or mounting plate 1002 is typically maintained in a cool condition relative to the heated manifold either by being mounted in spaced apart relationship to the heated manifold 300 or by active cooling with fluid channels or tubes fed with cooling fluid, the channels or tubes being embedded within the clamp plate 2002 in intimate contact with the body of the clamp plate 1002.

In another alternative embodiment as shown for example in FIG. 41, the housing 120 of the linear travel converter 15 can be mounted and removably attached to a top clamping or mounting plate 1002 that is mounted upstream of the manifold and interconnected to the mold. Again, the clamping or mounting plate 1002 is typically maintained in a cool condition relative to the heated manifold either by being mounted in spaced apart relationship to the heated manifold 300 or by active cooling with fluid channels or tubes fed with cooling fluid, the channels or tubes being embedded within the clamp plate 2002 in intimate contact with the body of the clamp plate 1002.

Typically one or the other or both of the linear travel converter 15 and the actuator 20 is mounted to the heated manifold 300

The actuator typically has a housing (20) comprised of radial (20*r*, 20*ri*, 20*ro*, 20*roa*, 20*rob*, 20*roc*, 20*rod*) and axial walls (20*a*, 20*ai*, 20*aue*, 20*ade*) that form an enclosed chamber (45) containing a heat conductive chamber fluid (CF), the rotor and driver (250, 100, 200) being mounted within the chamber (45) in intimate heat conductive contact with the heat conductive fluid. The rotor and driver are typically supported within the chamber by the radial and axial walls (20*r*, 20*ro*, 20*ri*, 20*roa*, 20*rob*, 20*roc*, 20*rod*, 20*a*, 20*ai*, 20*aue*, 20*ade*) in an arrangement such that the rotor (250) and driver (100, 200) are drivably rotatable within the chamber (45).

One or more of the radial and axial walls (20*r*, 20*ro*, 20*ri*, 20*roa*, 20*rob*, 20*roc*, 20*rod*, 20*a*, 20*ai*, 20*aue*, 20*ade*) typically comprise a heat conductive material that has an inner surface disposed in heat conductive contact with the heat conductive fluid (CF) contained within the enclosed chamber. The one or more radial or axial walls (20*r*, 20*ro*, 20*ri*, 20*roa*, 20*rob*, 20*roc*, 20*rod*, 20*a*, 20*ai*, 20*aue*, 20*ade*) absorb heat from the heat conductive fluid (CF) contained within the chamber (45) and have an actuator tube or channel (25) surrounded by and in intimate heat conductive contact with the heat conductive material of a first one of the radial and axial walls (20*r*, 20*ro*, 20*ri*, 20*roa*, 20*rob*, 20*roc*, 20*rod*, 20*a*, 20*ai*, 20*aue*, 20*ade*). A source (260) of heat absorptive fluid (25*f*) is sealably interconnected to the tube or channel (25) in an arrangement such that the heat absorptive fluid (25*f*) is routed through the tube or channel (25) in a flow that absorbs heat from the one or heat conductive walls (20*r*, 20*ro*, 20*ri*, 20*roa*, 20*rob*, 20*roc*, 20*rod*, 20*a*, 20*ai*, 20*aue*, 20*ade*).

In some embodiments such shown in FIGS. 21-25 at least one of the radial walls can comprise a non-actively cooled unitary body (20*rot*) having an inner surface (20*rotis*) in intimate heat conductive contact with an outer surface (20*roos*) of the first one of the radial and axial walls (20*r*, 20*ro*, 20*ri*, 20*roa*, 20*rob*, 20*roc*, 20*rod*, 20*a*, 20*ai*, 20*aue*, 20*ade*).

The at least one of the radial walls that comprises the non-actively cooled unitary body can further comprise an intermediate unitary body (20*ri*) having a heat conductive surface (20*rihcs*) in intimate heat conductive contact with the inner surface (20*rotis*) of the non-actively cooled unitary body (20*rot*). The intermediate unitary body is typically comprised of a heat conductive material having a second inner surface (20*ris*, 20*riis*, 20*aiis*) that is disposed in intimate heat conductive contact with the fluid (CF) contained within the chamber (45).

The first one of the radial or axial walls can comprise a unitary body (20*r*, 20*a*) comprised of a heat conductive material having an inner surface (20*ris*, 20*ais*) disposed in intimate heat conductive contact with the fluid (CF) contained within the chamber or can comprise a unitary body (20*ro*, 20*ao*) comprised of a heat conductive material that has an inner surface (20*rois*, 20*aois*) in intimate heat conductive contact with a heat communicating surface (20*rihcs*, 20*aihcs*) of an intermediate unitary body (20*ri*, 20*ai*) comprised of a heat conductive material having a second inner surface (20*riis*, 20*aiis*) that is disposed in intimate heat conductive contact with the fluid (CF) contained within the chamber (45).

Such apparatuses include a heated manifold (300) generating manifold heat, the housing (20) of the actuator being mounted in heat conductive communication with the heated manifold (300) such that manifold heat is absorbed by or communicated to the one or more radial and axial walls (20r, 20ro, 20ri, 20roa, 20rob, 20roc, 20rod, 20a, 20ai, 20aue, 20ade) of the housing, the heat absorptive fluid (25f) absorbing the manifold heat absorbed by or communicated to the one or more radial and axial walls (20r, 20ro, 20ri, 20roa, 20rob, 20roc, 20rod, 20a, 20ai, 20aue, 20ade) of the housing.

Figure 29:
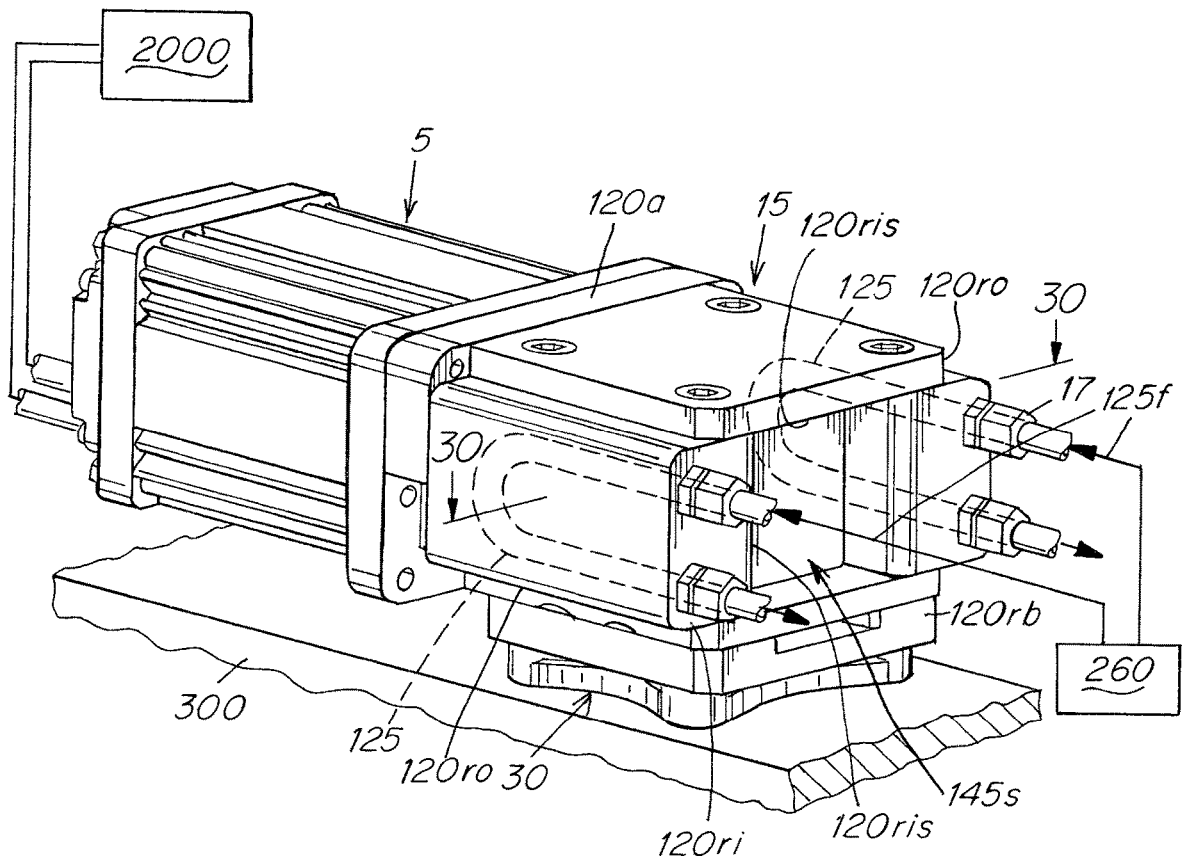
FIG. 29 is a front right perspective view of an injection molding system showing an electric motor actuator mounted to a rotary to linear converter having a converter housing having opposing left and right radial side walls that contain actively cooled cooling channels, the side walls being assemblable together with top and bottom axial wall plates that are not actively cooled.
Figure 30:
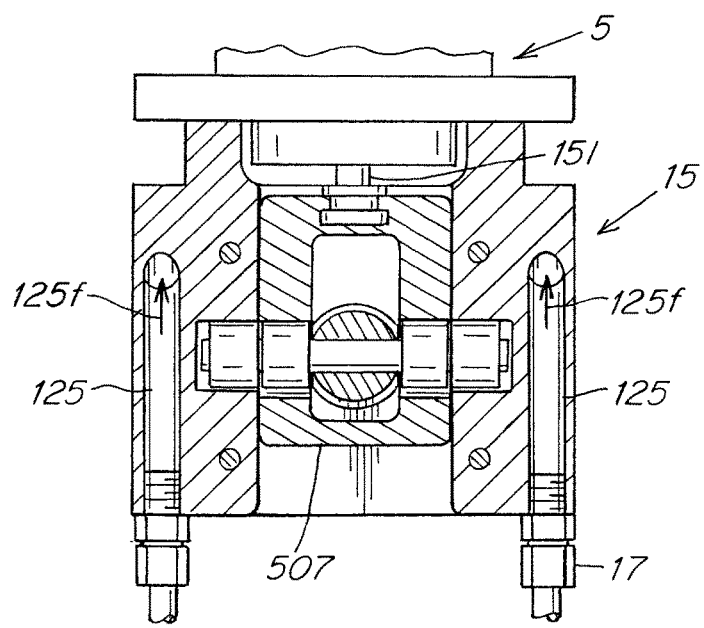
FIG. 30 is a sectional view taken along lines 30-30 of FIG. 29.
Figure 31:
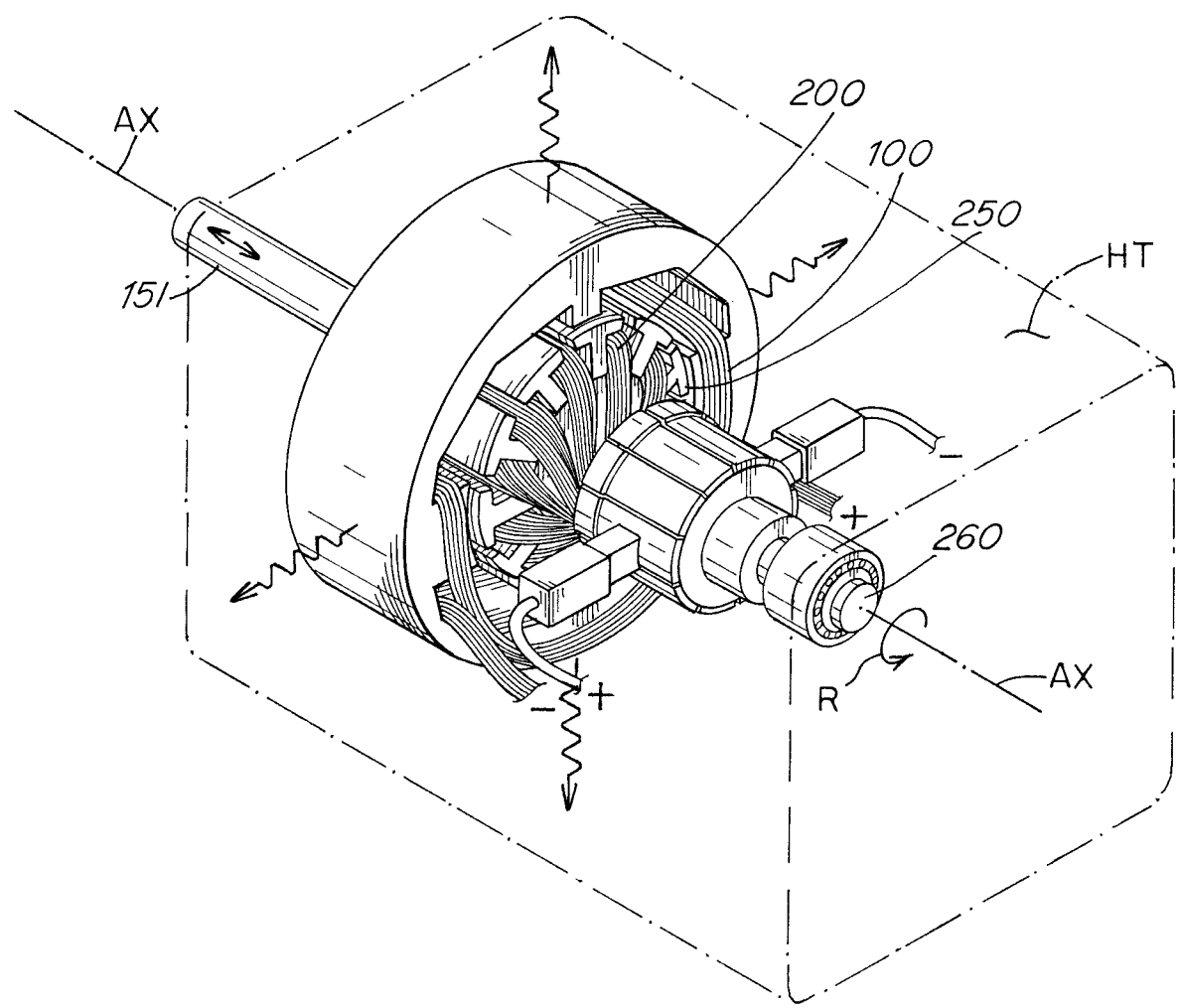
FIG. 31 is a top front perspective view of the driver and rotor components subassembly of an electric actuator that can be used in the other described embodiments of the systems described herein.
Figure 32:
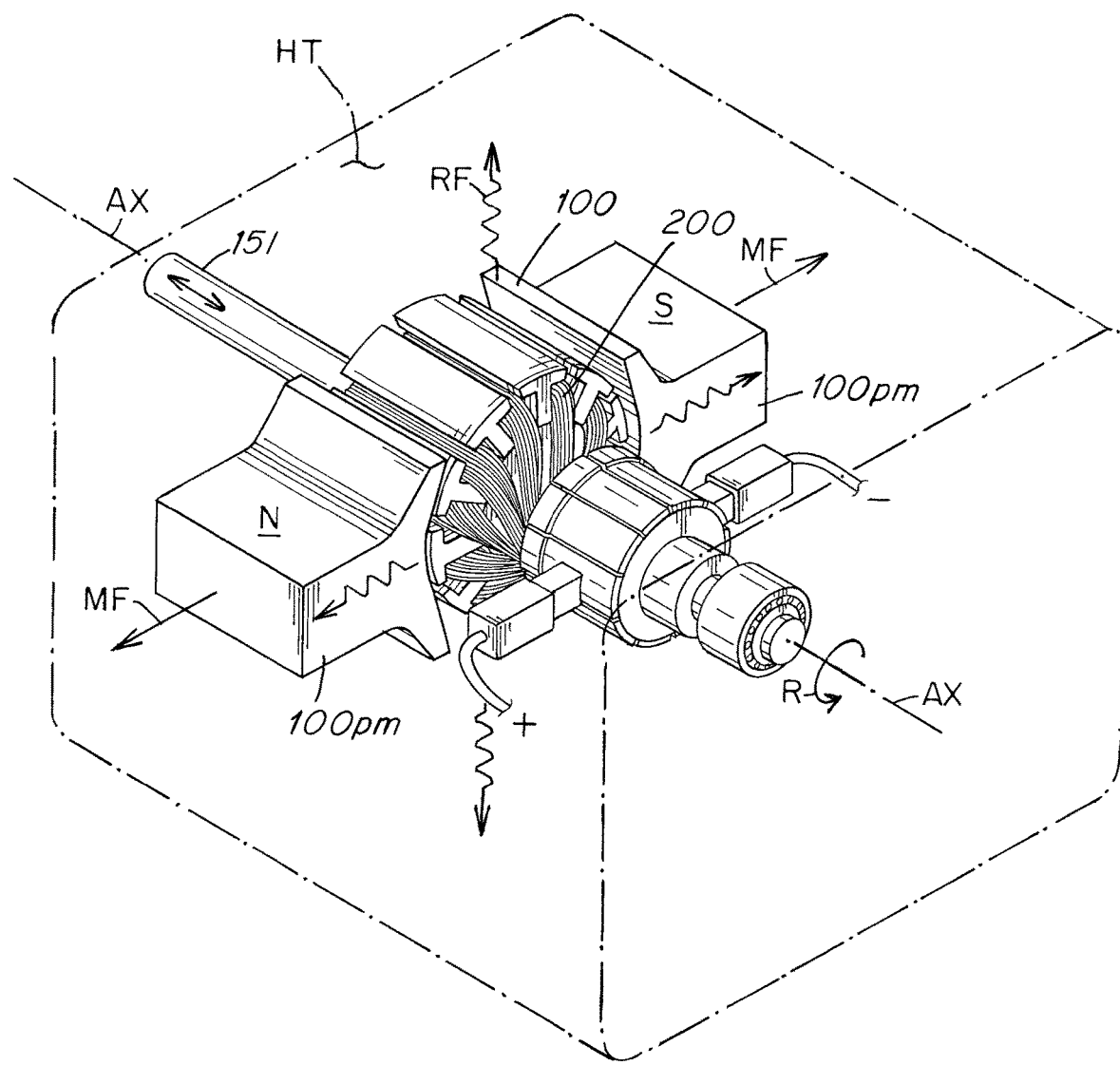
FIG. 32 is a view similar to FIG. 31 showing opposing permanent magnet components acting as a stator for the subassembly of motor components.
Figure 33:
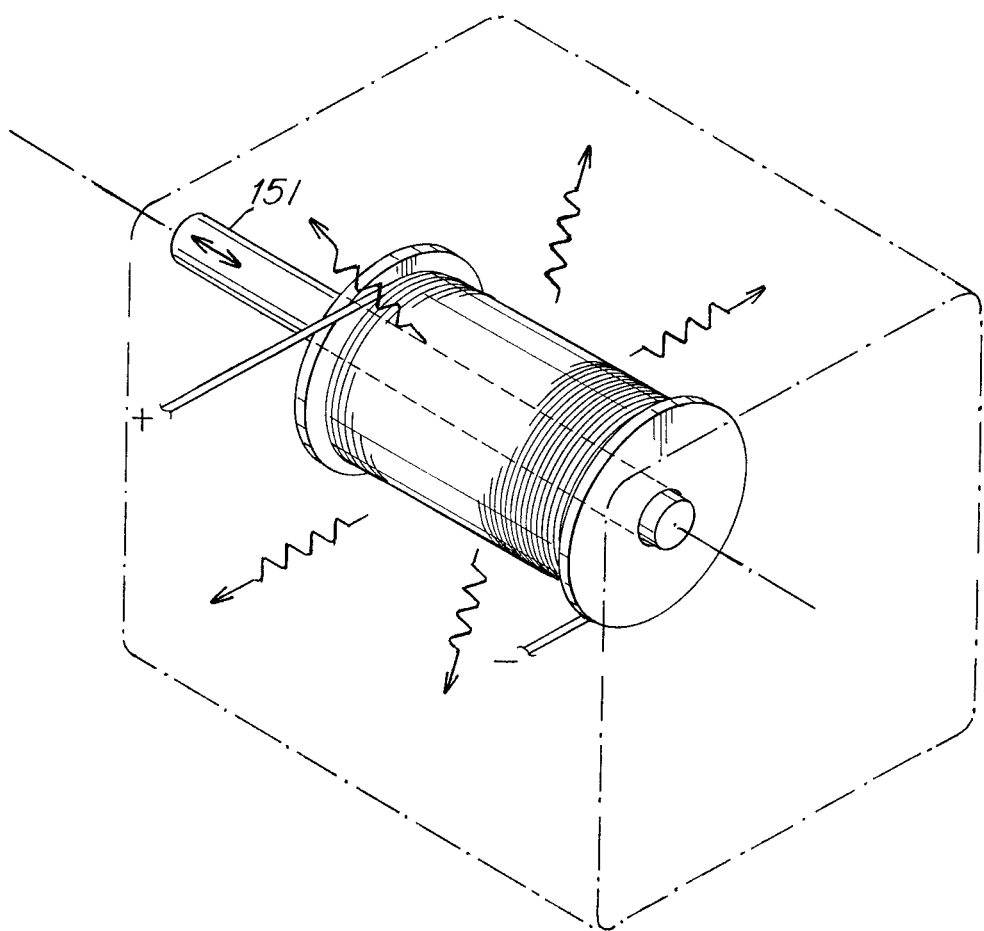
FIG. 33 is a view similar to FIG. 31 showing an alternative electric motor driver and rotor arrangement.
Figure 34:
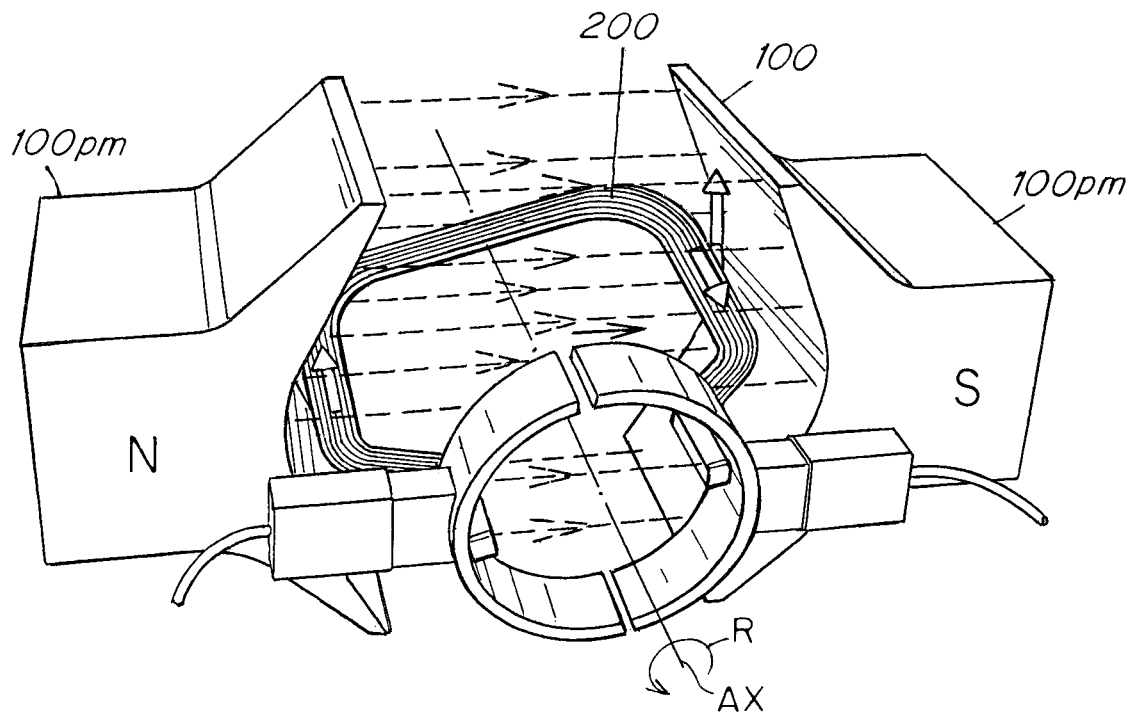
FIG. 34 is a view similar to FIG. 31 showing copper wire windings of an electric motor driver arranged and mounted relative to permanent magnet as to function as the armature component of the motor.
Figure 35:
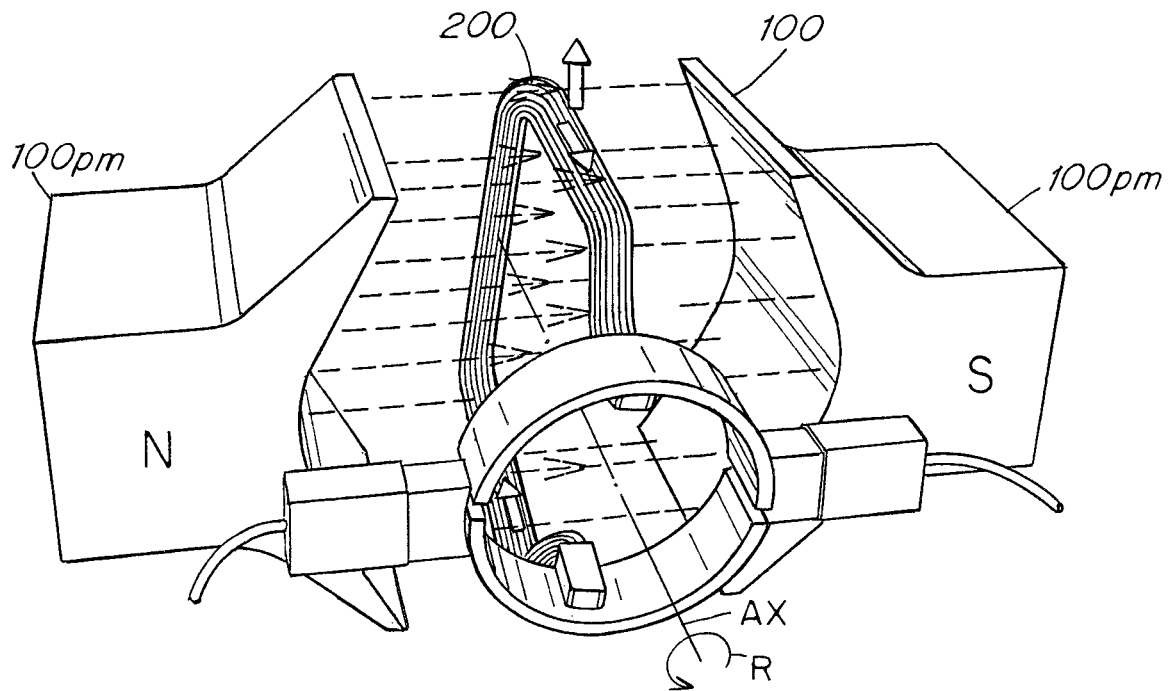
FIG. 35 is a view similar to FIG. 34 showing the copper wire armature in a driven rotated position when an electric current is applied through the wire.
Figure 36:
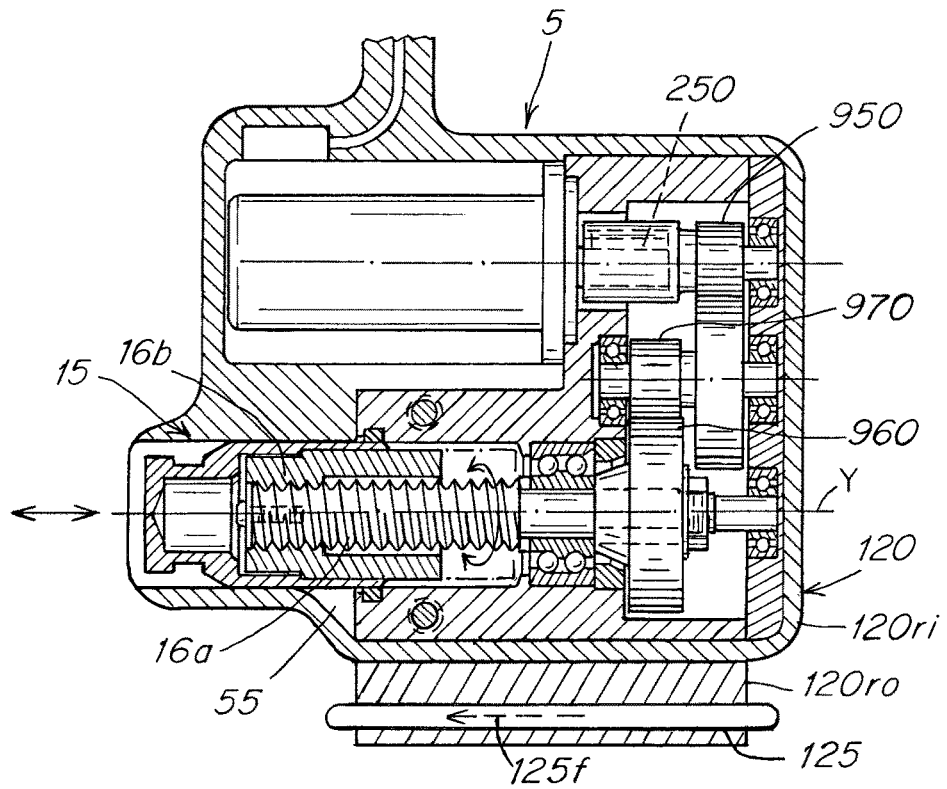
FIG. 36 is a side sectional view of a subassembly of an electric motor actuator and a rotary to linear converter with a gear transmission interconnecting the motor rotor and the rotary to linear converter, the subassembly of components having interconnected housings in thermal communication with each other and rotor and transmission gear components that are non coaxial relative to each other.
Figure 37:
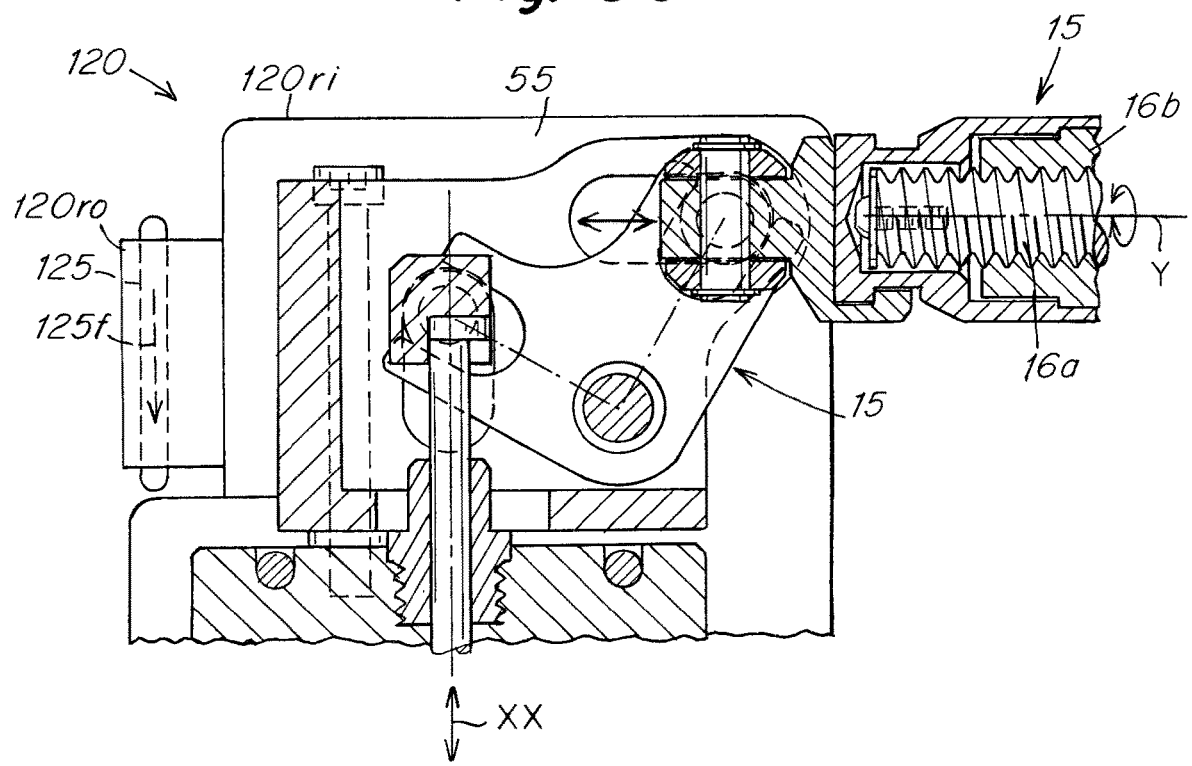
FIG. 37 is a side sectional view of a downstream interconnected component of the linear converter of FIG. 36.
Figure 38:
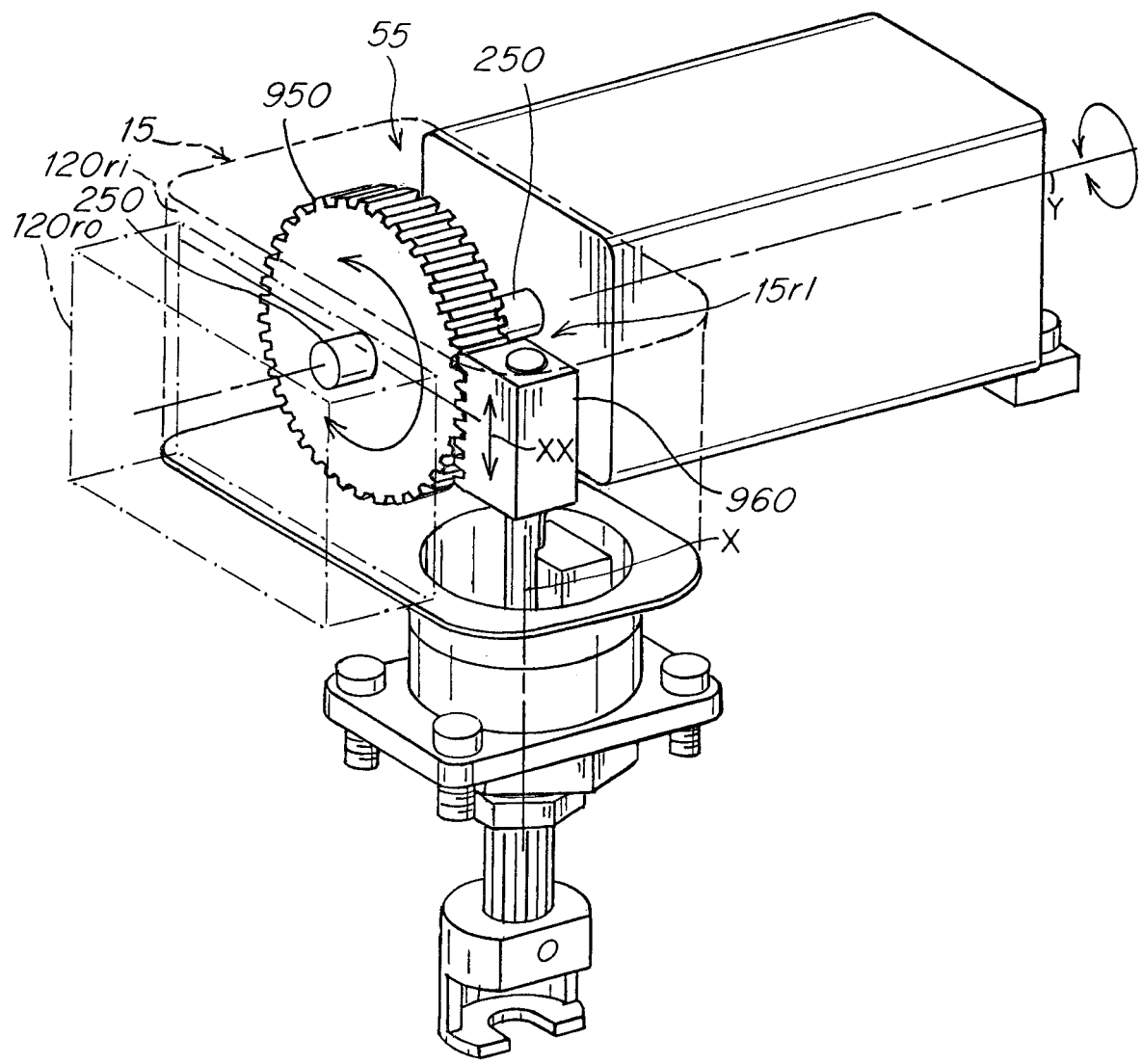
FIG. 38 is front perspective view of an electric actuator contained in a housing with the rotor of the electric motor interconnected to a rotary to linear gear arrangement that drive a valve pin in a non coaxial path relative to the axis of the rotor of the actuator with the housing of the rotary to linear converter including an actively cooled side wall.
Figure 39:
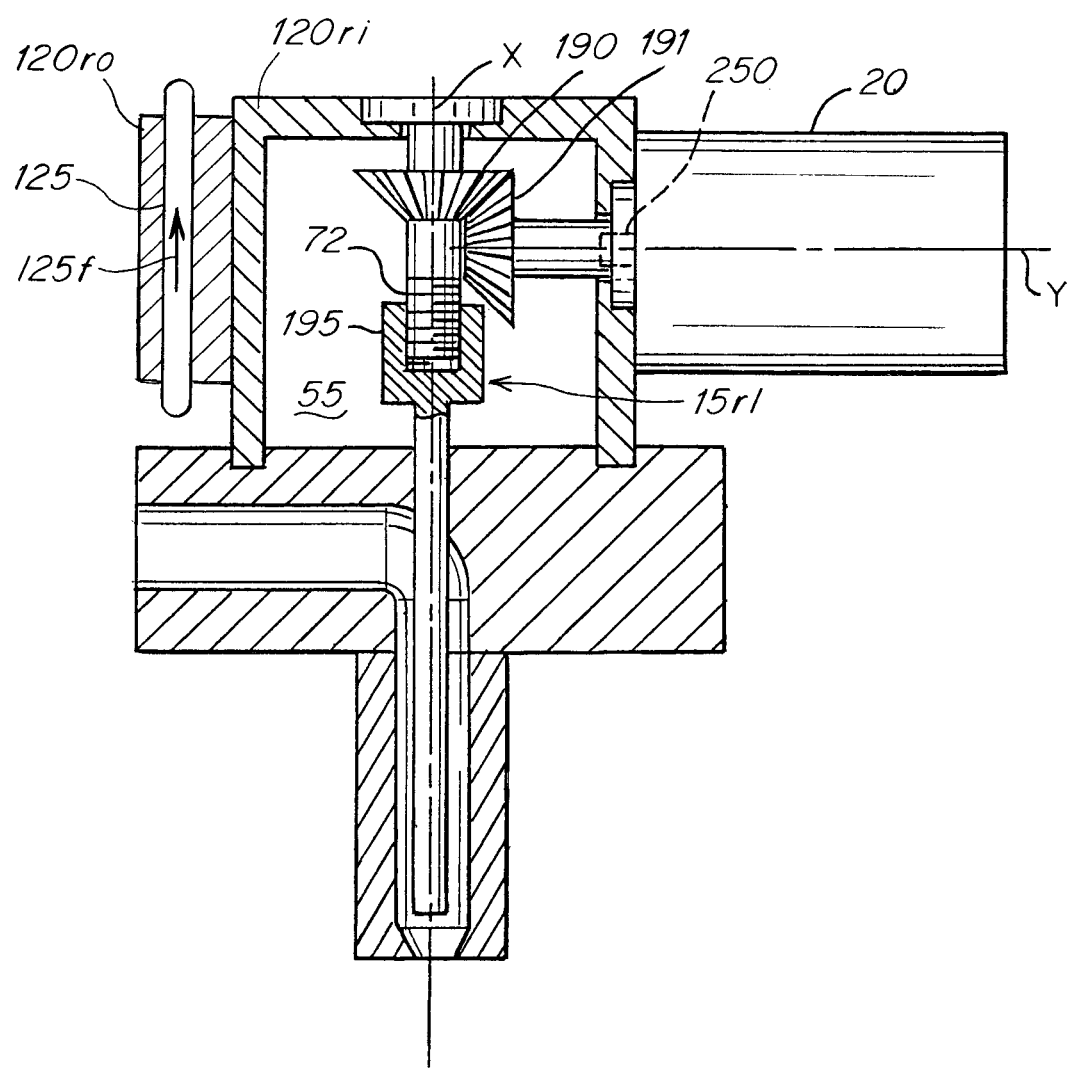
FIG. 39 is a side sectional view of another embodiment of an electric actuator contained in a housing with the rotor of the electric motor interconnected to a rotary to linear gear arrangement that drives a valve pin in a non coaxial path relative to the axis of the rotor of the actuator with the housing of the rotary to linear converter including an actively cooled side wall.

In some embodiments such as shown in FIGS. 29, 36, 37 the apparatus can further comprise a linear travel converter (15) interconnected between the rotor (250) and the valve pin (800) in an arrangement that converts rotation movement of the rotor to linear movement (XX) of the valve pin (800). The linear travel converter (15) typically comprises a converter housing (120) comprised of one or more converter walls (120r, 120rb, 120rc, 120ri, 120ro, 120a) that are comprised of a heat conductive material, the converter walls (120r, 120rb, 120rc, 120ri, 120ro, 120a) being mounted to the heated manifold (300) in an arrangement such that the manifold heat is communicated to the converter walls (120r, 120rb, 120rc, 120ri, 120ro, 120a). The converter walls include a converter tube or channel (125) surrounded by and in intimate heat conductive contact with the heat conductive material of one or more of the converter walls (120r, 120rb, 120rc, 120ri, 120ro, 120a). A source of heat absorptive fluid (125F) is sealably interconnected to the converter tube or channel (125) in an arrangement such that the heat absorptive fluid (125f) is routed through the converter tube or channel (125) in a flow that absorbs the manifold heat communicated to the converter walls.

In such embodiments one or more of the converter walls (120r, 120rb, 120rc, 120ri, 120ro, 120a) can have an outer surface (120aos, 120ros) disposed in heat conductive communication with a heat conductive surface (20aos) of one or more of the radial and axial walls (20r, 20ro, 20roa, 20rob, 20roc, 20rod, 20a, 20aue, 20ade) of the actuator (5). One or more of the converter walls (120r, 120rb, 120rc, 120ri, 120ro, 120a) can have an inner surface (120ris, 120ais) disposed in heat conductive communication with a linear travel device (127) that is interconnected between the rotor (250) and the valve pin to convert rotation movement of the rotor to linear movement (XX) of the valve pin (800).

In such embodiments one or more of the converter walls typically comprises a unitary body (120ro) comprised of the heat conductive material having an inner surface (120rois) in heat conductive contact with a heat communicating surface (120rihcs) of an intermediate unitary body (120ri) comprised of a heat conductive material having a second inner surface (20riis) that is disposed in heat conductive communication with a linear travel device (127) that is interconnected between the rotor (250) and the valve pin to convert rotation movement of the rotor to linear movement (XX) of the valve pin (800).

Such embodiments can further comprise a linear travel converter (15) interconnected between the rotor (250) and the valve pin (800) in an arrangement that converts rotation movement of the rotor (250) to linear movement (XX) of the valve pin (800). The linear travel converter (15) is mounted within the enclosed chamber (45) in contact with the heat conductive chamber fluid (CF). The housing (20) of the actuator is mounted in heat conductive communication with the heated manifold (300) such that manifold heat is absorbed by or communicated to the one or more radial and axial walls (20r, 20ro, 20ri, 20roa, 20rob, 20roc, 20rod, 20a, 20ai, 20aue, 20ade) of the housing. The heat absorptive fluid (25f) absorbs the manifold heat absorbed by or communicated to the one or more radial and axial walls (20r, 20ro, 20ri, 20roa, 20rob, 20roc, 20rod, 20a, 20ai, 20aue, 20ade) of the housing.

The rotor (250) has a rotor axis (Y) and the valve pin (800) has a travel axis (X, XX), the rotor axis (Y) and the travel axis (X, XX) can be coaxial as in the embodiments shown in FIGS. 42, 43.

In some embodiments such as shown in FIGS. 1-41, the rotor (250) has a rotor axis (Y) and the system can includes a transmission comprised of one or more gears, racks, screws or nuts (16a, 16b, 72, 190, 191, 195, 950, 960, 970) adapted to convert rotational movement of the rotor (250) around the rotor axis (Y) to linear movement of the valve pin along an axis (X, XX) that is non-coaxial relative to the rotor axis (Y). In such embodimentsvone or more transmission walls (120r, 120ro, 120ri, 120a, 120ao, 120ai) form an enclosed chamber (55) that encloses one or more of the gears, racks, screws or nuts (16a, 16b, 72, 190, 191, 195, 950, 960, 970), the one or more transmission walls (120r, 120ro, 120ri, 120a, 120ao, 120ai) being comprised of a heat conductive material.

In some embodiments a converter tube or channel (125) is surrounded by and in intimate heat conductive contact with the heat conductive material of one or more of the transmission walls (120r, 120ro, 120ri, 120a, 120ao, 120ai). A source of heat absorptive fluid (125F) is sealably interconnected to the converter tube or channel (125) in an arrangement such that the heat absorptive fluid (125f) is routed through the converter tube or channel (125) in a flow that absorbs heat absorbed by or communicated to the one or more transmission walls (120r, 120ro, 120ri, 120a, 120ao, 120ai).

In some embodiments the actuator housing (20) can be removably attached to a top clamping or mounting plate (1002) that is mounted upstream of the manifold and interconnected to the mold.

In some embodiments the linear travel converter (15) is removably attached to a top clamping or mounting plate (1002) that is mounted upstream of the manifold and interconnected to the mold.

In another aspect of the invention there is provided a method of performing an injection molding cycle comprising operating an injection molding system as described above.

In certain embodiment, the shaft 250 of the motor can be interconnected at a downstream end to a rotation reduction mechanism such as a harmonic speed reducing mechanism 15h, FIGS. 44-47. In such embodiments, the rotation speed of the rotor 250 is reduced so that the degree of torque force of the motor can be increased. In such embodiments, a downstream rotation device 500 component of the rotation reduction mechanism 15h is rotated at the lower rotational speed and higher torque and typically is attached to an eccentrically mounted cam device 600 that drives a sled mechanism 43 along a linear path of travel X, XX that is non-coaxial relative to the axis of the rotating rotor 250. The cam device 600 in combination with the sled 43 thus acts as the linear travel converter 15 converting rotary motion to linear X, XX motion.

Figure 8:
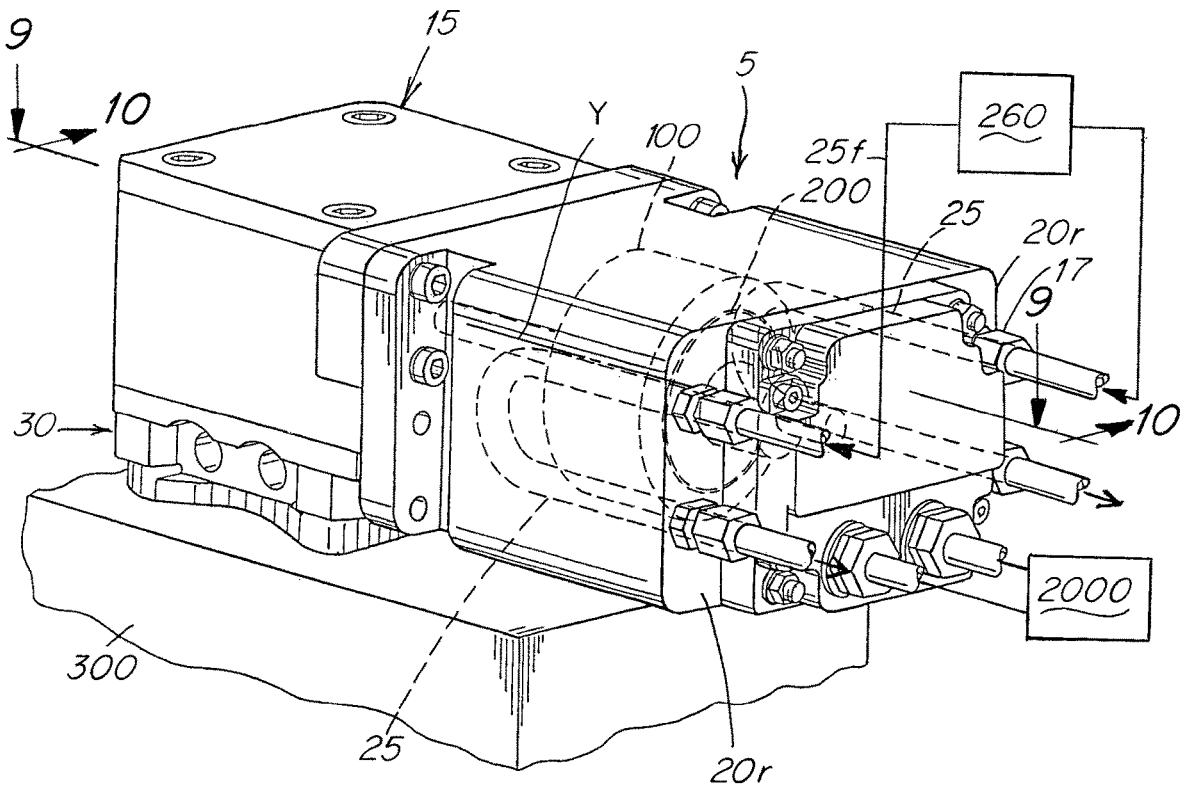
FIG. 8 is a top left rear perspective view of an injection molding system similar to the FIGS. 1 and 3 systems, except the housing cooling components are disposed and extends along a pair of opposing side radial walls of the housing with actively cooled cooling channels disposed within the side radial walls.
Figure 9:
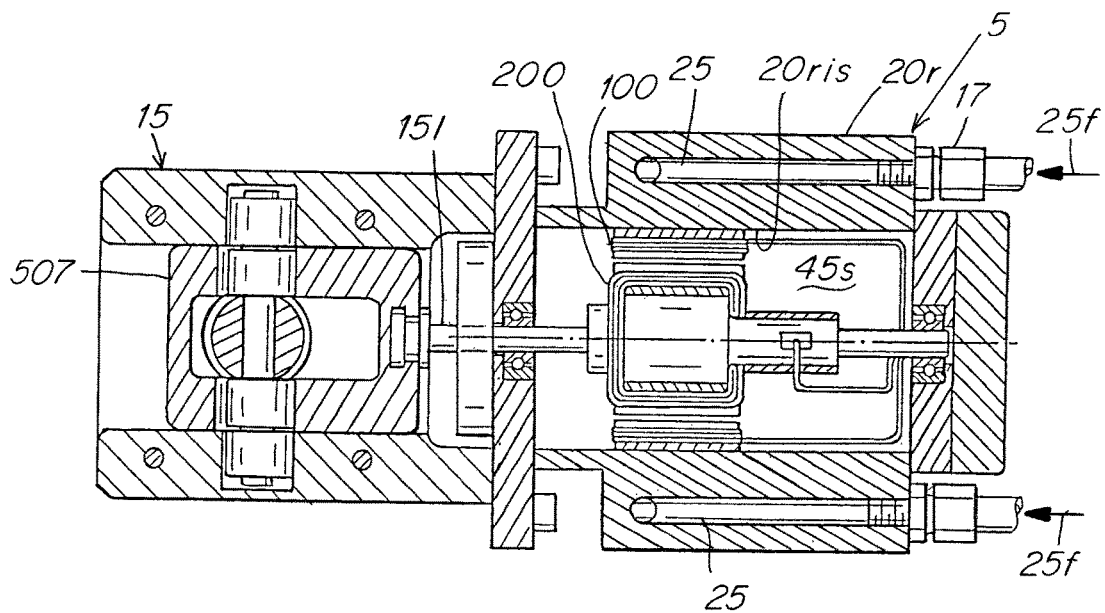
FIG. 9 is a sectional view along lines 9-9 of FIG. 8.
Figure 10:
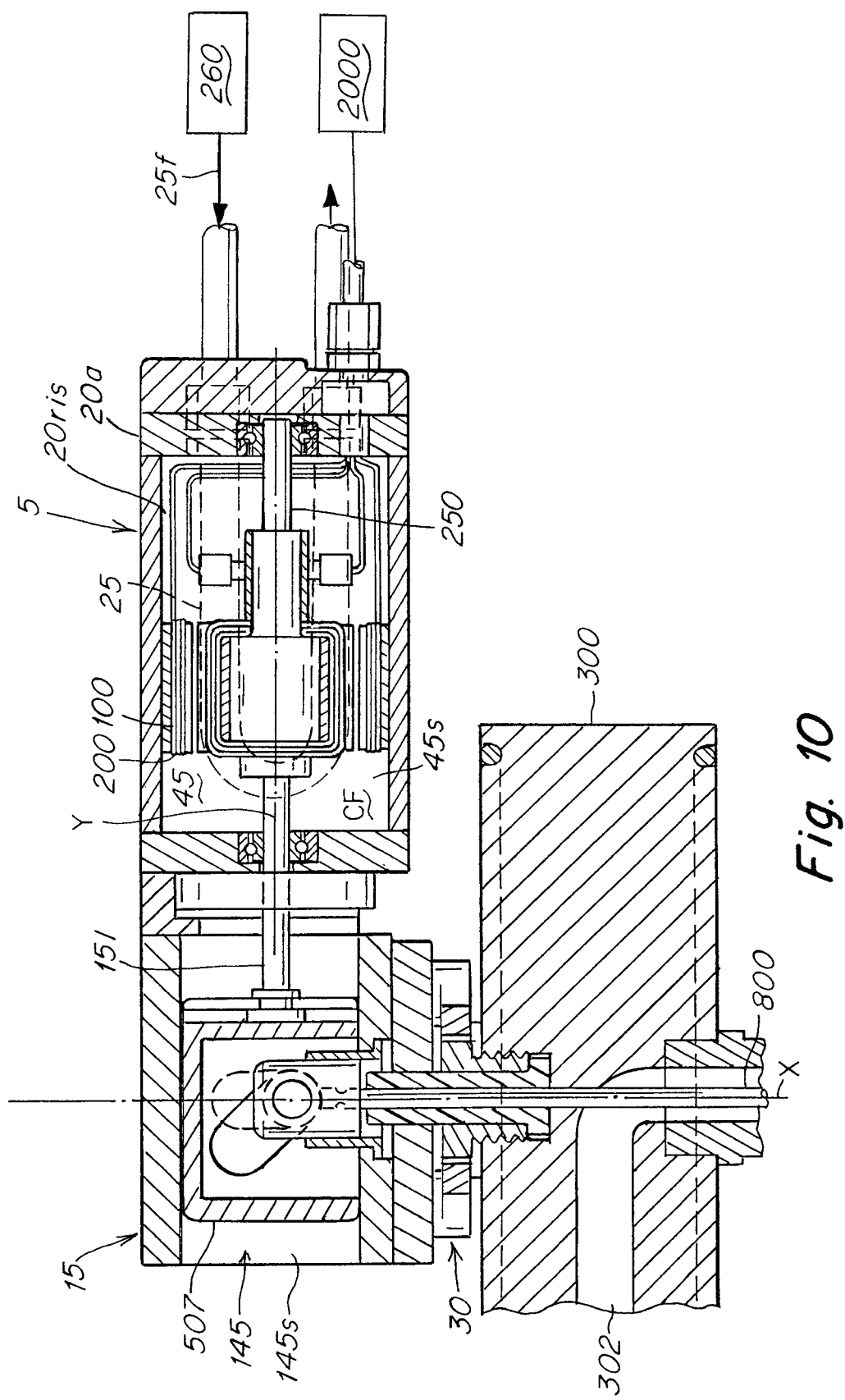
FIG. 10 is a sectional view along lines 10-10 of FIG. 8.
Figure 11:
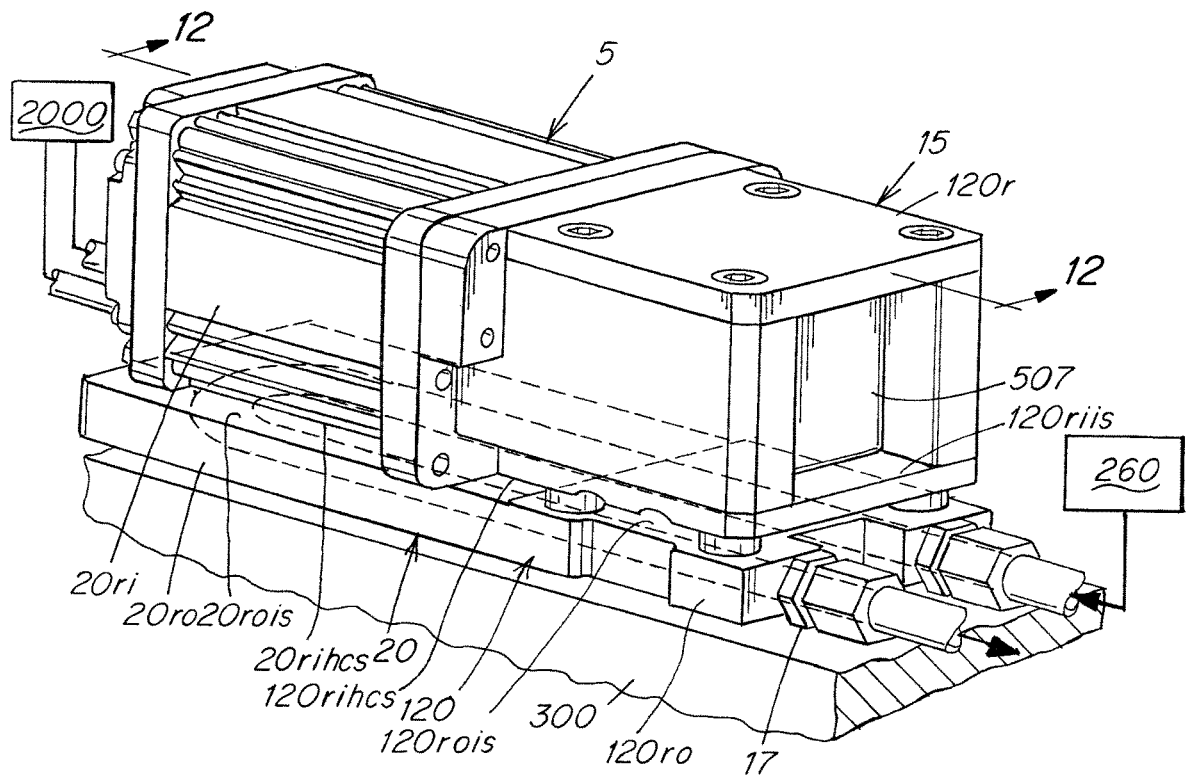
FIG. 11 is a top front perspective view of an injection molding system similar to the FIGS. 1, 3 system except the housing cooling components are disposed and extend along a bottom radial wall component that extends along a bottom radial wall of a rotary to linear converter device that is interconnected to the electric actuator element the bottom radial wall containing actively cooled cooling channels.
Figure 12:
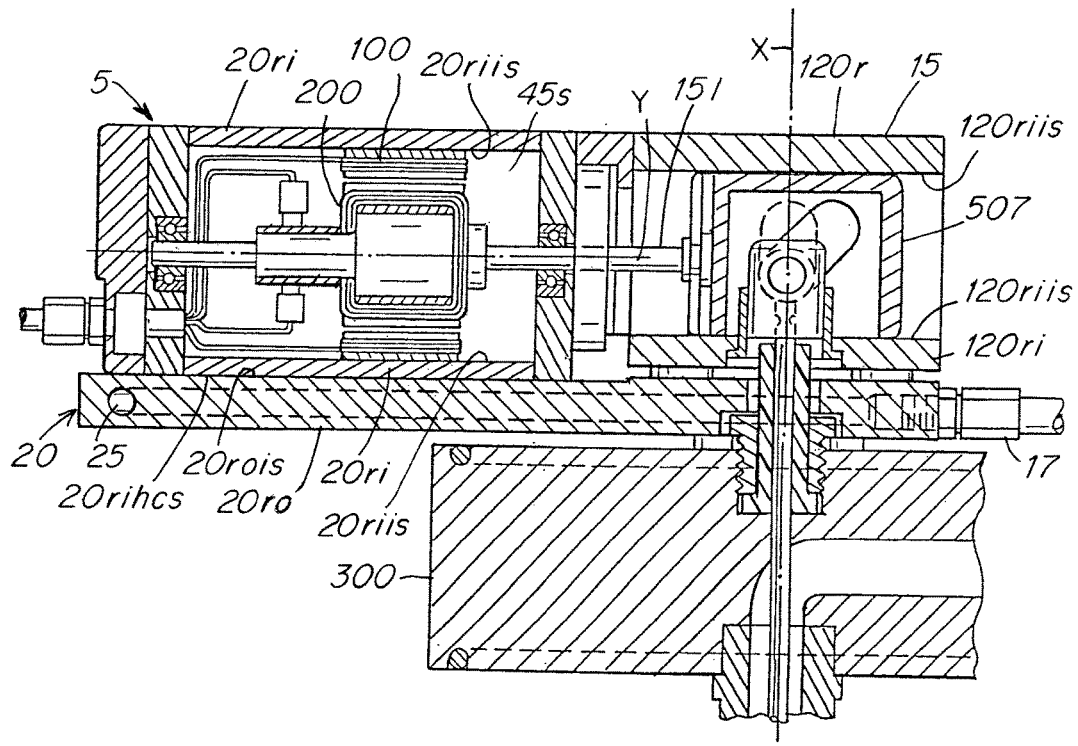
FIG. 12 is a side sectional view along lines 12-12 of FIG. 11.
Figure 13:
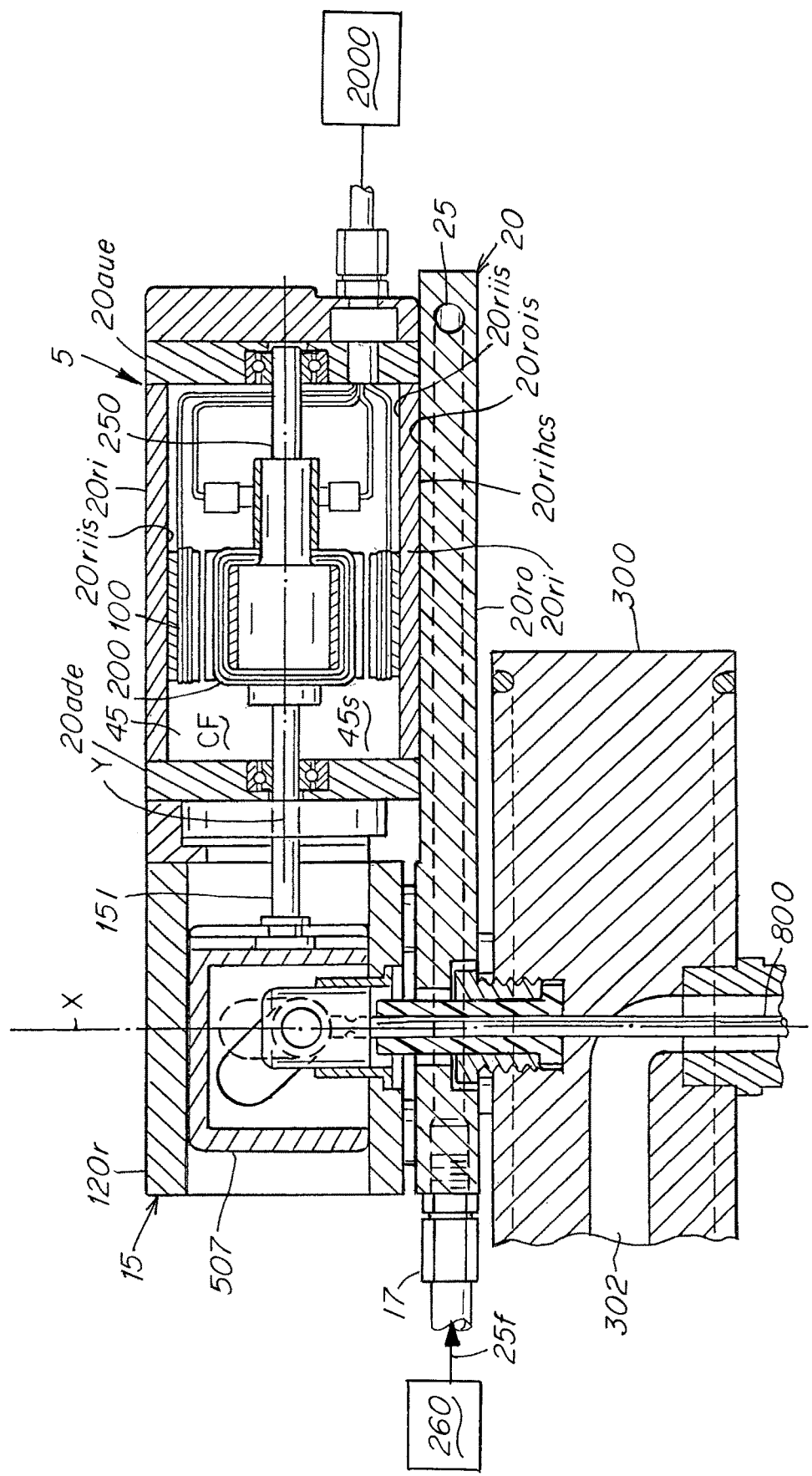
FIG. 13 is a view similar to FIG. 12 showing a section of another portion of the cooling channel contained with the bottom radial wall.
Figure 14:
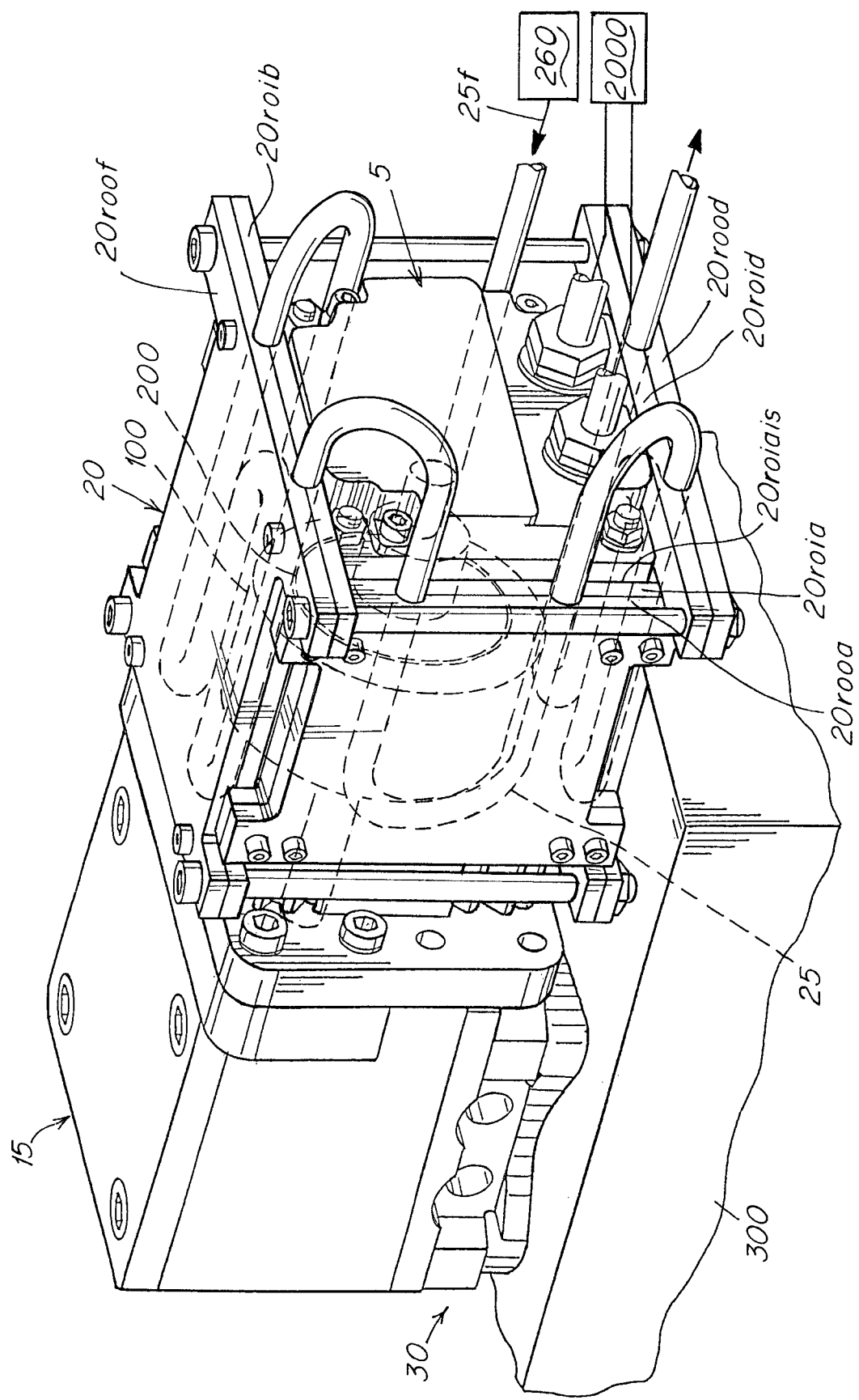
FIG. 14 is top rear perspective view of an injection molding system similar to the FIGS. 1, 3 system except the housing cooling components are disposed and extend along opposing side radial walls as well as bottom and top radial walls of the actuator housing with all of the walls containing actively cooled cooling channels.
Figure 15:
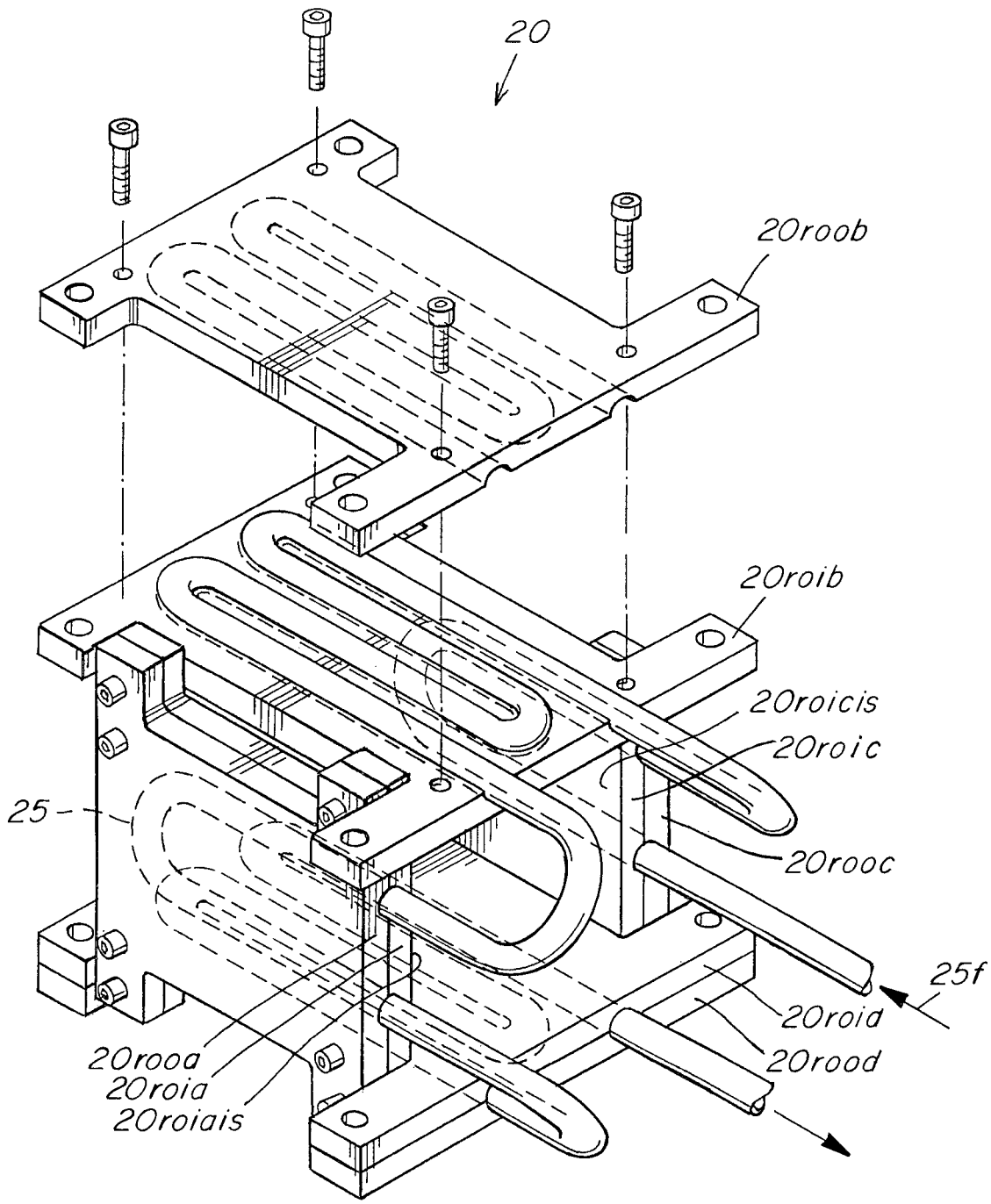
FIG. 15 is an exploded perspective view of the actuator housing of the FIG. 14 system.
Figure 16:
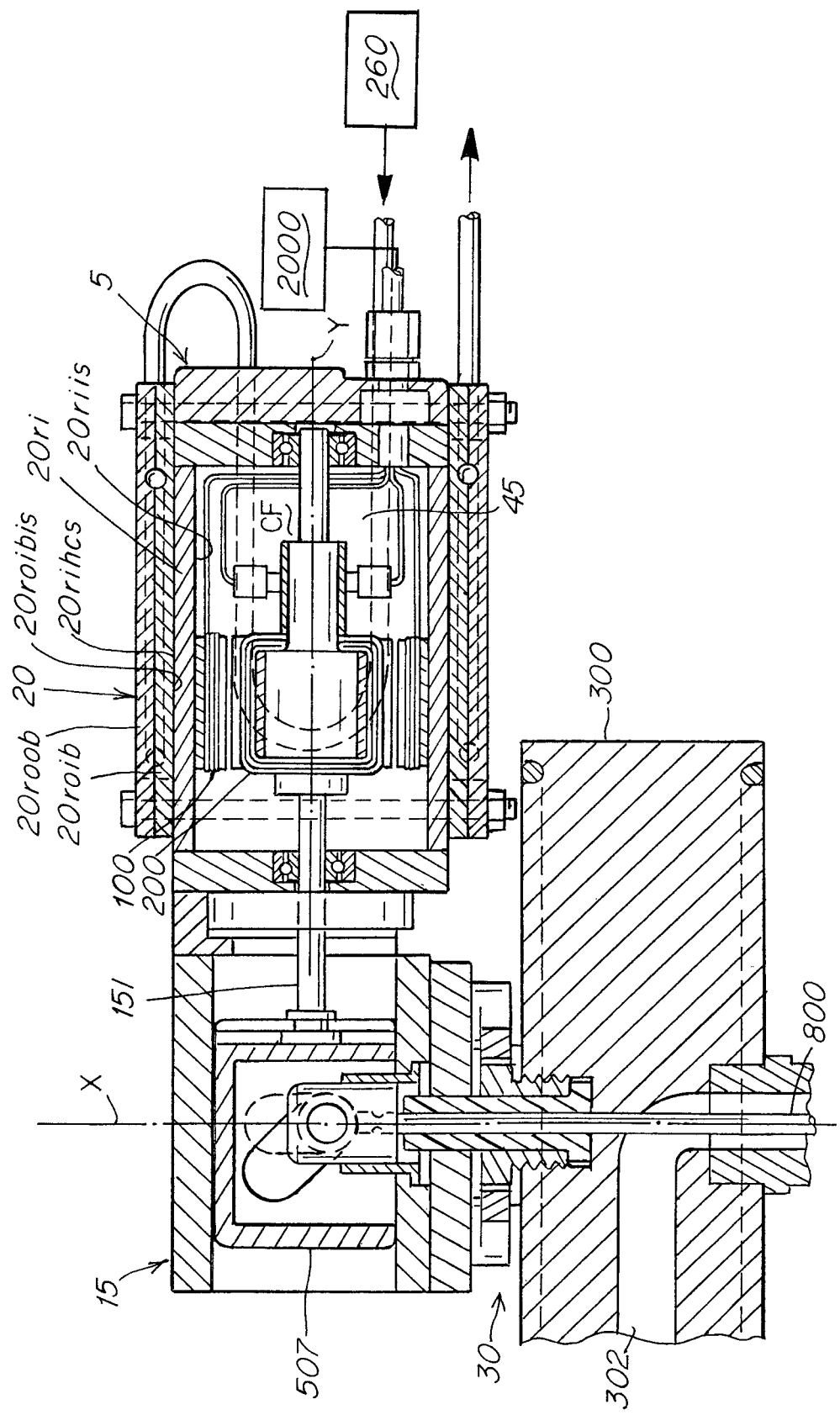
FIG. 16 is a side sectional view of the FIG. 14 system.
Figure 17:
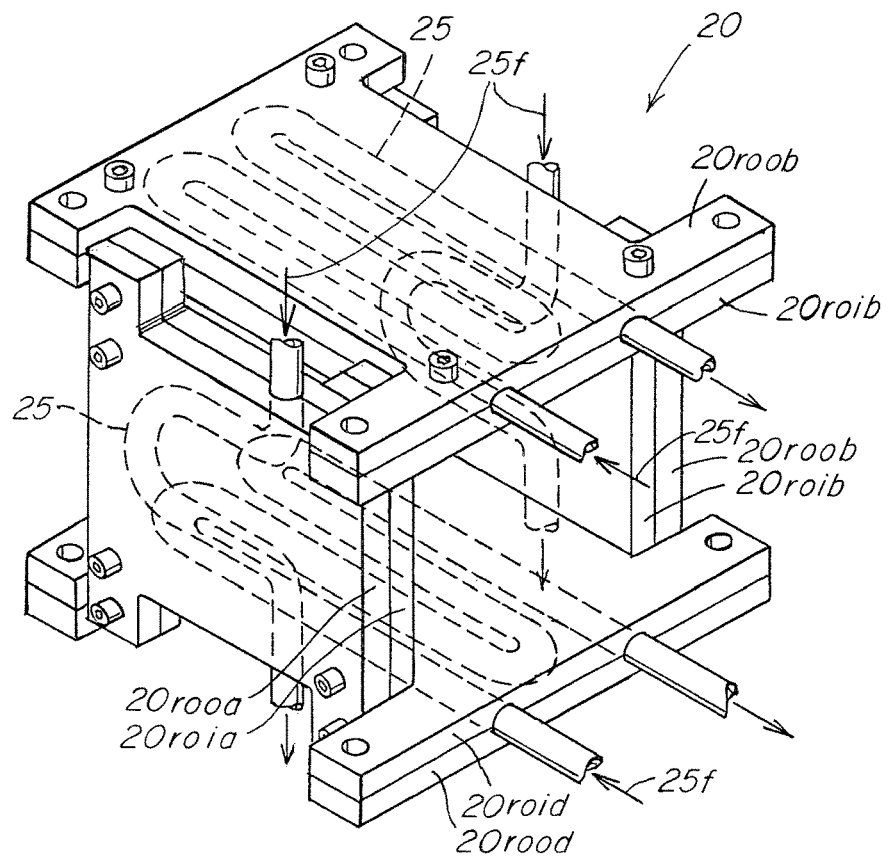
FIG. 17 is an assembled perspective view of the actuator housing of the FIG. 14 system.
Figure 18:
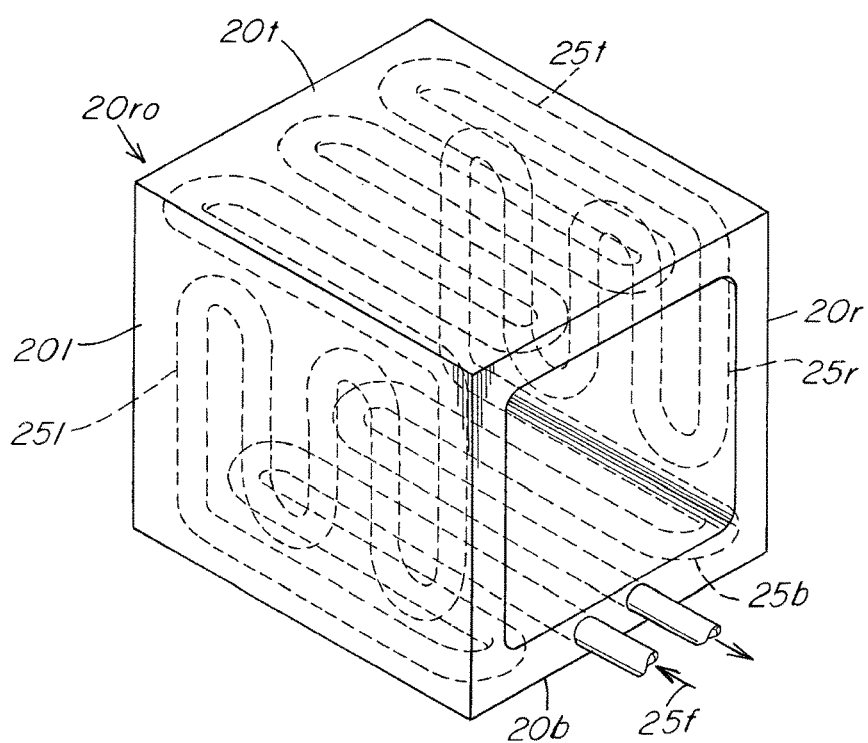
FIG. 18 is a top rear perspective view of an alternative unitary actuator housing similar to the component disassemblable actuator housing of the FIG. 14 system.
Figure 19:
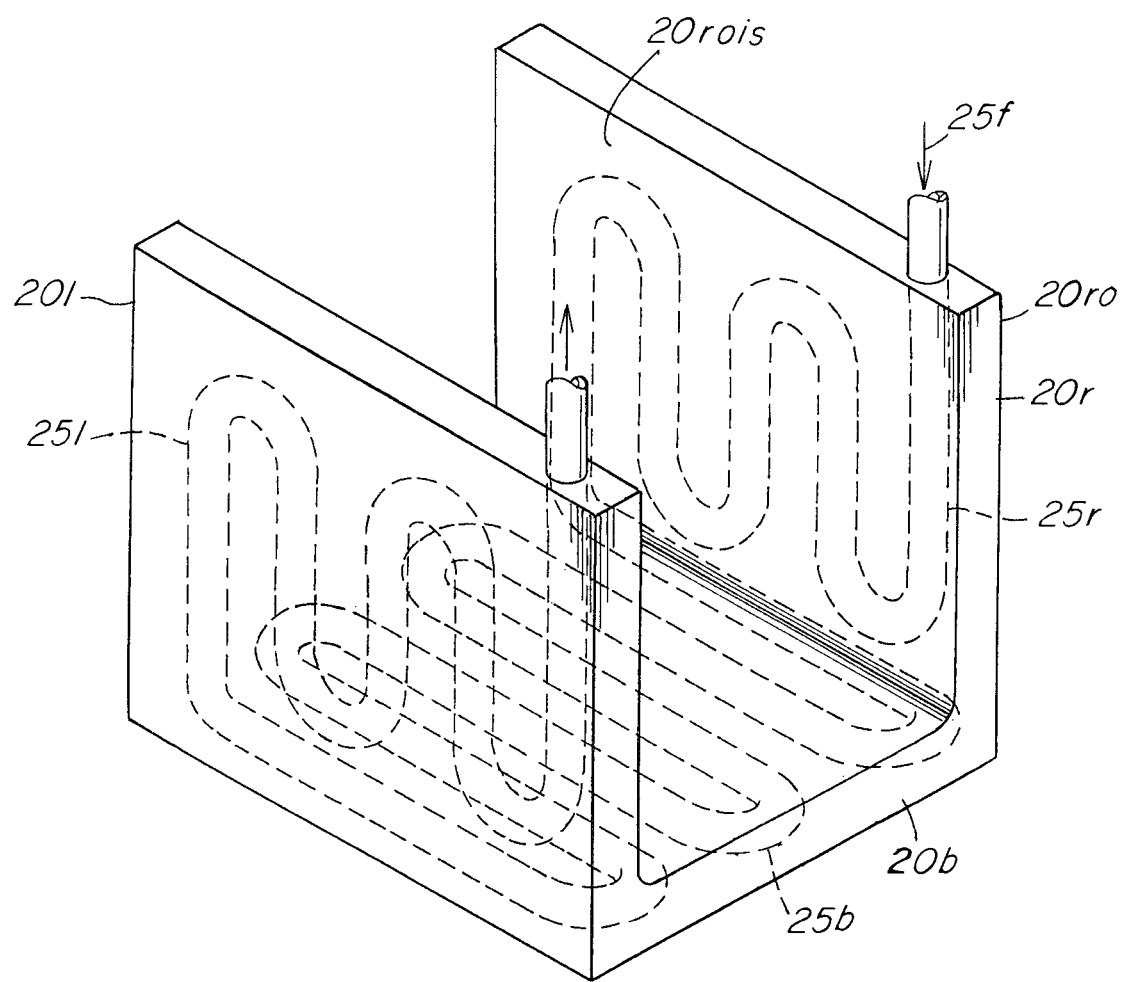
FIG. 19 is a top rear perspective view of another alternative unitary actuator housing similar to the component disassemblable actuator housing of the FIG. 14 system.
Figure 20:
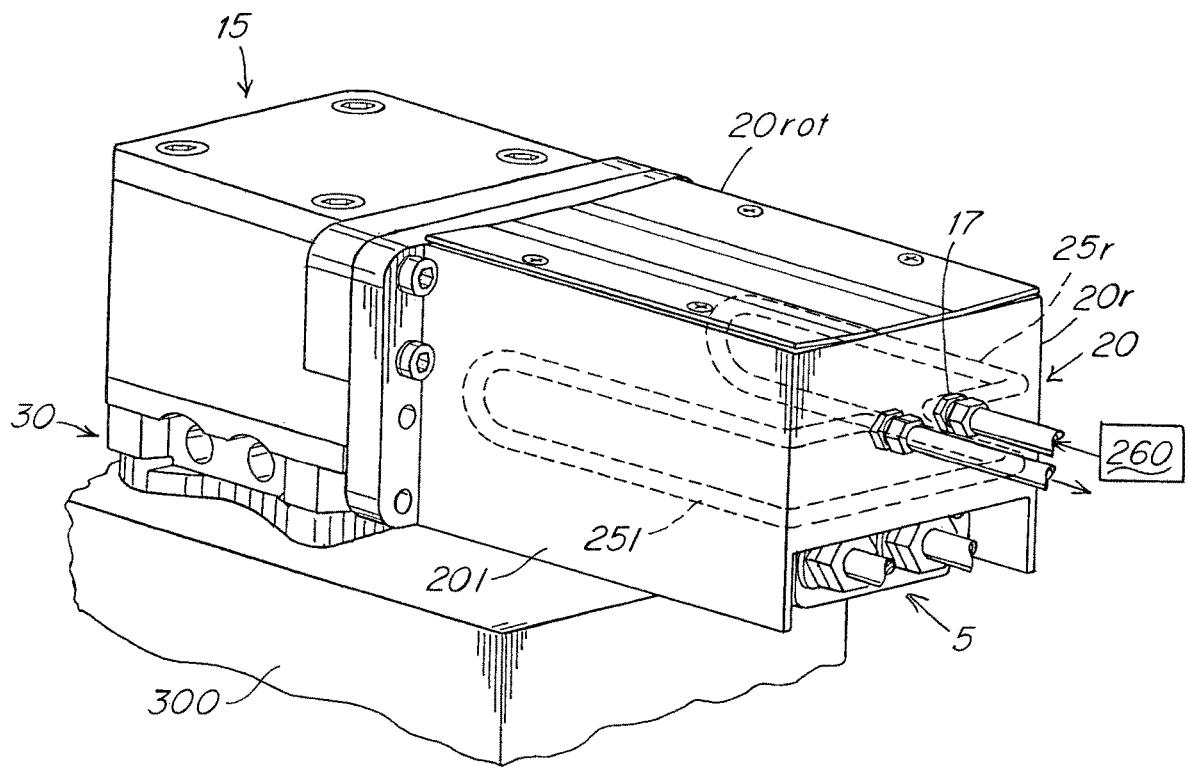
FIG. 20 is a top rear perspective view of an injection molding system having an actuator housing wall comprised of a top radial plate member that is not actively cooled and a unitary housing member comprised of axial and side radial walls that are actively cooled.
Figure 21:
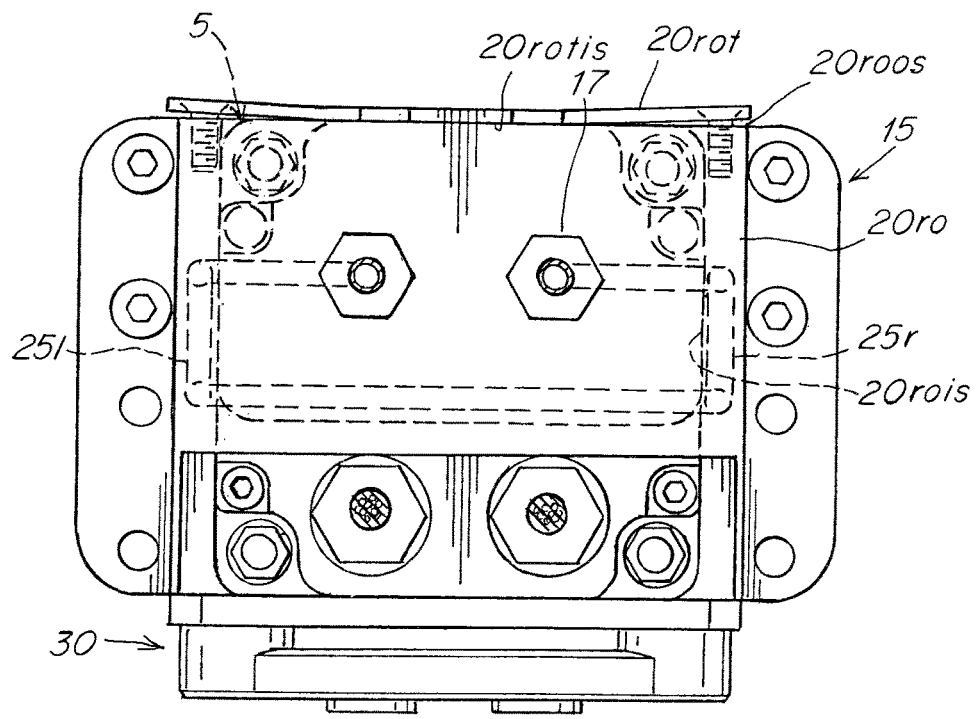
FIG. 21 is an end view of the FIG. 20 apparatus.
Figure 22:
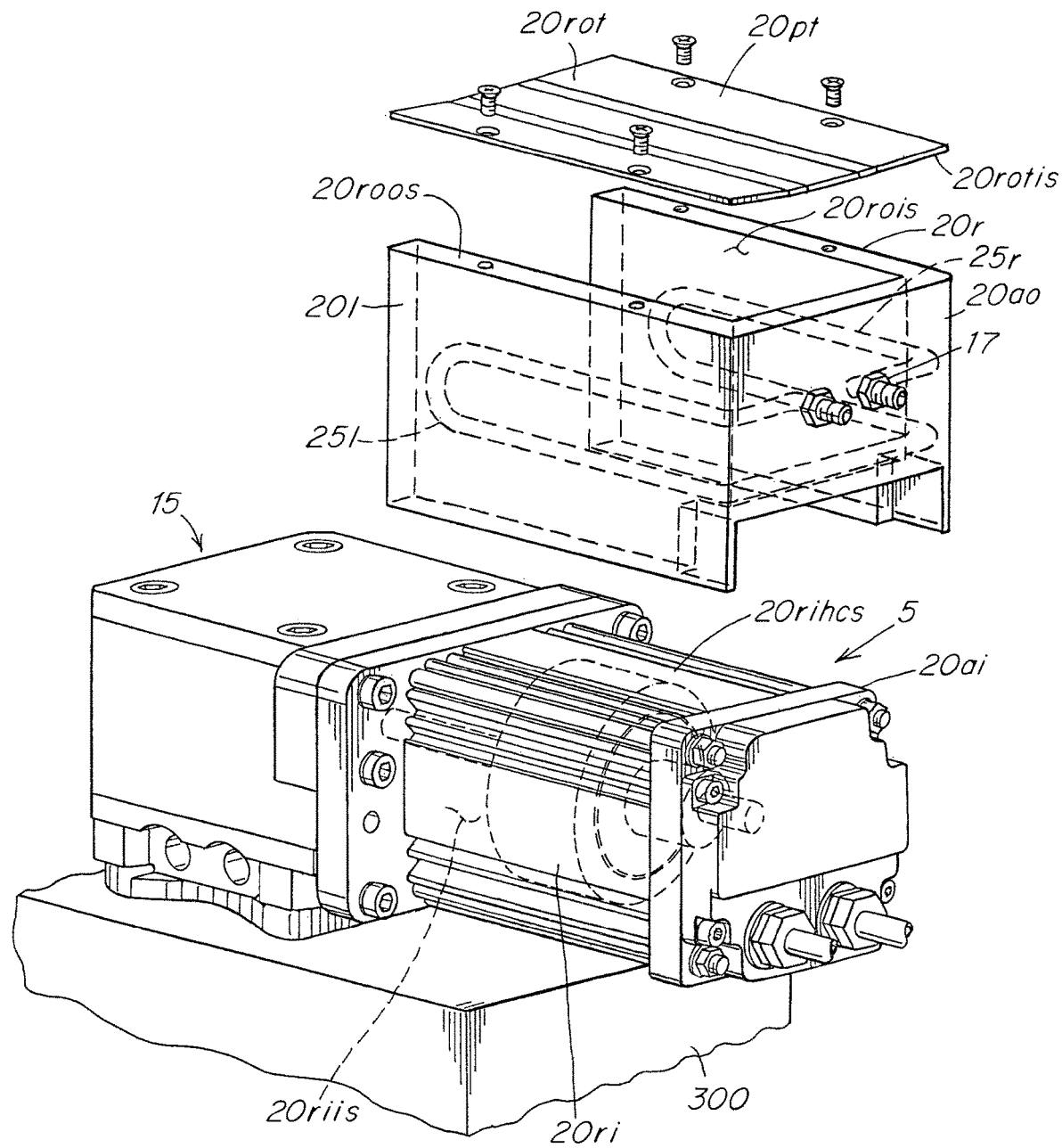
FIG. 22 is an exploded perspective view of the FIG. 20 system.
Figure 23:
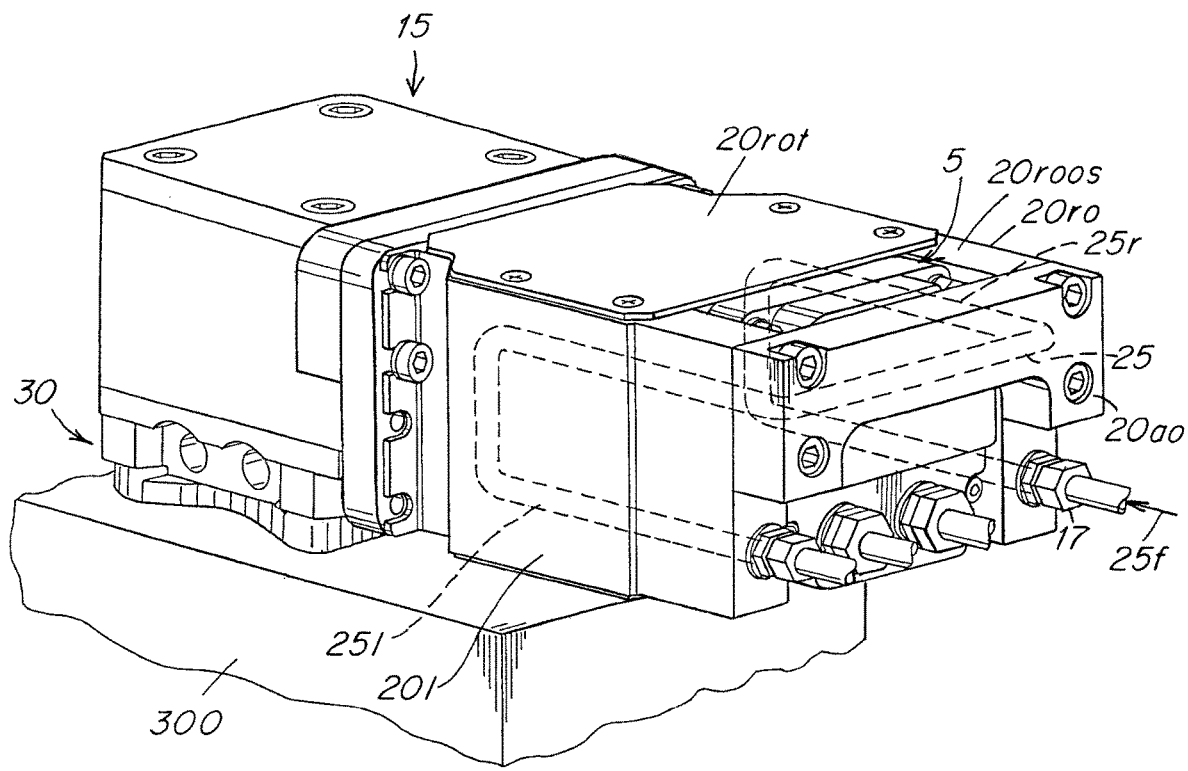
FIG. 23 is a top rear perspective view of an injection molding system having an actuator housing wall comprised of top and bottom radial plate members that are not actively cooled and a housing comprised of assemblable and disassemblable axial and side radial walls that are actively cooled.
Figure 24:
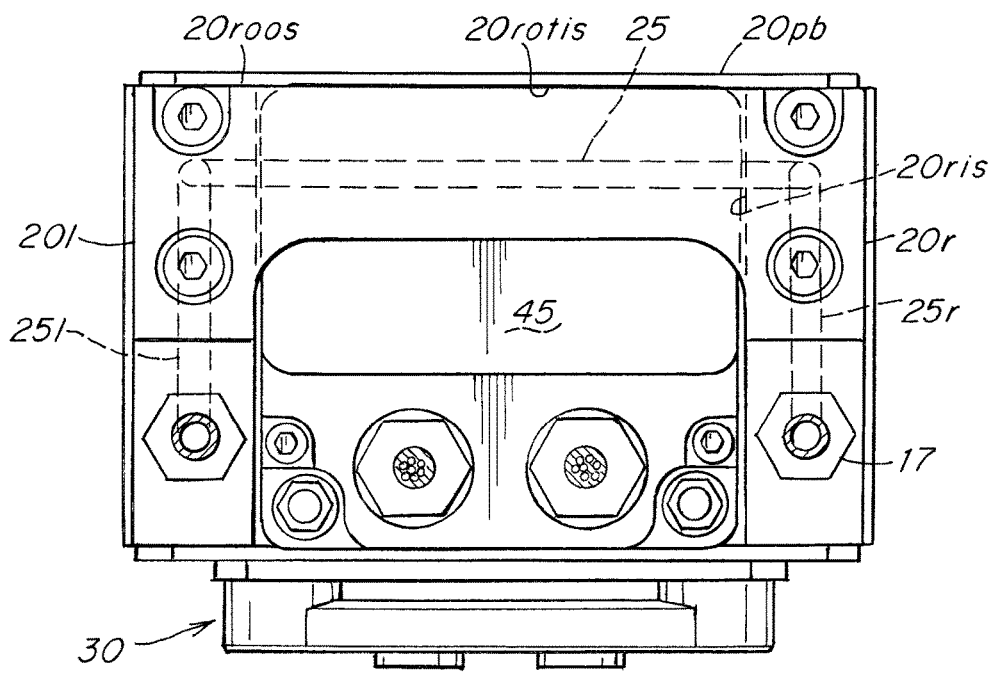
FIG. 24 is an end view of the FIG. 23 apparatus.
Figure 25:
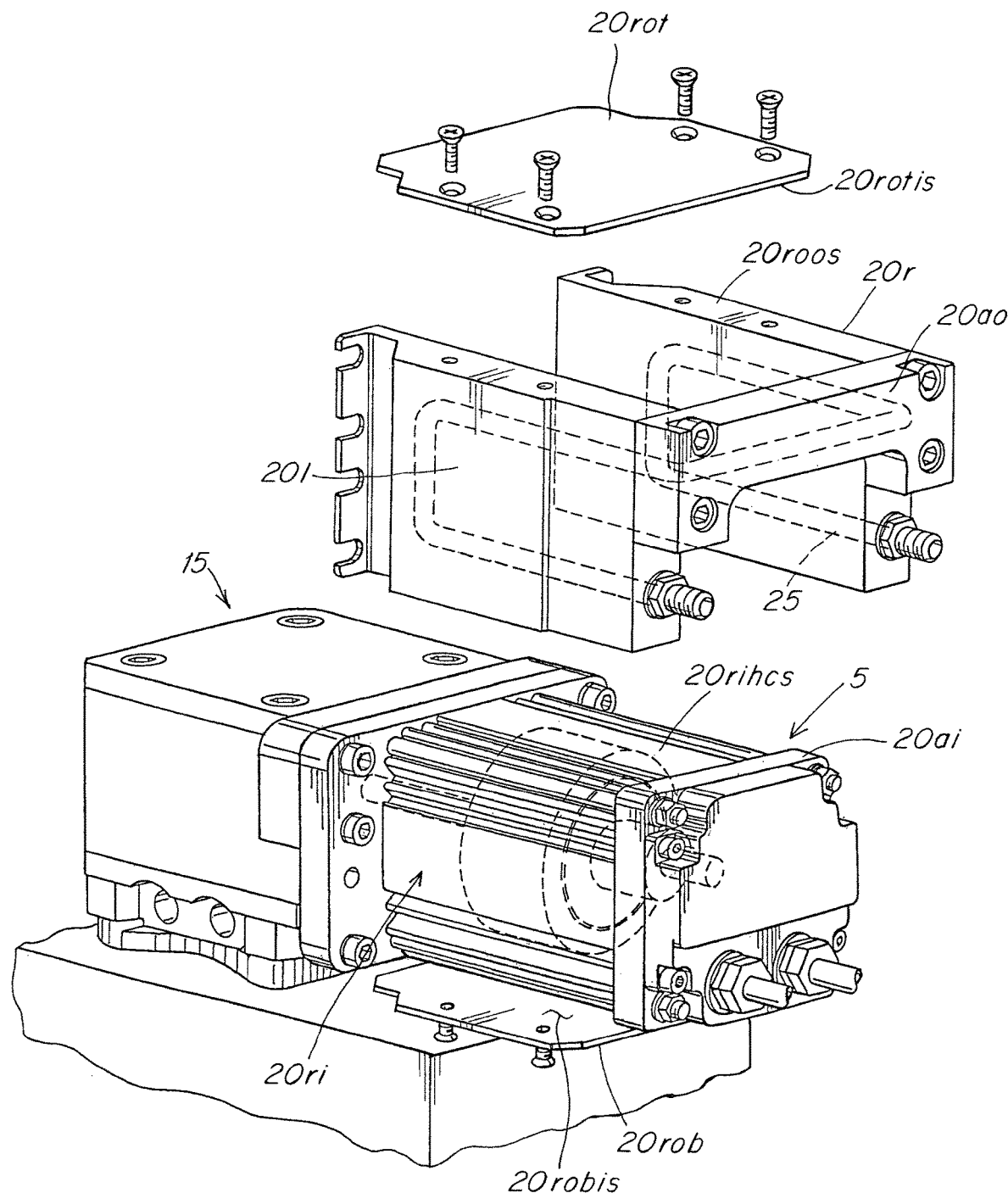
FIG. 25 is an exploded perspective view of the FIG. 23 system.
Figure 26:
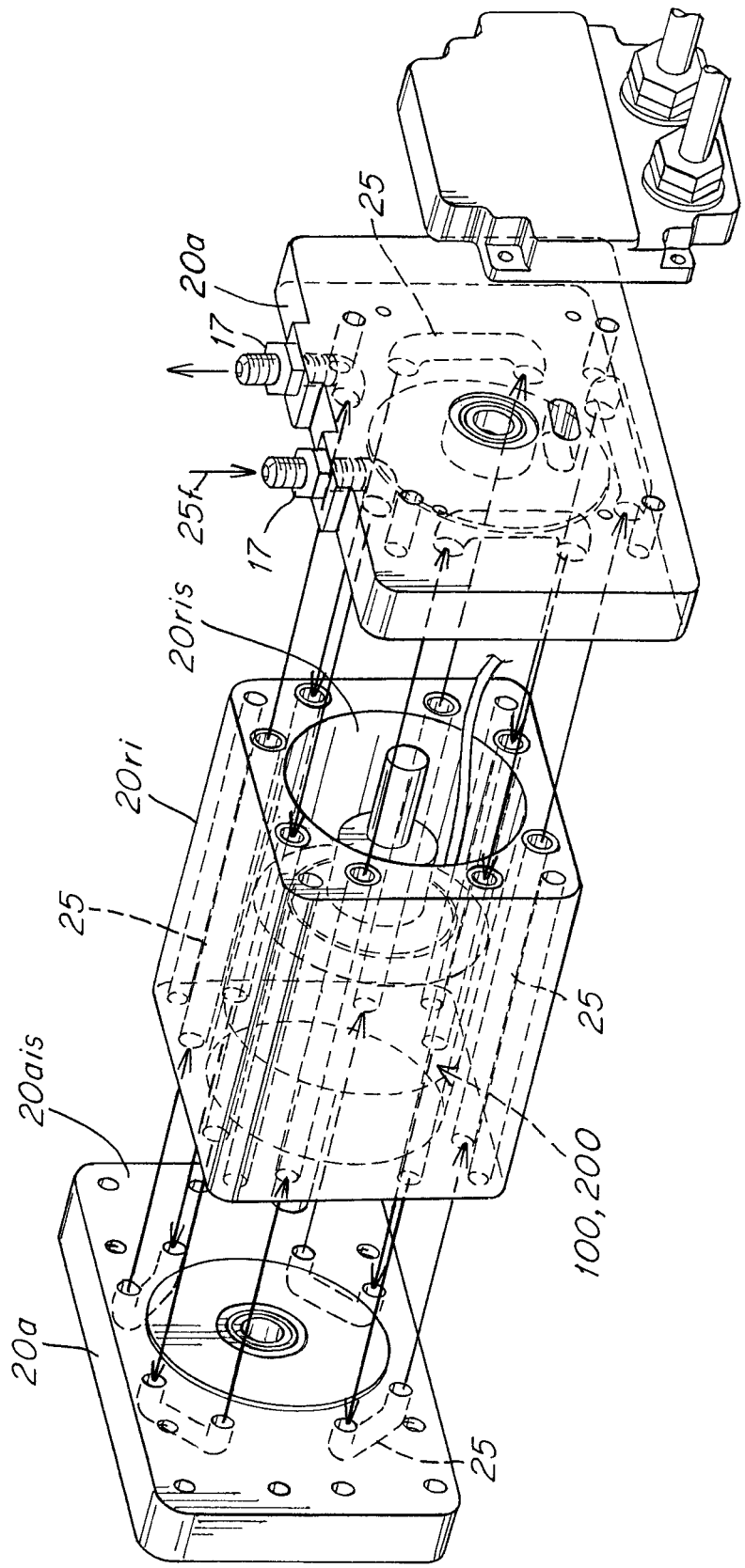
FIG. 26 is a rear exploded perspective view of an injection molding system with an actuator comprised of an electric motor housed within a housing comprised of a unitary housing member that forms top, bottom and opposing side radial walls and front and rear axial walls that removably assemble together with the unitary member, all of the walls containing actively cooled cooling channels.

The converter 15 can comprise a mount or alignment support 40a and a sled or slide 43 to which is interconnected a valve pin 100. The alignment support 40a has a guide surface 40as against which a complementary surface 43s of the sled or slide 43 slides as the sled 43 is driven reciprocally along a linear path A by the eccentric drive components that include the cam member 47, FIG. 1. As shown in the embodiment of FIG. 8, the sled 43 has freely rotatably wheels 43r that facilitate upstream downstream sliding of the sled along surface 40as. In an alternative embodiment, wheels 43r are not necessary and the lateral surface 43s can be adapted to slide directly against surface 40as without wheels. As shown in the FIG. 1 embodiment, the alignment support 40a is attached to a rotation speed reducer 42. The converter 40 can be fixedly mounted to either the top clamp plate 1002 or to the heated manifold 300.

The converter 15 includes a drive or mounting wheel or disc 500 having a rotational center 500c to which is axially attached or interconnected the rotatable drive shaft 250 of the actuator 5 either directly or indirectly via rotatably interconnected elongated shaft 20, 20f or a connector shaft such as a splined shaft 42s. With reference to FIGS. 5 through 9, the electrically powered rotatably driven rotor or drive shaft 12 of the motor is rotatably interconnected to the center 500c of the drive wheel or disc 500 of the rotary to linear converter 40 mechanism. An eccentrically mounted cam member 600, typically a freely rotatable disc or wheel, is mounted to the rotatably driven disc or wheel 500 a selected eccentric off center distance ED from the rotational center 500c of the driven wheel or disc 500.

The electrically powered drive of the motor rotor 250 drivably rotates R3 the drive wheel 500 at a controllably selectable speed and direction. As shown as the drive wheel 500 of the converter 15 is rotatably driven, the eccentrically mounted cam member 600 rotates R3 around the center 500c of the drive wheel 500. As shown, the converter 15 includes a slide or sled 43 that is provided with a cam slot 43sl that is attached to the support 40a in an arrangement such that an outside circumferential surface 600cs, of the cam member 600 engages a complementary interior cam surface 43ss of the slide or sled 43 member. The cam surface 43ss of the slide 43 is configured and adapted relative to the diameter D of the cam member 600 and the eccentric distance ED to enable the outside surface 600cs of the cam member 600 to forcibly engage the interior surface 43ss of the slide 43 and thus cause the slide 43 to be forcibly driven in a linear direction up and down or back and forth in or along a linear direction or axis A, as the cam member 600 is eccentrically drivably rotated R3 around the center of driven disc or wheel member 500. As shown, valve pin 800 is fixedly attached to the driven slide or sled member 43 in an arrangement such that the valve pin 800 is linearly driven together with the linear movement of the slide 43.

Because of the eccentric mounting of the cam member 600, the linear or axial speed, A31, A32, A33 of the valve pin 800 and sled 43 along the linear path A varies A31, A32, A33 according to the rotational or angular position of the cam member 600 during the course of a constant rotational speed R3. The linear or axial speed A32 is at a maximum when the cam member 600 is at a ninety degree rotational position and at a lesser speed when the cam member 600 is at a 45 degree position and the a 135 degree rotational position. Similarly with respect to the eccentric cam embodiment the linear or axial speed A32 of the valve pin 800 is at a maximum when the eccentric or eccentrically configured cam surface 600cs of disk 500 is in the ninety degree position, and the linear speeds A31 and A33 are less than the maximum when the eccentric cam surface 600cs is in the 0 degree, and 45 degree positions.

Conversely because of the eccentric mounting of the cam member 600, the torque force, T31, T32, T33 exerted by the eccentric cam 600 on the valve pin 800 and sled 43 along the linear path A varies T31, T32, T33 according to the rotational or angular position of the cam member 600 the rotational speed R3 is constant. The torque force is at a minimum when the cam member 600 is disposed at the ninety degree rotational position and at a higher torque when the cam member 600 is at the 45 degree position and the 135 degree rotational position. Similarly with respect to the eccentric cam embodiment, the torque force T32 exerted by the cam surface 600cs on the valve pin 100 is at a minimum when the eccentric or eccentrically configured cam surface 600cs of disk 500 is in the ninety degree position, and the torque force T31, T33 are greater than the minimum when the eccentric cam surface 600cs is in the 0 degree (at maximum torque force), and 45 degree positions.

Thus a linear travel converter 15 is a device that either converts linear motion or rotary motion to linear motion along an axis X, XX that is not coaxial with the axis Y of the motor.

The rotational speed reducing device shown in FIGS. 44-47 comprises a strain wave gear that includes a rotatable elliptical or other non circular shaped such as a three node containing shaped disk or ring that generates a reduction in rotation speed output relative to the rotation speed of the input rotor. The strain wave gear is typically comprised of three basic components: a wave generator, a flex spline and a circular spline. The wave generator is typically made up of an elliptical or other non circular shaped such as a three node containing shaped disk called a wave generator plug and an outer ball bearing, the outer bearing having an elliptical or other non circular shaped such as a three node containing shape as well. The flex spline is typically shaped like a shallow cup. The circumferential side walls of the spline are very thin, but the bottom is relatively rigid. This results in significant flexibility of the walls at the open end due to the thin wall, and in the closed side being quite rigid and able to be tightly secured to an output shaft. Teeth are positioned radially around the outside of the flex spline. The flex spline fits tightly over the wave generator, so that when the wave generator plug is rotated, the flex spline deforms to the shape of a rotating ellipse or other non circular shape such as a three node containing shape and does not slip over the outer elliptical or other non circular shaped such as a three node containing shaped ring of the ball bearing. The ball bearing lets the flex spline rotate independently to the wave generator's shaft. The circular spline is a rigid circular ring with teeth on the inside. The flex spline and wave generator are placed inside the circular spline, meshing the teeth of the flex spline and the circular spline. Because the flex spline is deformed into an elliptical or other non circular shaped such as a three node containing shape, its teeth only actually mesh with the teeth of the circular spline in two regions on opposite sides of the flex spline (located on the major axis of the ellipse or other non circular shaped such as a three node containing shape).

As the wave generator plug rotates, the flex spline teeth which are meshed with those of the circular spline change position. The major axis of the flex spline's ellipse or other non circular shaped such as a three node containing shape rotates with wave generator, so the points where the teeth mesh revolve around the center point at the same rate as the wave generator's shaft. The key to the design of the strain wave gear is that there are fewer teeth (often for example two fewer) on the flex spline than there are on the circular spline. This means that for every full rotation of the wave generator, the flex spline would be required to rotate a slight amount (two teeth in this example) backward relative to the circular spline. Thus the rotation action of the wave generator results in a much slower rotation of the flex spline in the opposite direction. For a strain wave gearing mechanism, the gearing reduction ratio can be calculated from the number of teeth on each gear.

In the embodiments shown in FIGS. 44-47, the strain wave gear 400, is comprised of the wave generator or thin walled bearing 460 that is mounted within and against the inner circumferential wall of the flex spline 430 that is in turn mounted within the inner splined circumference of a rigid circular spline 448 as shown. An inner bearing race 464 pressed on the elliptical or other non circular shaped such as a three node containing surface of the hub 472 either having or taking a shape complementary to the cam or elliptical or other non circular shaped such as a three node containing surfaces of the hub 472 and imparting forces 470 through the ball bearings 466 to the complementarily shaped outer race 462 that is also generally elliptical or other non circular shaped such as a three node containing shape and to the flex spline teeth 444, forcing them to mesh with the ring gear teeth 446 as the cam turns on shaft 12. A flex spline tooth 444a is shown as aligned with reference point P on the ring gear.

The input shaft comprises the motor shaft 250 that rotates around the shaft axis Y, the outer surface of which is compressibly mated with the inner circumferential surface 480 of the shaft receiving bore 474 of the hub of the gear. In the embodiment shown the output shaft or disc being the inner race 414 of an output bearing 410, the interface surface 420 of the inner race 414 being attached to a complementary end surface 432 of the flexspline 430. The strain wave gear as shown is comprised of a housing 400 on which a slewing ring bearing is mounted at the front end. The outer race 412 of the bearing is bolted to the housing and the inner race 414 is part of an armature 418 which is supported by rollers 416. The slewing ring bearing provides superior stability against any forward to backward movement of the armature as it turns in the housing. The forward end or face 422 of the armature has a bolt pattern 424 on which the drive disc 500 is fastened by screws 428 which pass through bolt pattern 502. The cam member 600 is bolted to armature 418 through one of the holes in bolt pattern 502 of the drive disc 500 and is rotated eccentrically a distance ED around output rotation axis R3a. The shoulder bolt 602 clamps a boss 604 to the disc 500 that is drivably rotated around the gear reducer rotation axis R3a, FIGS. 10, 11. The boss forms an inner race for roller bearings 606. The outer race 608 has an outer surface 600cs that drives the sled 43 up and down. At the rearward end 420 of the armature there is a bolt pattern 426 to which the flex spline 430 is bolted. The flex spline is cup shaped. The forward end 432 is closed and has a bolt pattern 436 for securing the end of the flex spline to the armature by means of clamping plate 436 and bolts 438. The sidewall 440 of the flex spline is thin for flexibility but retains good torsional strength. The rearward end of the cup shape 442 is open to receive the wave generator 460. The exterior surface of the rim has gear teeth 444 which selectively engage teeth 446 on the ring gear 448 as the wave generator rotates. The wave generator is mounted on the motor drive shaft 12 by hub 472. Hub 472 has an aperture 474 lined with compressible wedge shaped sleeves 480. When screws 478 are tightened, they force the clamping ring 476 rearward compressing the sleeves and self-centering and clamping the hub to the shaft 12 without the use of Allen set screws or keyways for smoother operation. The wave generator 460 is composed of an oval shaped cam formed on hub 472 on which is mounted by force fit, a ball bearing assembly with a flexible inner race that is force fit on the cam portion of hub 472. Lobes 482 on the hub form the inner race 464 into a cam with two lobes 468 formed 180 degrees apart in an oval shape. The outer race 462 can be rigid in the form an ellipse or other non circular shaped such as a three node containing shape complementary to the elliptical shape or other non circular shaped such as a three node containing shape of the hub 472 and the inner race 464 or can be thin and flexible so it can conform to the shape of the cam such that it projects outward (arrows 470) together with ball bearings 466 as the shaft 12 rotates, to force the gear teeth 444, 446 to mesh at locations 450. The teeth 444 at locations 452 flex inward after the lobes have passed to allow clearance for one or more of the teeth 444 to skip the ring gear teeth 446 and allow the flex spline 430 to rotate in relation to the ring gear 448 as dictated by the gear ratio and number of teeth.

The nature of the arrangement of the operative components (wave generator, flex spline, circular spline) of the strain wave gear 46, 400 in a nested fashion provide a physical device depth GD, diameter DIA or physical size that is adapted to be compact and space efficient enough or sufficient to enable the device to be mounted to the housing of the rotary to linear converter 40, and to be readily mountable to and dismountable from, alone or together with the rotary to linear converter, either one or the other of the top clamping plate and the heated manifold.

Alternatively the speed reducing, torque increasing device can comprise an assembly such as a worm gear assembly, a spur gear assembly, a planetary gear assembly where the rotor 250 of the motor 200 is connected to and rotates the highest speed rotating gear or gear tooth containing component of the assembly and the intermediate shaft is connected to and rotated by the highest rotating gear or gear tooth containing component of the assembly to effectively reduce the rotational speed and increase the torque output of the rotor 250 that is transmitted to the output shaft 160 that is driven at a reduced speed R3 and higher torque R3s. Other assemblies such as helical gear assemblies, or belts and pulley arrangements and assemblies can be used to affect such speed changing and torque changing.

Figure 48:
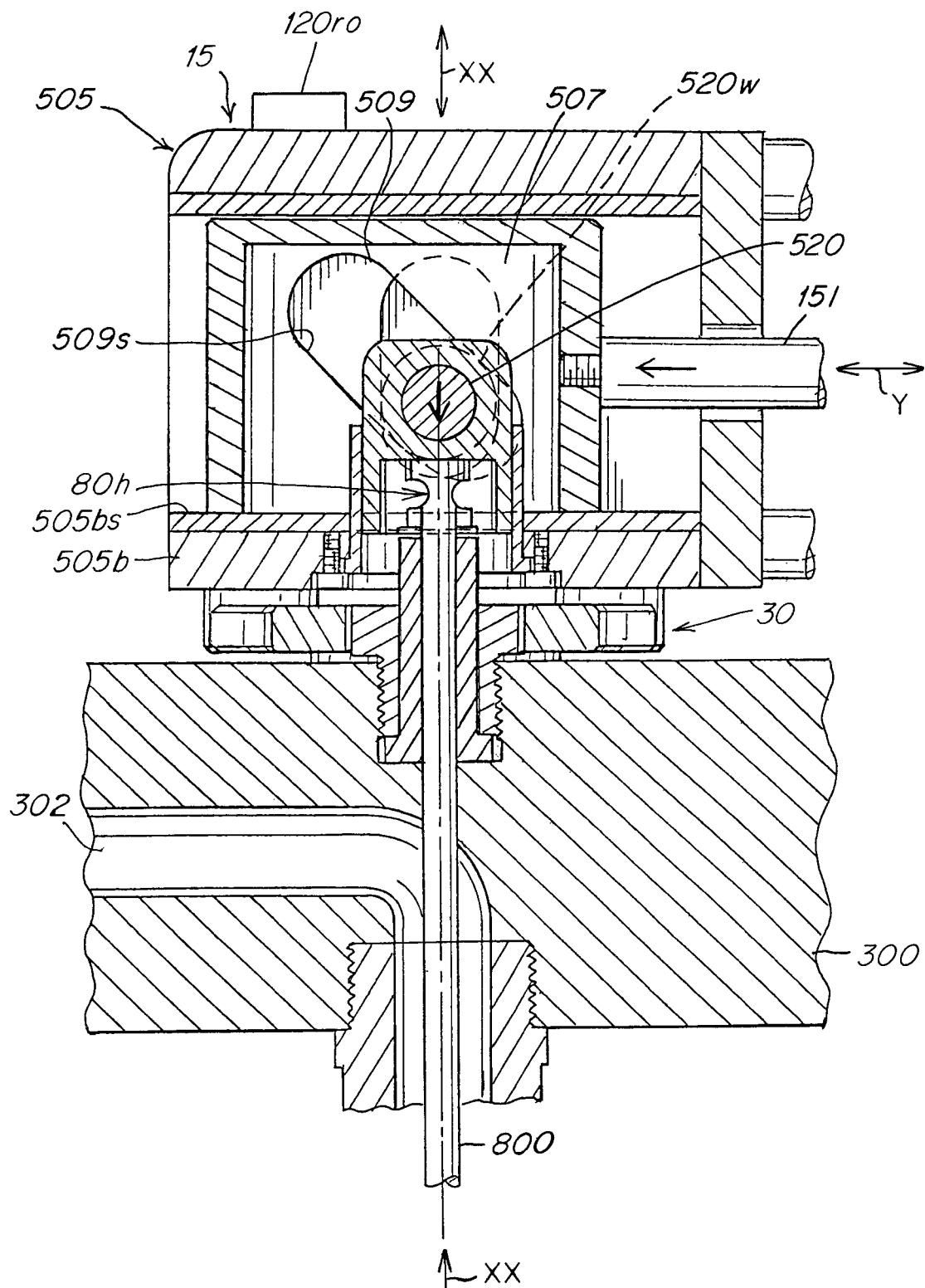
FIG. 48 is a side sectional view of a linear to non coaxial linear motion converter that can be interconnected to an electric actuator with a housing wall 120ro of the converter incorporating active cooling channels.
Figure 49:
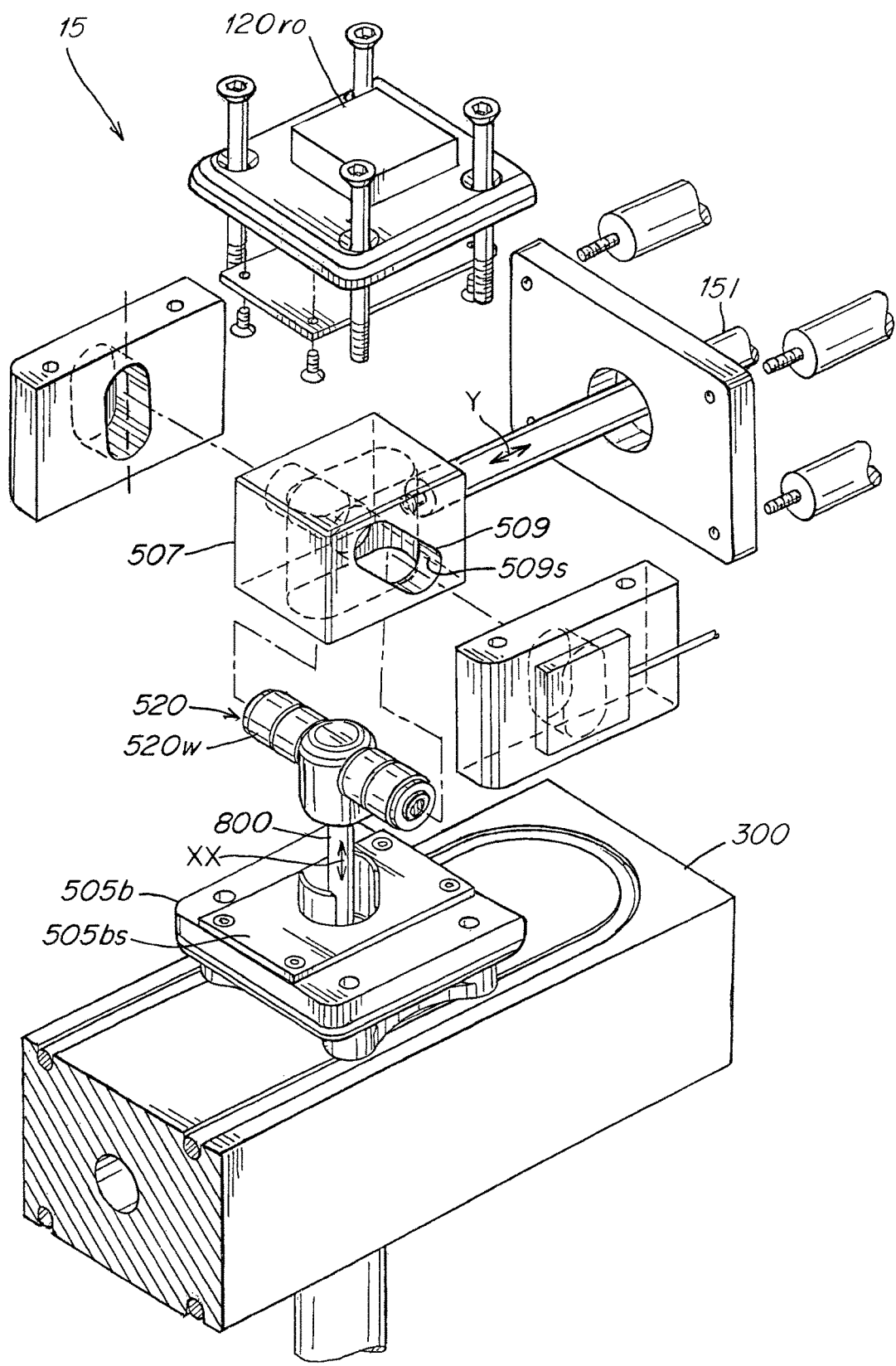
FIG. 49 is an exploded view of the linear to non coaxial linear motion converter component of the FIG. 48 subassembly showing a housing wall 120ro of the converter incorporating active cooling channels.

FIGS. 48-49 show one embodiment of a linear to linear movement converter 15 that is comprised of a sliding body 507 fixedly interconnected to the linearly driven shaft 151 by the actuator 5. An undersurface of the sliding body 507 is slidably mounted on a mounting surface 505bs of a bottom wall 505b of a subassembled body housing 505 such that the sliding body 507 is controllably drivable along the first linear drive axis L1 by controlled drive of the actuator 1000 with the controller 176. The sliding body 507 is formed to include an aperture or slot 509 within the body 507 that is configured and adapted to cause the valve pin 80 to be driven at one or more selected speeds along axis L2 in relation to the speed CV of drive of the actuator 5. The upstream end 80h of the valve pin 800 is fixedly connected to a follower pin 520 around which is typically mounted one or more wheels 520w that are typically rotatably mounted on the follower pin 520. The housing 505, follower pin 520, valve pin and manifold are assembled such that the guide slot 509 receives the follower pin 520 and wheels 520w in an arrangement where the outside surfaces of the wheels 520w engage against the guide surface 509s of the slot 509. As the sliding body 507 is moved along axis L1 the slot 509 moves along axis L1 and the follower pin 520 is forced by engagement against the moving slot surface 509 to move along the non coaxial axis L2, the valve pin thus moving along the axis L2 together with movement of the sliding body 507 along axis L1. The speed of movement V of the valve pin 80 depends both on the contour or profile of the surface 509s of guide slot 509 and on the speed of movement CV of the linear drive member 150 of actuator 5.

In the embodiment of FIGS. 48-49, the slot 509s has a linear or straight configuration such that the speed of movement of valve pin 80 varies directly or linearly with the speed of movement CV of linear drive member 150. When the slot 509 surface 509s is straight, the pin velocity V remains constant with constant linear drive member velocity CV.

FIGS. 31-35 show conventional electric motor components in various arrangements that an electric actuator component of an apparatus according to the invention is typically comprised of. As shown, a typical electrically powered motor comprises an armature 200 and a stator 100 that conduct electricity and interact with each other via electromagnetic fields that are generated as a result of such electrical current, such fields being disposed at angular orientations that are determined by the geometrical configuration, mounting and arrangement of the copper coils or permanent magnets 100pm that make up the armature 200 and stator 100. The electromagnetic fields emitted by the electrically conductive coils as shown are generated by application of current (AC or DC) through the electrically conductive coils or by the fields that the permanent magnets 100pm inherently generate. The application of current through one or more of the coils 200, 100 generates heat HT that heats up the gaseous medium 45 contained within an actuator housing 20. The heated gaseous medium in turn makes contact with and heats the interior surfaces 20ais, 20iis, 120ais, 120iis, 20is, 120is of the walls of the actuator housing. Thus the walls of an electric actuator housing 20 are heated by the coils of the motor in addition to being heated by heat originating with the heated manifold. Such heat generated by the electric motor is thus dissipated by the active cooling mechanisms described herein.

What is claimed is:

1. An injection molding system (1000) comprising an injection molding machine (500) that injects a flow of injection fluid (400) to a heated manifold (300) that distributes the injection fluid (400) to a flow channel that delivers the injection fluid to a gate (70) of a mold cavity (80), the injection molding system (1000) comprising:
    an actuator (5) comprised of a rotor (250) having a drive axis (Y) and a driver (100, 200) interconnected to the rotor (250) adapted to drive the rotor around the drive axis, the driver (100, 200) receiving electrical energy or power that generates drive heat (HT),
    the actuator having a housing (20) comprised of radial (20r, 20ri, 20ro, 20roa, 20rob, 20roc, 20rod) and axial walls (20a, 20ai, 20aue, 20ade) that form an enclosed chamber (45) containing a heat conductive chamber fluid (CF), the rotor and driver (250, 100, 200) being mounted within the chamber (45) in intimate heat conductive contact with the heat conductive fluid,
    the rotor and driver being supported within the chamber by the radial and axial walls (20r, 20ro, 20ri, 20roa, 20rob, 20roc, 20rod, 20a, 20ai, 20aue, 20ade) in an arrangement such that the rotor (250) and driver (100, 200) are drivably rotatable within the chamber (45),
    wherein one or more of the radial and axial walls (20r, 20ro, 20ri, 20roa, 20rob, 20roc, 20rod, 20a, 20ai, 20aue, 20ade) comprise a heat conductive material that has an inner surface disposed in heat conductive contact with the heat conductive fluid (CF) contained within the enclosed chamber,
    the one or more radial or axial walls (20r, 20ro, 20ri, 20roa, 20rob, 20roc, 20rod, 20a, 20ai, 20aue, 20ade) absorbing heat from the heat conductive fluid (CF) contained within the chamber (45),
    an actuator tube or channel (25) surrounded by and in intimate heat conductive contact with the heat conductive material of one or more of the radial and axial walls (20r, 20ro, 20ri, 20roa, 20rob, 20roc, 20rod, 20a, 20ai, 20aue, 20ade),
    a source (260) of heat absorptive fluid (25f) sealably interconnected to the tube or channel (25) in an arrangement such that the heat absorptive fluid (25f) is routed through the tube or channel (25) in a flow that absorbs heat from the one or heat conductive walls (20r, 20ro, 20ri, 20roa, 20rob, 20roc, 20rod, 20a, 20ai, 20aue, 20ade),
    a valve pin (800) having a pin axis (X), the valve pin being interconnected to the rotor (250) such that the valve pin is controllably drivable along a linear path of travel (XX) along the pin axis (X),
    wherein the housing (20) of the actuator is mounted in heat conductive communication with the heated manifold (300) such that manifold heat is absorbed by or communicated to the one or more radial and axial walls (20r, 20ro, 20ri, 20roa, 20rob, 20roc, 20rod, 20a, 20ai, 20aue, 20ade) of the housing, the heat absorptive fluid (25f) absorbing the manifold heat absorbed by or communicated to the one or more radial and axial walls (20r, 20ro, 20ri, 20roa, 20rob, 20roc, 20rod, 20a, 20ai, 20aue, 20ade) of the housing.

2. The system of claim 1 wherein the radial walls (20r, 20ri, 20rit, 20ro, 20roa, 20rob, 20roc, 20rod) and the axial walls (20a, 20ai, 20aue, 20ade) are interconnected to each other to form an independent housing body (20) that is attachable to and detachable from a housing (120) of a linear travel converter or transmission (15) that is mounted to the manifold and adapted to convert rotational movement of the rotor (250) around the rotor axis (Y) to linear movement of the valve pin along an axis (X, XX).

3. The system of claim 2 wherein the independent housing body (20) is mounted to the manifold (300) via the mounting of the linear travel converter (15) to the manifold.

4. The system of claim 2 wherein the linear travel converter or transmission (15) comprises a rotary to linear or linear to linear conversion device or a transmission (15) comprised of one or more gears, racks, screws or nuts (16a, 16b, 72, 190, 191, 195, 950, 960, 970) adapted to convert rotational movement of the rotor (250) around the rotor axis (Y) to linear movement of the valve pin along an axis (X, XX) that is non-coaxial relative to the rotor axis (Y).

5. The system of claim 2 wherein the housing (120) of the linear travel converter or transmission comprises one or more converter or transmission walls (120r, 120rb, 120rc, 120ri, 120ro, 120a) that are comprised of a heat conductive material.

6. The system of claim 2 wherein the converter or transmission walls (120r, 120rb, 120rc, 120ri, 120ro, 120a) are mounted to the heated manifold (300) in an arrangement such that the manifold heat (300) is communicated to the converter or walls (120r, 120rb, 120rc, 120ri, 120ro, 120a).

7. The system of claim 2 wherein the actuator housing body (20) surrounds or contains the tube or channel (25) independent of the converter or transmission walls (120r, 120rb, 120rc, 120ri, 120ro, 120a).

8. The system of claim 1 wherein one or more radial or axial walls of the actuator housing:
    comprise a first unitary body (20r, 20ri, 20a,) comprised of a heat conductive material having an inner surface (20*ris*, 20*ais*) disposed in intimate heat conductive contact with the fluid (CF) contained within the chamber or, comprise a second unitary body (20*ro*, 20*ao*) comprised of a heat conductive material that has an inner surface (20*rois*, 20*aois*) in intimate heat conductive contact or communication with a heat communicating surface (20*rihcs*, 20*aihcs*) of the first unitary body (20*ri*, 20*ai*) or an intermediate unitary body that is comprised of a heat conductive material having a second inner surface (20*riis*, 20*aiis*) that is disposed in intimate heat conductive contact or communication with the fluid (CF) contained within the chamber (45).

9. The system of claim 8 wherein the first unitary body (20*ro*, 20*a*0) is comprised of a heat insulative or non-heat conductive material and the second unitary body (20*ro*, 20*ao*) is comprised of a highly heat conductive material.

10. The system of claim 1 further comprising a linear travel converter (15) interconnected between the rotor (250) and the valve pin (800) in an arrangement that converts rotation movement of the rotor to linear movement (XX) of the valve pin (800),
wherein the heated manifold (300) generates manifold heat,
the linear travel converter (15) comprising a converter housing (120) comprised of one or more converter walls (120*r*, 120*rb*, 120*rc*, 120*ri*, 120*ro*, 120*a*) that are comprised of a heat conductive material, the converter walls (120*r*, 120*rb*, 120*rc*, 120*ri*, 120*ro*, 120*a*) being mounted to the heated manifold (300) in an arrangement such that the manifold heat is communicated to the converter walls (120*r*, 120*rb*, 120*rc*, 120*ri*, 120*ro*, 120*a*).

11. The system of claim 10 wherein the converter housing includes a converter tube or channel (125) surrounded by and in intimate heat conductive contact with the heat conductive material of one or more of the converter walls and wherein one or more of the converter walls (120*r*, 120*rb*, 120*rc*, 120*ri*, 120*ro*, 120*a*) has an outer surface (120*aos*, 120*ros*) disposed in heat conductive communication with a heat conductive surface (20*aos*) of one or more of the radial and axial walls (20*r*, 20*ro*, 20*roa*, 20*rob*, 20*roc*, 20*rod*, 20*a*, 20*aue*, 20*ade*) of the actuator (5).

12. The system of claim 10 wherein one or more of the converter walls (120*r*, 120*rb*, 120*rc*, 120*ri*, 120*ro*, 120*a*) has an inner surface (120*ris*, 120*ais*) disposed in heat conductive communication with a linear travel device (127) that is interconnected between the rotor (250) and the valve pin to convert rotation movement of the rotor to linear movement (XX) of the valve pin (800).

13. The system of claim 10 wherein one or more of the converter walls comprises a unitary body (120*ro*) comprised of the heat conductive material having an inner surface (120*rois*) in heat conductive contact with a heat communicating surface (120*rihcs*) of an intermediate unitary body (120*ri*) comprised of a heat conductive material having a second inner surface (20*riis*) that is disposed in heat conductive communication with a linear travel device (127) that is interconnected between the rotor (250) and the valve pin to convert rotation movement of the rotor to linear movement (XX) of the valve pin (800).

14. The system of claim 2 wherein the linear travel converter (15) is interconnected between the rotor (250) and the valve pin (800) in an arrangement that converts rotation movement of the rotor (250) to linear movement (XX) of the valve pin (800),
the linear travel converter (15) being mounted within the enclosed chamber (45) in contact with the heat conductive chamber fluid (CF)
the housing (20) of the actuator being mounted in heat conductive communication with the heated manifold (300) such that manifold heat is absorbed by or communicated to the one or more radial and axial walls (20*r*, 20*ro*, 20*ri*, 20*roa*, 20*rob*, 20*roc*, 20*rod*, 20*a*, 20*ai*, 20*aue*, 20*ade*) of the housing,
the heat absorptive fluid (25*f*) absorbing the manifold heat absorbed by or communicated to the one or more radial and axial walls (20*r*, 20*ro*, 20*ri*, 20*roa*, 20*rob*, 20*roc*, 20*rod*, 20*a*, 20*ai*, 20*aue*, 20*ade*) of the housing.

15. The system of claim 1 wherein the rotor (250) has a rotor axis (Y) and the valve pin (800) has a travel axis (X, XX), the rotor axis (Y) and the travel axis (X, XX) being coaxial.

16. The system of claim 1 wherein the rotor (250) has a rotor axis (Y), and the system includes a transmission comprised of:
one or more gears, racks, screws or nuts (16*a*, 16*b*, 72, 190, 191, 195, 950, 960, 970) adapted to convert rotational movement of the rotor (250) around the rotor axis (Y) to linear movement of the valve pin along an axis (X, XX) that is non-coaxial relative to the rotor axis (Y),
one or more transmission walls (120*r*, 120*ro*, 120*ri*, 120*a*, 120*ao*, 120*ai*) forming an enclosed chamber (55) that encloses one or more of the gears, racks, screws or nuts (16*a*, 16*b*, 72, 190, 191, 195, 950, 960, 970),
the one or more transmission walls (120*r*, 120*ro*, 120*ri*, 120*a*, 120*ao*, 120*ai*) being comprised of a heat conductive material,
a converter tube or channel (125) surrounded by and in intimate heat conductive contact with the heat conductive material of one or more of the transmission walls (120*r*, 120*ro*, 120*ri*, 120*a*, 120*ao*, 120*ai*),
a source of heat absorptive fluid (125F) sealably interconnected to the converter tube or channel (125) in an arrangement such that the heat absorptive fluid (125*f*) is routed through the converter tube or channel (125) in a flow that absorbs heat absorbed by or communicated to the one or more transmission walls (120*r*, 120*ro*, 120*ri*, 120*a*, 120*ao*, 120*ai*).

17. The system of claim 1 wherein the actuator housing (20) is removably attached to a top clamping or mounting plate (1002) that is mounted upstream of the manifold and interconnected to the mold.

18. The system of claim 2 wherein the linear travel converter (15) is removably attached to a top clamping or mounting plate (1002) that is mounted upstream of the manifold and interconnected to the mold.

19. An injection molding system (1000) comprising an injection molding machine (500) that injects a flow of injection fluid (400) to a heated manifold (300) that distributes the injection fluid (400) to a flow channel that delivers the injection fluid to a gate (70) of a mold cavity (80), the injection molding system (1000) further comprising:
an actuator (5) comprised of a rotor (250) having a drive axis (Y) and a driver (100, 200) interconnected to the rotor (250) adapted to drive the rotor around the drive axis (Y),
a linear travel converter (15) interconnected between the rotor (250) and a valve pin (800) in an arrangement that converts rotation movement of the rotor to linear movement (XX) of the valve pin (800),
a heated manifold (300) that generates manifold heat, the linear travel converter (15) comprising a converter housing (120) comprised of one or more converter walls (120*r*, 120*rb*, 120*rc*, 120*ri*, 120*ro*, 120*a*) that are comprised of a heat conductive material, the converter walls (120*r*, 120*rb*, 120*rc*, 120*ri*, 120*ro*, 120*a*) being mounted to the heated manifold (300) in an arrangement such that the manifold heat is communicated to the converter walls (120*r*, 120*rb*, 120*rc*, 120*ri*, 120*ro*, 120*a*), a converter tube or channel (125) surrounded by and in intimate heat conductive contact with the heat conductive material of one or more of the converter walls (120*r*, 120*rb*, 120*rc*, 120*ri*, 120*ro*, 120*a*), a source of heat absorptive fluid (125F) sealably interconnected to the converter tube or channel (125) in an arrangement such that the heat absorptive fluid (125*f*) is routed through the converter tube or channel (125) in a flow that absorbs the manifold heat communicated to the converter walls.

20. The system of claim 19 wherein one or more of the converter walls (120*r*, 120*rb*, 120*rc*, 120*ri*, 120*ro*, 120*a*) has an inner surface (120*ris*, 120*ais*) disposed in heat conductive communication with a linear travel device (127) that is interconnected between the rotor (250) and the valve pin to convert rotation movement of the rotor to linear movement (XX) of the valve pin (800).

21. The system of claim 19 wherein one or more of the converter walls comprises a unitary body (120*ro*) comprised of the heat conductive material having an inner surface (120*rois*) in heat conductive contact with a heat communicating surface (120*rihcs*) of an intermediate unitary body (120*ri*) comprised of a heat conductive material having a second inner surface (20*riis*) that is disposed in heat conductive communication with a linear travel device (127) that is interconnected between the rotor (250) and the valve pin to convert rotation movement of the rotor to linear movement (XX) of the valve pin (800).

22. The system of claim 19 wherein the actuator housing (20) is removably attached to a top clamping or mounting plate (1002) that is mounted upstream of the manifold and interconnected to the mold.

23. An injection molding system (1000) comprised of an injection molding machine that injects a flow of injection fluid to a heated manifold that distributes the injection fluid to a flow channel that delivers the injection fluid to a gate of a cavity contained in a mold, the injection molding system including:

a top clamp plate, an actuator comprised of an electricity driven device interconnected to a rotor, the electricity driven device being adapted to receive electrical energy, rotatably drive the rotor around a drive axis and generate electric drive heat, the rotor being interconnected to a valve pin having a pin axis in an arrangement wherein the valve pin is driven along a linear path of travel along the pin axis, the actuator including heat conductive walls that form a housing removably mounted to one or the other of the manifold and the top clamp plate (1002), the housing mounting the electricity driven device within an enclosed chamber formed in whole or in part by one or more of the heat conductive walls, the heat conductive walls having an interior surface in thermal conductive contact with the electric drive heat generated by the electricity driven device within the enclosed chamber such that the electric drive heat is received by the heat conductive walls, a cooler comprised of a tube or channel formed or contained within or in intimate contact with the one or more heat conductive walls, the tube or channel containing a cooling fluid, the tube or channel being adapted to receive the electric drive heat from the one or more heat conductive walls and transmit or conduct the electric drive heat to the cooling fluid contained within the tube or channel, wherein the actuator is mounted in thermal communication with the manifold such that heat generated by the heated manifold is received by the housing of the actuator, the tube or channel formed or contained within or in contact with the one or more heat conductive walls in an arrangement wherein the manifold heat received by the one or more heat conductive walls is transmitted or conducted to the cooling fluid.

24. The system of claim 23 wherein the actuator housing is mounted to and in heat conductive communication with one or more actuator mounts that are mounted downstream to or in heat conductive communication with the heated manifold.

25. The system of claim 24 wherein the actuator housing comprises one or more radial or axial walls wherein the one or more radial or axial walls of the actuator housing:

comprise a first unitary body (20*r*, 20*a*, 20*ri*, 20*ai*) comprised of a heat conductive material having an inner surface (20*ris*, 20*ais*, 20*riis*, 20*aiis*) disposed in intimate heat conductive contact with the interior space (45*s*) of the chamber and, comprise a second unitary body (20*ro*, 20*ao*) comprised of a heat conductive material that has an inner surface (20*rois*, 20*aois*) in intimate heat conductive contact or communication with a heat communicating surface (20*rihcs*, 20*aihcs*) of the first unitary body (20*ri*, 20*ai*) or of one or more intermediate unitary bodies that are comprised of a heat conductive material and have a second inner surface (20*riis*, 20*aiis*) that is disposed in intimate heat conductive contact or communication with the interior space (45*s*) of the chamber (45).

26. An injection molding system (1000) comprising an injection molding machine (500) that injects a flow of injection fluid (400) to a heated manifold (300) that distributes the injection fluid (400) to a flow channel that delivers the injection fluid to a gate (70) of a mold cavity (80), the injection molding system (1000) further comprising:

an actuator (5) comprised of a rotor (250) having a drive axis (Y) and a driver (100, 200) interconnected to the rotor (250) adapted to drive the rotor around the drive axis (Y), a linear travel converter (15) interconnected between the rotor (250) and a valve pin (800) in an arrangement that converts rotation movement of the rotor to linear movement (XX) of the valve pin (800), a heated manifold (300) that generates manifold heat, the linear travel converter (15) comprising a converter housing (120) comprised of one or more converter walls (120*r*, 120*rb*, 120*rc*, 120*ri*, 120*ro*, 120*a*) forming a converter chamber (145) comprised of:

a first unitary converter body (120*r*, 120*a*, 120*ri*, 120*ai*) comprised of a heat conductive material having an inner surface (120*ris*, 120*ais*, 120*riis*, 120*aiis*) disposed in intimate heat conductive contact with an interior space (145*s*) of the converter chamber (145) and, a second unitary converter body (20*ro*, 20*ao*) comprised of a heat conductive material that has an inner surface (120*rois*, 120*aois*) in intimate heat conductive contact or communication with a heat communicating surface (120*rihcs*, 120*aihcs*) of the first unitary converter body (120*ri*, 120*ai*) or of one or more intermediate unitary converter bodies that are comprised of a heat conductive material.

27. The system of claim 26 wherein an actuator tube or channel (125) is disposed within the second unitary body (120*ro*, 120*ao*).

28. The system of claim 26 wherein the first unitary converter body (120*r*, 120*a*, 120*ri*, 120*ai*) is comprised of a heat insulative material and the second unitary converter body (120*ro*, 120*ao*) is comprised of a highly heat conductive material.

29. An injection molding system (1000) comprising an injection molding machine (500) that injects a flow of injection fluid (400) to a heated manifold (300) that distributes the injection fluid (400) to a flow channel that delivers the injection fluid to a gate (70) of a mold cavity (80), the injection molding system (1000) comprising:

an actuator (5) comprised of a rotor (250) having a drive axis (Y) and a driver (100, 200) interconnected to the rotor (250) adapted to drive the rotor rotatably around the drive axis, the rotor being interconnected to a valve pin (800) having a pin axis (X) in arrangement such that the valve pin (800) is drivable linearly along the pin axis (x), the actuator having a housing (20) comprised of radial (20*r*, 20*ri*, 20*ro*, 20*roa*, 20*rob*, 20*roc*, 20*rod*) and axial walls (20*a*, 20*ai*, 20*aue*, 20*ade*) comprised of a heat conductive material, the rotor and driver being supported within the chamber by the radial and axial walls (20*r*, 20*ro*, 20*ri*, 20*roa*, 20*rob*, 20*roc*, 20*rod*, 20*a*, 20*ai*, 20*aue*, 20*ade*), an actuator tube or channel (25) surrounded by and in intimate heat conductive contact with the heat conductive material of one or more of the radial and axial walls (20*r*, 20*ro*, 20*ri*, 20*roa*, 20*rob*, 20*roc*, 20*rod*, 20*a*, 20*ai*, 20*aue*, 20*ade*), a source (260) of heat absorptive fluid (25*f*) sealably interconnected to the tube or channel (25) in an arrangement such that the heat absorptive fluid (25*f*) is routed through the tube or channel (25) in a flow that absorbs heat from the one or heat conductive walls (20*r*, 20*ro*, 20*ri*, 20*roa*, 20*rob*, 20*roc*, 20*rod*, 20*a*, 20*ai*, 20*aue*, 20*ade*), wherein the housing (20) is mounted in heat conductive communication with the heated manifold (300) such that manifold heat is absorbed by or communicated to the one or more radial and axial walls (20*r*, 20*ro*, 20*ri*, 20*roa*, 20*rob*, 20*roc*, 20*rod*, 20*a*, 20*ai*, 20*aue*, 20*ade*) of the housing, the heat absorptive fluid (25*f*) absorbing the manifold heat absorbed by or communicated to the one or more radial and axial walls (20*r*, 20*ro*, 20*ri*, 20*roa*, 20*rob*, 20*roc*, 20*rod*, 20*a*, 20*ai*, 20*aue*, 20*ade*) of the housing.

30. A method of performing an injection cycle comprising operating a system according to the system of claim 1.

31. A method of performing an injection cycle comprising operating a system according to the system of claim 19.

32. A method of performing an injection cycle comprising operating a system according to the system of claim 23.

33. A method of performing an injection cycle comprising operating a system according to the system of claim 26.

34. A method of performing an injection cycle comprising operating a system according to the system of claim 29.

* * * * *